(12) United States Patent
Wang et al.

(10) Patent No.: US 12,496,349 B2
(45) Date of Patent: Dec. 16, 2025

(54) MACROMOLECULAR PRODRUG-BASED THERMOSENSITIVE INJECTABLE GEL AS A NOVEL DRUG DELIVERY PLATFORM

(71) Applicant: Board of Regents of the University of Nebraska, Lincoln, NE (US)

(72) Inventors: Dong Wang, Omaha, NE (US); Steven R. Goldring, Auburndale, MA (US); Gang Zhao, Omaha, NE (US); Rongguo Ren, Omaha, NE (US); Zhenshan Jia, Omaha, NE (US); Xin Wei, Omaha, NE (US)

(73) Assignee: BOARD OF REGENTS OF THE UNIVERSITY OF NEBRASKA, Lincoln, NE (US)

( * ) Notice: Subject to any disclaimer, the term of this patent is extended or adjusted under 35 U.S.C. 154(b) by 1086 days.

(21) Appl. No.: 17/288,814

(22) PCT Filed: Oct. 27, 2019

(86) PCT No.: PCT/US2019/058237
§ 371 (c)(1),
(2) Date: Apr. 26, 2021

(87) PCT Pub. No.: WO2020/087057
PCT Pub. Date: Apr. 30, 2020

(65) Prior Publication Data
US 2022/0008543 A1 Jan. 13, 2022

Related U.S. Application Data

(60) Provisional application No. 62/751,119, filed on Oct. 26, 2018.

(51) Int. Cl.
*A61K 47/58* (2017.01)
*A61K 47/54* (2017.01)
*A61K 47/55* (2017.01)
*A61K 47/69* (2017.01)

(52) U.S. Cl.
CPC .......... *A61K 47/58* (2017.08); *A61K 47/6903* (2017.08)

(58) Field of Classification Search
CPC .......................... A61K 47/58; A61K 47/6903
See application file for complete search history.

(56) References Cited

U.S. PATENT DOCUMENTS

| | | |
|---|---|---|
| 2007/0287680 A1 | 12/2007 | Cuchelkar et al. |
| 2009/0311182 A1* | 12/2009 | Wang ................ A61K 49/0054 424/9.1 |
| 2012/0177592 A1 | 7/2012 | Radosz |
| 2013/0243696 A1* | 9/2013 | Wang ................ A61K 49/0008 424/9.1 |
| 2017/0267716 A1 | 9/2017 | Murray et al. |
| 2018/0251730 A1 | 9/2018 | Rodrigues et al. |

FOREIGN PATENT DOCUMENTS

| | | |
|---|---|---|
| CN | 103059220 A | 4/2013 |
| KR | 20060100311 A | 9/2006 |
| WO | 200728347 A2 | 3/2007 |
| WO | 2007063320 A1 | 6/2007 |
| WO | WO-2016050208 A1 * | 4/2016 ............ C08G 65/08 |

OTHER PUBLICATIONS

English translation of WO-2016050208-A1, provided by EPO and Google Translate (Year: 2024).*
Sun, W., et al., G3-12 Peptide Reverse Galectin-3 from Foe to Friend for Active Targeting Cancer Treatment, Mol. Pharmaceutics, 2015, 12, pp. 4124-4136.
Quan, L., et al., The Evaluation of the Therapeutic Efficacy and Side Effects of a Macromolecular Dexamethasone Prodrug in the Collagen-Induced Arthritis Mouse Model, Pharm Res, 2016, 33, pp. 186-193.
Wang, D., et al., Novel Dexamethasone-HPMA copolymer conjugate and its potential application in Treatment of Rheumatoid Arthritis, Arthritis Research & Therapy, 2007, 9(1), R2 (9 pages).
Quan, L., et al. Nanomedicines for Inflammatory Arthritis: Head-to-Head Comparison of Glucocorticoid-Contaning Polymers, Micelles, and Liposomes, ACS Nano, 2014, 8(1), pp. 458-466.
Martellini, F., et al., Thermally reversible gels based on acryloyl-L-proline methyl ester as drug delivery systems, Radiation Physics and Chemistry, 1999, 55, pp. 185-192.
Cho, J., et al., Injectable poly(organophosphazene)-camthothecin conjugate hydrogels: Synthesis, characterization, and antitumor activities, European Journal of Pharmaceutics and Biopharmaceutics, 2012, 81, pp. 582-590.
Li, C., et al., Complete Regression of Well-established Tumors Using a Novel Water-soluble Poly(L-Glutamic Acid)-Paclitaxel Conjugate, Cancer Research 58, AACR Journals, 2404-2409, Jun. 1, 1998.
Etrych, T., et al., N-(2Hydroxypropl) methacrylamide-based polymer conjugates with pH-controlled activation of doxorubicin. I. New Synthesis, Physicochemical Characterization and Preliminary Biological Evaluation, Journal of Applied Polymer Science, 109, Wiley, 2008: 3051-3061.
Li, L., et al., Doxorubicin-loaded, charge reversible, folate modified HPMA copolymer conjugates for active cancer cell targeting, Biomaterials 35, Elsevier, 2014:5171-5187.
Cho J., et al. Injectable and biodegradable poly (organophosphazene) hydrogel as a delivery system of docetaxel for cancer treatment, Journal of drug targeting. Jul. 1, 2013; 21(6):564-73.
Cho J., et al. Injectable delivery system of 2-methoxyestradiol for breast cancer therapy using biodegradable thermosensitive poly(organophosphazene) hydrogel, Journal of drug targeting. May 1, 2011;19(4):270-80.

(Continued)

*Primary Examiner* — Michael P Cohen
(74) *Attorney, Agent, or Firm* — Robert C. Netter, Jr.; Dann, Dorfman, Herrell & Skillman

(57) ABSTRACT

This application discloses prodrug-based thermosensitive gel ("ProGel") comprised of conjugates of dmg molecules with water-soluble polymeric carriers, which are capable of controlled release of the dmg molecules into the tissue of a subject. Use of the ProGel-Drug conjugates for treatment of various diseases or disorders and methods of preparing them are also disclosed.

23 Claims, 17 Drawing Sheets

(56) References Cited

OTHER PUBLICATIONS

Guo D., et al. Synergistic anti-tumor activity of paclitaxel-incorporated conjugated linoleic acid-coupled poloxamer thermosensitive hydrogel in vitro and in vivo, Biomaterials. Sep. 1, 2009; 30(27):4777-85.
Extended European Search Report for European Application No. 19877456.4, filed Apr. 21, 2021 mailed Sep. 12, 2022.
Jung-Kyo Cho et al., Injectable Poly(Organophosphazene) Camptothecin Conjugate Hydrogels: Synthesis, Characterization, and Antitumor Activities, Activities, European Journal of Pharmaceutics and Biopharmaceutics, Elsevier Science Publishers B.V., Amsterdam, NL, vol. 81, No. 3, Apr. 16, 2012 (Apr. 16, 2012).
Flavia Martellini, et al., Thermally Reversible Gels Based on Acryloyl-1-Proline Methyl Ester as Drug Delivery Systems, Radiation Physics and Chemistry, Elsevier, Amsterdam, NL, vol. 55, No. 2, Jun. 11, 1999 (Jun. 11, 1999), pp. 185-192.
Barbour, K.E., et al., Morbidity and Mortality Weekly Report, 2017. 66(9): p. 246.
Biomaterials, 2007. 28(11): p. 2051-2060.
Brenn, D., F. Richter, and H.G. Schaible, Arthritis & Rheumatism, 2007. 56(1): p. 351-359.
Duncan, R., Nature Reviews Drug Discovery, 2003, 2(5), 347.
Ekladious, I., et al., Nature Reviews Drug Discovery, 2019, 18(4), 273-294.
Fang, J., et al., Advanced Drug Delivery Reviews, 2011, 63(3), 136-151.
Fraioli, A., et al., BioMed Research International, 2018.
Glyn-Jones, S., et al., The Lancet, 2015. 386(9991): p. 376-387.
Goldring, S.R. and Goldring, M.B., Nature Reviews Rheumatology, 2016. 12(11): p. 632.
Jeong, B., et al., Journal of Controlled Release, 2000. 63(1): p. 155-163.
Jeong, B., S et al., Advanced Drug Delivery Reviews, 2012. 64: p. 154-162.
Kopecek, J., et al., Journal of Controlled Release, 2001, 74(1-3), 147-158.
Liu, X.-M., et al., Pharmaceutical Research, 2008, 25(12), 2910-2919.
Maeda, H., Advances in Enzyme Regulation, 2001, 41(1), 189-207.
Malfait, A.-M. and Schnitzer, T.J., Nature Reviews Rheumatology, 2013. 9(11): p. 654.
McDougall, J.J., et al,. The Anatomical Record: An Official Publication of the American Association of Anatomists, 1997. 248(1): p. 29-39).
Miller, R.J., et al., 2009, 417-449.
Quan, L.-D., et al., Arthritis Research & Therapy, 2010, 12(5), R170.
Ren, K., et al., Molecular Pharmaceutics, 2011, 8(4), 1043-1051.
Ren, K.K., Clinical immunology, 160(1), 71-81.
Richter, F., et al., Arthritis & Rheumatism, 2012. 64(12): p. 4125-4134.
Ruel-Gariépy, E. and J.-C. Leroux, European Journal of Pharmaceutics and Biopharmaceutics, 2004. 58(2): p. 409-426.
Sharma, A., et al., Open Access Rheumatology: research and reviews, 2016. 8: p. 103.
Sirova, M., et al., Pharmaceutical Research, 2010, 27(1), p. 200.
Weber, L., et al., The Development of a Macromolecular Analgesic for Arthritic Pain. Molecular Pharmaceutics, 2019.
Woolf, C.J., et al., Neuroscience, 1994. 62(2): p. 327-331.
Yuan, F., et al., Advanced Drug Delivery Reviews, 2012, 64(12), 1205-1219.
Zhu, S., et al., The Journal of clinical investigation, 2019. 129(3).
Richter, F., et al., Arthritis & Rheumatism, 2010. 62(12): p. 3806-3814.
International Search Report and Written Opinion for International Application No. PCT/US19/58237, filed Oct. 27, 2019, mailed Feb. 14, 2020.
Zimel et al., HPMA-Copolyer Nanocarrier Targets Tumor-Associated Macrophages in Primary and Metastatic Breast Cancer, Molecular Cancer Therapeutics, vol. 16, No. 12, Aug. 22, 2017 [retrieved Jan. 30, 2020], https://mct.aarcjournals.org/content/molcanther/16/12/2701.full.pdf, pp. 2701-2710.
Minko, et al., "Efficacy of the chemotherapeutic action of HPMA copolymer-bound doxorubicin in a solid tumor model of ovarian carcinoma" Int. J. Cancer (2000) 86(1):108-17.
Kashyap, et al., "Design and evaluation of biodegradable, biosensitive in situ gelling system for pulsatile delivery of insulin" Biomaterials (2007) 28(11):2051-60.

\* cited by examiner

MACROMOLECULAR PRODRUG-BASED THERMOSENSITIVE INJECTABLE GEL AS A NOVEL DRUG DELIVERY PLATFORM

CROSS-REFERENCE TO RELATED APPLICATIONS

This application is the U.S. national phase application of International Application No. PCT/US2019/058237, filed on Oct. 27, 2019, which claims priority under 35 U.S.C. § 119(e) to U.S. Provisional Patent Application No. 62/751, 119, filed on Oct. 26, 2018, the disclosures of both of which are incorporated herein by reference in their entirety.

STATEMENT REGARDING FEDERALLY SPONSORED RESEARCH OR DEVELOPMENT

This invention was made with government support under Grant No. R01 AI119090 awarded by the United States National Institutes of Health. The U.S. government has certain rights in the invention.

FILED OF THE INVENTION

The present invention relates to thermoresponsive polymer-drug conjugates as prodrugs that are soluble in water and can form hydrogels at elevated temperature so that the drug substance can be released locally under a controlled manner.

BACKGROUND OF THE INVENTION

Arthritis is a condition of joint pathology which includes more than 100 different forms of arthritis and related diseases. Inflammatory arthritis and osteoarthritis are the two most common forms of arthritis. Rheumatoid arthritis (RA) is the prototypical form of inflammatory arthritis, affecting 1-2% of the world population. Despite major advances in RA therapies, patients continue to experience significant pain, limitation of function and disability. Osteoarthritis (OA) is the most common form of arthritis, affecting over 25 million individuals in the U.S., and around 27% of adults with OA have severe joint pain (Barbour, K. E., et al., Morbidity and Mortality Weekly Report, 2017. 66(9): p. 246). The pain and activity limitation associated with arthritis are the key contributing factors to work disability, sleep disturbance, depression, and anxiety among arthritis patients (Sharma, A., et al., Open Access Rheumatology: research and reviews, 2016. 8: p. 103). Pain may be chronic or can be initiated with mechanical loading or motion (Glyn-Jones, S., et al., The Lancet, 2015. 386(9991): p. 376-387; Malfait, A.-M. and Schnitzer, T. J., Nature Reviews Rheumatology, 2013. 9(11): p. 654). In the knee, pain may originate from multiple sources including synovial and fat pad inflammation, meniscal extrusion and degeneration and ligamentous and capsular pathology, where abundant nociceptors are present to transmit signals to the dorsal root ganglion of the spinal cord (McDougall, J. J., et al. The Anatomical Record: An Official Publication of the American Association of Anatomists, 1997. 248(1): p. 29-39). New evidence suggests that subchondral innervation may also contribute to arthritis pain (Goldring, S. R. and Goldring, M. B., Nature Reviews Rheumatology, 2016. 12(11): p. 632; Zhu, S., et al., The Journal of clinical investigation, 2019. 129(3)). Inflammatory cytokines and chemokines (Richter, F., et al., Arthritis & Rheumatism, 2010. 62(12): p. 3806-3814; Brenn, D., F. Richter, and H. G. Schaible, Arthritis & Rheumatism, 2007. 56(1): p. 351-359; Richter, F., et al., Arthritis & Rheumatism, 2012. 64(12): p. 4125-4134), neuropeptides (Woolf, C. J., et al., Neuroscience, 1994. 62(2): p. 327-331) and prostaglandins are components of the biochemical milieu that mediate arthritis pain (Miller, R. J., et al., 2009, 417-449). Arthritis is the leading cause of disability among adults in the United States (Barbour, K. E., et al., Morbidity and Mortality Weekly Report, 2017. 66(9): p. 246). It is estimated that 180.9 million work-days were lost due to arthritis annually. In 2014, total medical cost for persons with a diagnosis of arthritis and joint pain was estimated to be S626.8 billion. Currently, there are no approved therapies that have been shown to cure any of the diverse forms of arthritis, but there remains a major unmet need for new therapies or drug delivery systems targeting affected joints that can reduce pain and inflammation that lead to loss of function and disability.

With respect to OA, the currently recommended treatments of joint pain and inflammation include oral nonsteroidal anti-inflammatory drugs (NSAIDs), intra-articular (IA) injection of glucocorticoids (GCs), capsaicin, or duloxetine. The mechanism by which NSAIDs exert their anti-inflammatory and analgesic effects is attributable to inhibition of the prostaglandin-generating enzyme, cyclooxygenase (COX). Although there is still no comprehensive explanation of how GCs reduce arthritis joint pain, there is robust evidence that IA administration of GCs provide an effective short-term strategy in alleviating pain and inflammation. The relatively short duration of action of the presently available GCs, the need for repeated injections, and the GC-associated adverse side effects represent major limitations to their clinical utility and efficacy (Fraioli, A., et al., BioMed Research International, 2018).

Macromolecular prodrugs, especially those based upon N-(2-hydroxypropyl)-methacrylamide (HPMA) copolymers have been used extensively in the delivery of chemotherapeutic agents for the treatment of cancer (Duncan, R., Nature Reviews Drug Discovery, 2003, 2(5), 347). Many of the prodrugs developed have been evaluated with several approved for clinical use (Ekladious, I., et al., Nature Reviews Drug Discovery, 2019, 18(4), 273-294). Most of these prodrugs are synthetic water-soluble macromolecules, which are administered systemically to benefit from the Enhanced Permeability and Retention (EPR) effect for passive tumor targeting (Fang, J., et al., Advanced Drug Delivery Reviews, 2011, 63(3), 136-151; Maeda, H., Advances in Enzyme Regulation, 2001, 41(1), 189-207). In the case of inflammatory diseases, we have shown that the macromolecular prodrug that we previously developed passively targets to sites of joint inflammation via what we have termed the "Extravasation through Leaky Vasculature and Inflammatory cell-mediated Sequestration" (ELVIS) mechanism, resulting in sustained anti-inflammatory and disease modifying effects with greatly reduced toxicity (Liu, X.-M., et al., Pharmaceutical Research, 2008, 25(12), 2910-2919; Ren, K. K., Clinical immunology, 160(1), 71-81; Quan, L.-D., et al., Arthritis Research & Therapy, 2010, 12(5), R170; Yuan, F., et al., Advanced Drug Delivery Reviews, 2012, 64(12), 1205-1219; Ren, K., et al., Molecular Pharmaceutics, 2011, 8(4), 1043-1051).

Traditionally, water-soluble polymeric drug conjugates (or macromolecular prodrugs) are extensively used for intravenous infusion in the treatment of cancer and inflammatory diseases (Kopeček, J., et al., Journal of Controlled Release, 2001, 74(1-3), 147-158; Sirova, M., et al., Pharmaceutical Research, 2010, 27(1), p. 200). HPMA copolymers have been utilized for decades as a water-soluble drug carrier to deliver hydrophobic compounds systemically. These drug conjugates have not been extensively explored as a drug depot for sustained local therapy due to the presence of lymphatic drainage, which would eventually return the prodrug to the systemic circulation. Significant increases of the molecular weight may delay the drainage of the prodrug from the injection site, but also dramatically increases its serum half-life and impedes renal clearance, resulting in extensive off-target distribution of the prodrug and associated toxicities. Therefore, new drug delivery systems are needed to overcome these issues.

SUMMARY OF THE INVENTION

The present invention provides a new drug delivery system to meet the foregoing needs and to address the limitations of the presently available intra-articular injection of glucocorticoids, using a new ProGel technology for more effective and safe management of arthritis pain and inflammation, among others.

In one aspect, the present invention provides a thermoresponsive polymer-drug conjugate, comprising a hydrophobic drug molecule moiety covalently bonded to a water-soluble polymer carrier, wherein the polymer-drug conjugate is soluble in water at a first temperature and can form a prodrug hydrogel (ProGel) at a second temperature which is higher than the first temperature, wherein the polymer-drug conjugate has a phase transition diagram dependent on conditions selected from the group consisting of content of the drug molecule moiety, construct of the polymer carrier, molecular weight of the polymer carrier, and concentration of the conjugate, and combinations thereof.

In some embodiments, the polymer carrier in the thermoresponsive polymer-drug conjugate comprises a plurality of repeating unit (A) and a plurality of repeating unit (B) to form a polymer backbone, to which are attached side chains of the repeating units (A) and (B):

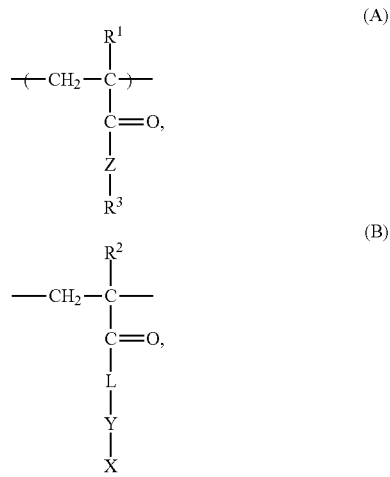

wherein:
$R^1$ and $R^2$ are independently H, methyl, or halogen;
$R^3$ is a C1-C8 alkyl substituted by one, two, or three OH groups;
X is a moiety of a drug molecule, or a pharmaceutically acceptable salt thereof;

L is a linker covalently connecting the drug molecule moiety X to the polymer backbone through Y;
Y is a functional group which, together with a part of the drug molecule moiety X or a party of the linker moiety L, forms an acid labile functional group that can be hydrolyzed under physiological or pathological conditions to release the drug molecule;
and
Z is NH or O.

In another aspect, the present invention provides a pharmaceutical composition comprising a thermoresponsive polymer-drug conjugate according to any embodiment disclosed herein and one or more pharmaceutically acceptable carriers and excipients.

In another aspect, the present invention provides a method of treating a disease or disorder, comprising administration to a subject in need of treatment a therapeutically effective amount of a thermoresponsive polymer-drug conjugate according to any embodiments disclosed herein, or a pharmaceutical composition thereof, wherein the disease or disorder is, where applicable, rheumatoid arthritis, osteoarthritis, soft tissue (e.g., tendon, ligament, bursa) inflammation and/or injury, periodontal bone loss, local infection and tissue abscess, delayed fracture union, neurological disorders (e.g., traumatic brain injury, Parkinson's disease, etc.), malignancies (e.g., liver, lung, brain tumors or metastasis, etc.), regional pain (e.g., temporal mandibular joint pain, toothache, back pain, post-surgical pain, etc.), hearing loss, ischemic heart disease, heterotopic ossification, orthopaedic joint implant loosening, reproductive dysfunction, hormone administration for high risk pregnancy, or skin aging.

In another aspect, the present invention provides a method of treating a disease or disorder, comprising administration to a subject in need of treatment a therapeutically effective amount of two or more ProGel-Drug conjugates according to any embodiments disclosed herein, or a pharmaceutical composition thereof, in order to achieve synergistic effect, wherein the two or more ProGel-Drug conjugates are optionally combined into one injection formula.

In another aspect, the present invention provides use of a thermoresponsive polymer-drug conjugate according to any embodiments disclosed herein in the manufacture of a medicament (e.g., thermoresponsive gel-based drug delivery formulation) for the treatment of a disease or disorder In another aspect, the present invention provides methods of preparing the thermoresponsive polymer-drug conjugates.

Among numerous other benefits, the drug release using the present invention is more precisely controlled. The drug release from conventional thermoresponsive hydrogel delivery systems is mainly through surface erosion, diffusion or the combination of both. In the case of ProGel, after the polymeric prodrug's release from the ProGel surface, the parent drug is released from the polymeric prodrug via local pathophysiological factors (e.g., low pH, elevated enzyme activity). The parent drug can also be released from the polymeric prodrug after the prodrug is internalized by cells with high phagocytic potential (e.g., inflammatory cells). After internalization, the prodrug is sequestered in intracellular lysosomal compartments after which the parent drug is released via lysosomal factors (e.g., low pH, reductive environment, elevated enzyme activity). The polymeric prodrug that is released from the ProGel and escapes from local activation processes, can be quickly drained through the lymphatic system and returned to circulation from which it is swiftly cleared through the kidney.

Other aspects and advantages of the present invention will be more apparent to those of ordinary skill in the art in view of the following detailed description, examples, and claims.

DETAILED DESCRIPTION OF THE INVENTION

Figure 1:
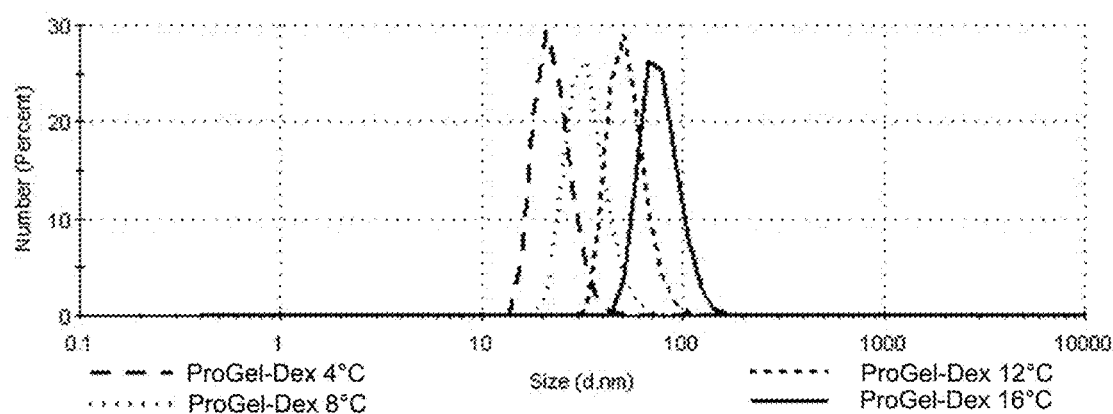
FIG. 1 illustrates the DLS profile of a ProGel-Dex solution in water at different temperatures. The measurement was performed in triplicate.

This invention was made based upon a surprising discovery of the thermoresponsive property of N-(2-hydroxypropyl)methacrylamide (HPMA) copolymer-dexamethasone (Dex) conjugates with a high Dex content.

Specifically, when the dexamethasone (Dex) content in HPMA copolymer-Dex conjugate was increased to unusually high levels ($\geq 19$ wt %) and the polymeric prodrug concentration was maintained at equal or greater than 12.5 w/v %, the water-soluble polymeric prodrug demonstrated thermoresponsive phase transition behavior. They are free-flowing aqueous solutions at below 12° C., but form a hydrogel when the temperature was raised to above 28° C. Although multiple polymers with thermoresponsive properties have been described previously, this is the first example of a water-soluble polymeric prodrug design that is thermoresponsive and forms a hydrogel at an elevated temperature (cf. Ruel-Gariépy, E. and J.-C. Leroux, European Journal of Pharmaceutics and Biopharmaceutics, 2004. 58(2): p. 409-426; Jeong, B., et al., Journal of Controlled Release, 2000.63 (1): p. 155-163; Jeong, B., S et al., Advanced Drug Delivery Reviews, 2012. 64: p. 154-162). To differentiate from the nomenclature of P-Dex (Dex content at $\leq 10$ wt %) that was used previously to describe the HPMA copolymer-Dex conjugate for systemic administration, here the new HPMA copolymer-Dex conjugate with unusually high Dex content ($\geq 19$ wt %) for local administration is named "Prodrug-based hydrogel for Dex" or "ProGel-Dex". Other ProGel-drug conjugates are named accordingly.

In one aspect, the present invention provides a thermoresponsive polymer-drug conjugate, comprising a hydrophobic drug molecule moiety covalently bonded to a water-soluble polymer carrier, wherein the polymer-drug conjugate is soluble in water at a first temperature and can form a prodrug hydrogel (ProGel) at a second temperature which is higher than the first temperature, wherein the polymer-drug conjugate has a phase transition diagram dependent on conditions selected from the group consisting of content of the drug molecule moiety, construct of the polymer carrier, molecular weight of the polymer carrier, and concentration of the conjugate, and combinations thereof.

In some embodiments, the polymer carrier in the thermoresponsive polymer-drug conjugate is a synthetic non-degradable polymer selected from the group consisting of N-(2-hydroxypropyl)-methacrylamide (HPMA) copolymer, polyethylene glycol, polyoxazoline, and water-soluble copolymers comprising one or more monomers selected from the group consisting of N-(2-hydroxypropyl)methacrylamide, N-isopropylacrylamide, acrylamide, N,N-dimethylacrylamide, N-vinylpyrrolidone, vinyl acetate, 2-methacryloxyethyl glucoside, acrylic acid, methacrylic acid, vinyl phosphonic acid, styrene sulfonic acid, maleic acid, 2-methacrylloxy-ethyltrimethylammonium chloride, methacrylamidopropylt-rimethylammonium chloride, methacryloylcholine methyl sulfate, N-methylolacrylamide, 2-hydroxy-3-methacryloxy-propyltrimethyl ammonium chloride, 2-methacryloxyethyl-trimethylammonium bromide, 2-vinyl-1-methylpyridinium bromide, 4-vinyl- 1-methylpyridinium bromide, ethyleneimine, (N-acetyl)ethyleneimine, (N-hydroxyethyl)ethyleneimine, allylamine, and combinations thereof.

In some embodiments, the polymer carrier in the thermoresponsive polymer-drug conjugate is a biodegradable polymer selected from the group consisting of chitosan, hyaluronic acid, polyglutamic acid, polyaspartic acid, dextran, starch, alginate, gelatin, xanthan gum, pectin, carrageenan, guar gum, cellulose ether (e.g., hydroxypropylmethyl cellulose (HPMC), hydroxypropyl cellulose (HPC), hydroxyethyl cellulose (HEC), and sodium carboxy methyl cellulose (Na-CMC)).

In some embodiments, the polymer carrier in the thermoresponsive polymer-drug conjugate, sometimes preferred, is a copolymer comprising N-(2-hydroxypropyl)methacrylamide monomer units.

In some embodiments, the polymer carrier in the thermoresponsive polymer-drug conjugate comprises a plurality of repeating unit (A) and a plurality of repeating unit (B) to form a polymer backbone, to which are attached side chains of the repeating units (A) and (B):

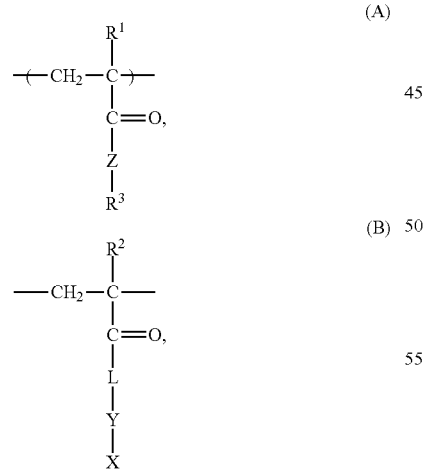

wherein:
$R^1$ and $R^2$ are independently H, methyl, or halogen;
$R^3$ is a C1-C8 alkyl substituted by one, two, or three OH groups;
X is a moiety of a drug molecule, or a pharmaceutical acceptable salt thereof;
L is a linker covalently connecting the drug molecule moiety X to the polymer backbone through Y;

Y is a functional group which, together with a part of the drug molecule moiety X or a party of the linker moiety L, forms an acid labile functional group that can be hydrolyzed under physiological conditions to release the drug molecule;
and
Z is NH or O.

In some embodiments, in the repeating unit (A) and repeating unit (B) of the polymer carrier in the thermoresponsive polymer-drug conjugate:
$R^1$ and $R^2$ each H or methyl;
$R^3$ is C2-C5 alkyl substituted by one or two OH groups;
L is —[NH(CH2)iC(O)]j-, —NH(CH2)k-, —NH(CH2)k-T-(CH2)p-, —NH(CH2)$_k$NHC(O)—, —NH(CH2)$_k$NH—(CH2)p-T-(CH2)q-C(O)—, or —NH(CH2)$_k$NHC(O)—(CH2)p-T-(CH2)q-C(O)—, wherein T is C6-C10 arylene, C3-C8 cycloalkylene, 5- to 10-membered heteroarylene, or 5- to 10-membered heterocycloalkylene, wherein i is an integer selected from 1 to 6; j is integer selected from 1 to 4; k is an integer selected from 1 to 10; p is 0, 1, 2, or 3; and q is 0, 1, 2, or 3;
Y is O, NH, or NH—N= (wherein "=" is a double bond); and
Z is NH.

In some embodiments, in the linker L of the repeating unit (B) in the polymer carrier:
i is 1 or 2;
j is 1, 2, or 3;
k is an integer selected from 1 to 6
p is 0, 1, or 2;
q is 0, 1, or 2.

In some embodiments, in the repeating unit (B) of the polymer carrier in the thermoresponsive polymer-drug conjugate:
L is —[NHCH2C(O)]j-, —NH(CH2)k, —NH(CH2)k-T-CH2—, or —NH(CH2)$_k$NHC(O)-T-C(O)—, wherein T at each occurrence is independently C6-C10 arylene or 5- to 10-membered heteroarylene; j is 2 or 3; and k is 2, 3, or 4.

In some embodiments, sometimes preferred, in the repeating unit (A) and repeating unit (B) of the polymer carrier in the thermoresponsive polymer-drug conjugate:
$R^1$ and $R^2$ are each methyl;
$R^3$ is a —CH2CH(OH)CH3;
L is —NHCH2C(O)NHCH2C(O)—, —NH(CH2)3—,

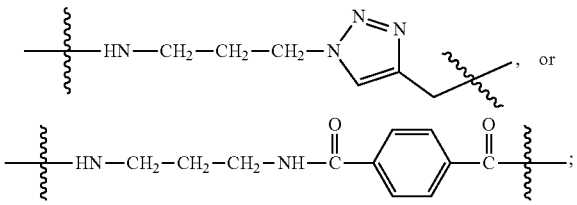

Y is O, NH, or NH—N=; and
Z is NH.

In some embodiments, in the thermoresponsive polymer-drug conjugate, the drug molecule is selected from the group consisting of: glucocorticoids (e.g., cortisol or hydrocortisone, cortisone, prednisone, prednisolone, methylprednisolone, betamethasone, triamcinolone, fludrocortisone acetate, etc.), nonsteroidal anti-inflammatory drugs (NSAIDS) (e.g., Aspirin, Ibuprofen, Indomethacin, Piroxicam, Mefenamic acid, Lumiracoxib, Licofelone, Sinomenine, etc.), analgesics (e.g., hydromorphone, oxycodone, sinomenine, capsaicin, resiniferatoxin, etc.), bone anabolic agents (e.g., GSK inhibitors, tanshinone IIA, statins, prostaglandin E1, E2 and prostaglandin EP receptor agonists, etc.), antioxidants (e.g., tanshinone IIA, curcumin, vitamin E, apigenin, etc.), anticancer agents (e.g., paclitaxel, camptothecins, docetexal, doxorubicin, kinase pathway inhibitors (e.g., cytoplasmic tyrosine kinases), methotrexate, etc.), hormones (e.g., testosterone, estradiol, progesterone, etc.), and antibiotics (e.g., fluoroquinolones, macrolides, cephalosporins, and apigenin which shares anti-oxidant and antibacterial activity etc.).

In some embodiments, sometimes preferred, in the thermoresponsive polymer-drug conjugate, the drug molecule is selected from the group consisting of dexamethasone, tanshinone IIA, progesterone, estradiol, curcumin, hydromorphone, sinomenine, and apigenin.

In some embodiments, sometimes preferred, in the repeating unit (A) and repeating unit (B) of the polymer carrier in the thermoresponsive polymer-drug conjugate:

the repeating unit (A) is an N-(2-hydroxypropyl)methacrylamide monomer having a structure of formula:

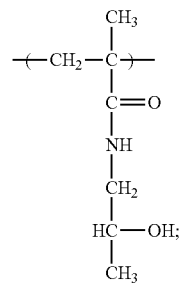

and the repeating unit (B) has a structure selected from the group consisting of:

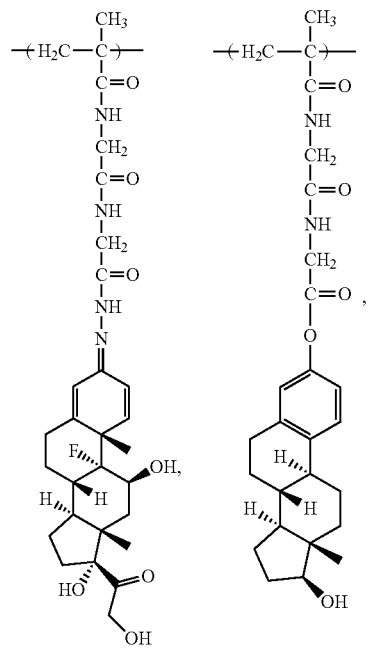

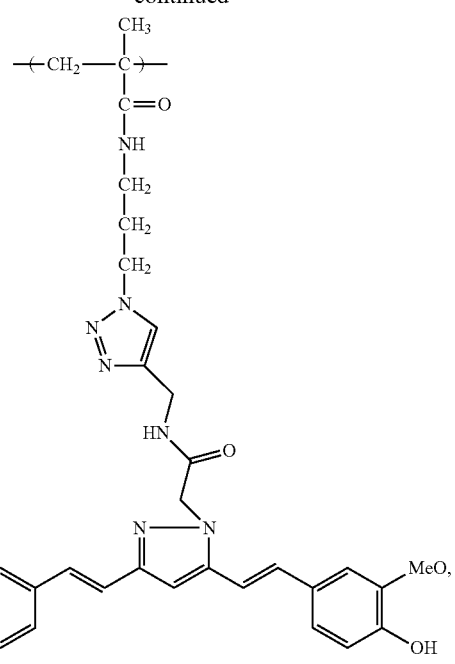

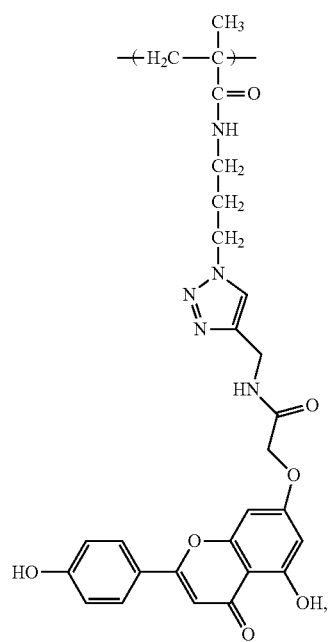

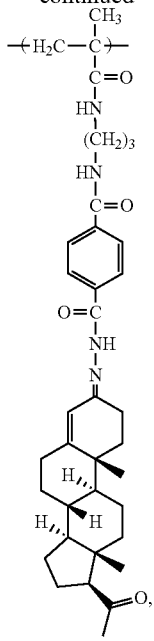
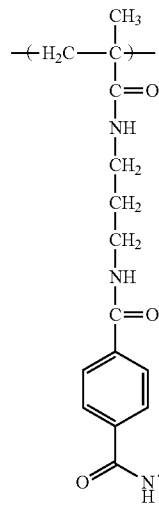
In some embodiments, sometimes preferred, in the thermoresponsive polymer-drug conjugate, the plurality of repeating unit (A) is n, and the plurality of repeating unit (B) is m; and polymer-drug conjugate has a formula selected from the group consisting of:
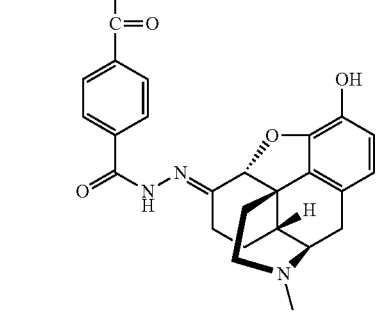
(ProeGel-Dex)

13
-continued
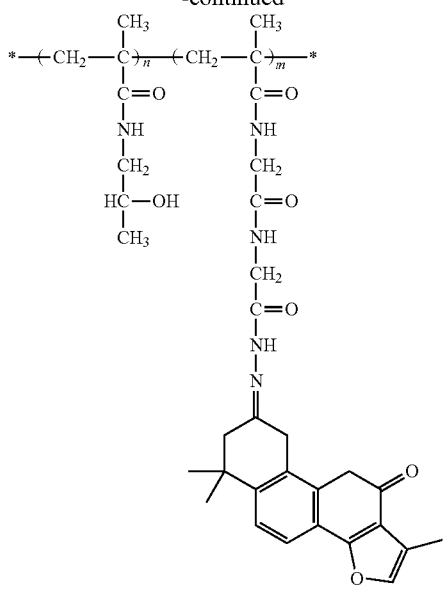
(ProeGel-Tan)
14
-continued
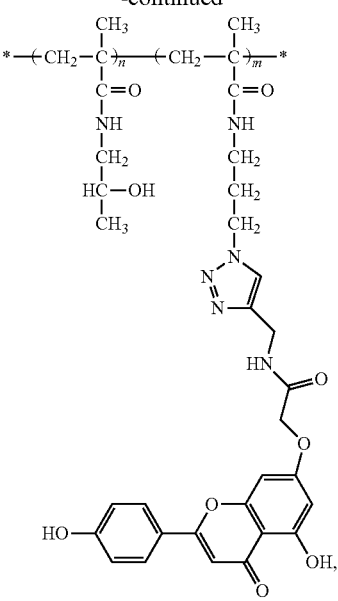
(ProGel-Apigenin)
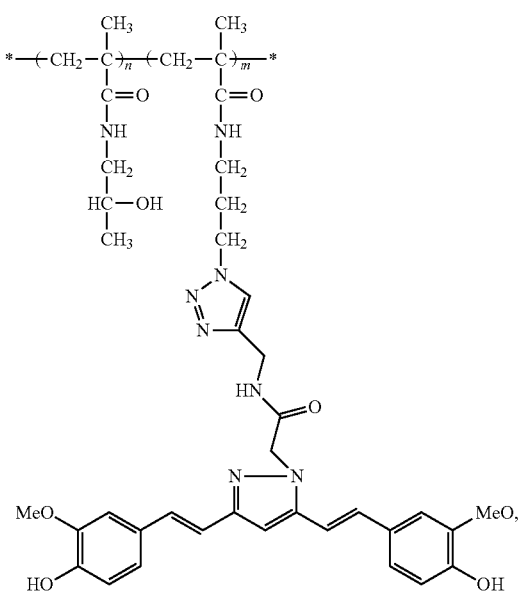
(ProGel-Curcumin)
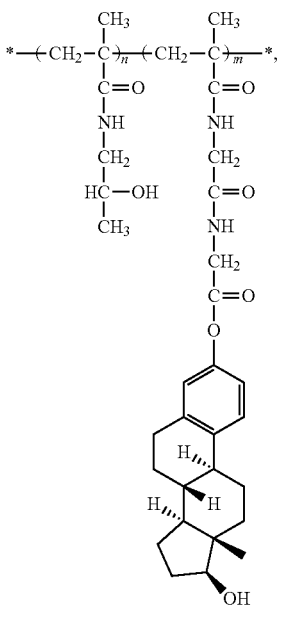
(ProGel-Estradiol)

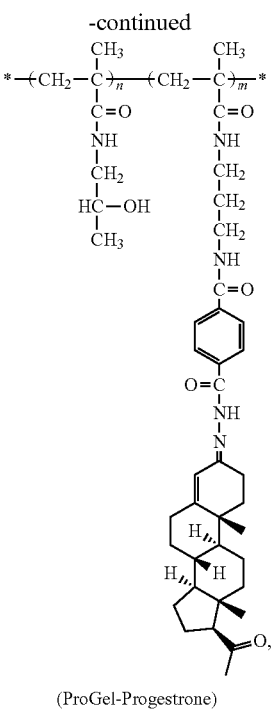

(ProGel-Progestrone)

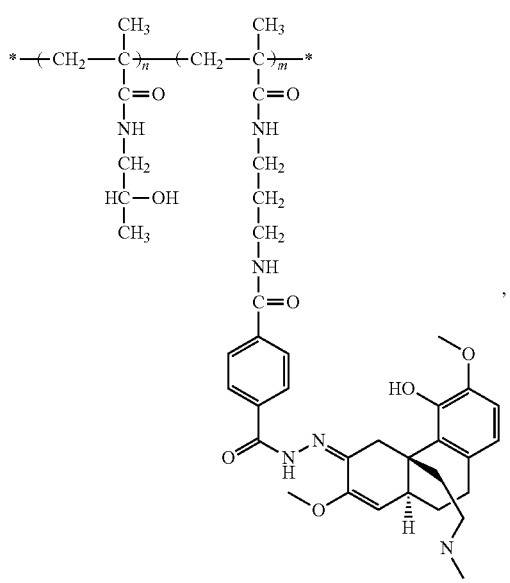

(ProGel-Sinonemine)

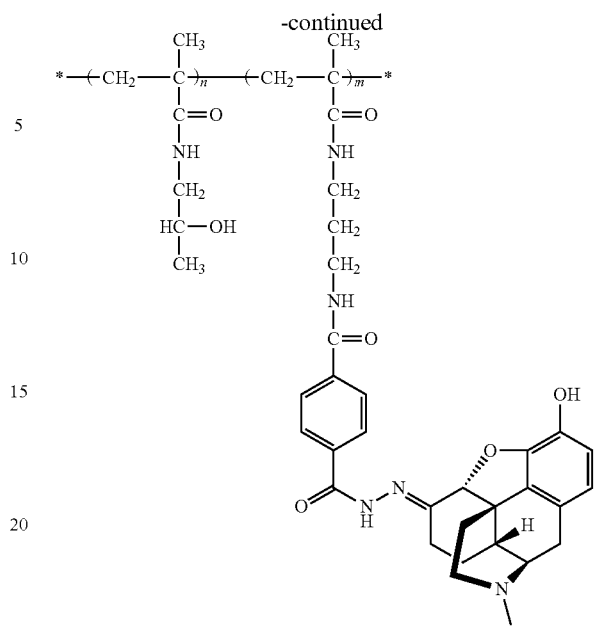

(ProGel-Hydromorphone)

wherein n and m indicate the total numbers of the repeating units (A) and (B), respectively, in the polymer-drug conjugate; and wherein the repeating units (A) and the repeating units (B) are arranged in any orders such that the polymer-drug conjugate maintains the thermoresponsive property.

In some embodiments, sometimes preferred, the thermoresponsive polymer-drug conjugate is a polymer-dexamethasone conjugate (ProGel-Dex), wherein Dex content is in the range of about 15-40 wt %, the ProGel-Dex concentration is in the range of about 10-50 w/v %, and the ProGel-Dex molecular weight is in the range of about 1-45 kDa.

In some embodiments, sometimes preferred, the thermoresponsive polymer-drug conjugate is a polymer-tanshinone IIA conjugate (ProGel-Tan), wherein the ProGel-Tan comprises tanshinone IIA in the range of about 12-40 wt %; wherein ProGel-Tan concentration is in the range of about 10-50 w/v %; and the ProGel-Tan molecular weight is in the range of about 1-45 kDa.

In another aspect, the present invention provides a pharmaceutical composition comprising a thermoresponsive polymer-drug conjugate according to any embodiment disclosed herein and one or more pharmaceutically acceptable carriers and excipients.

In another aspect, the present invention provides a method of treating a disease or disorder, comprising administration to a subject in need of treatment a therapeutically effective amount of a thermoresponsive polymer-drug conjugate according to any embodiments disclosed herein, or a pharmaceutical composition thereof, wherein the disease or disorder is, where applicable, rheumatoid arthritis, osteoarthritis, soft tissue (e.g., tendon, ligament, bursa) inflammation and/or injury, periodontal bone loss, local infection and tissue abscess, delayed fracture union, neurological disorders (e.g., traumatic brain injury, Parkinson's disease, etc.), malignancies (e.g., liver, lung, brain tumors or metastasis, etc.), regional pain (e.g., temporal mandibular joint pain, toothache, back pain, post-surgical pain, etc.), hearing loss, ischemic heart disease, heterotopic ossification, orthopaedic joint implant loosening, reproductive dysfunction, hormone administration for high risk pregnancy, or skin aging.

In another aspect, the present invention provides a method of treating a disease or disorder, comprising administration to a subject in need of treatment a therapeutically effective amount of two or more ProGel-Drug conjugates according to any embodiments disclosed herein, or a pharmaceutical composition thereof, in order to achieve synergistic effect, wherein the two or more ProGel-Drug conjugates are optionally combined into one injection formula.

In one embodiment, the ProGel-Drug conjugates are selected from the group consisting of ProGel-antibiotics, ProGel-anti-inflammatories and ProGel-bone anabolic agents, and they are combined together into a single ProGel formulation for the treatment of periodontitis and associated bone loss.

In another embodiment, the ProGel-Drug conjugates are ProGel-opioid and ProGel-anti-inflammatories combined into one single ProGel formulation for treatment of pain, such as backpain, etc.

In another embodiment, the ProGel-Drug conjugate(s) is (are) administered through intra-articular, intradermal, intraperitoneal, intramuscular, intravitreal, intravaginal, intracranial, epidural, intracardiac, or musculoskeletal soft tissues (e.g., tendon, ligament, bursa), wherein the capacity of the ProGel is retained at tissue sites, e.g. subcutaneous tissues, to slowly release active drug.

In another embodiment, the ProGel-Drug conjugate(s) is (are) formulated into a spay that can be applied to an open wound or surgical field, or applied to inflamed skin at sites of inflammation, e.g., eczema, psoriasis, etc.

In another aspect, the present invention provides use of a thermoresponsive polymer-drug conjugate according to any embodiments disclosed herein in the manufacture of a medicament (e.g., thermoresponsive gel-based drug delivery formulation) for the treatment of a disease or disorder selected from the group consisting of rheumatoid arthritis, osteoarthritis, soft tissue (e.g., tendon, ligament, bursa) inflammation and/or injury, periodontal bone loss, local infection and tissue abscess, delayed fracture union, neurological disorders (e.g., traumatic brain injury, Parkinson's disease, etc.), malignancies (e.g., liver, lung, brain tumors or metastasis, etc.), regional pain (e.g., temporal mandibular joint pain, toothache, back pain, post-surgical pain, etc.), hearing loss, ischemic heart disease, heterotopic ossification, orthopaedic joint implant loosening, reproductive dysfunction, hormone administration for high risk pregnancy, and skin aging, etc.

In another aspect, the present invention provides a method of synthesizing a thermoresponsive polymer-drug conjugate, comprising the steps of: (a) coupling a monomer covalently with a drug molecule through a linker; and (b) co-polymerizing the monomer of step (a) with a second monomer comprising a polar functional group to form the polymer-drug conjugate.

In another aspect, the present invention provides a method of synthesizing a thermoresponsive polymer-drug conjugate, comprising the steps of: (a') co-polymerizing a monomer comprising a polar functional group with a second monomer comprising a linker moiety to form a co-polymer; and (b') reacting the copolymer with a drug molecule through the linker to form a polymer-drug conjugate.

In some embodiments, the method of preparing the polymer-drug conjugate ProGel-Dex comprises the steps of: (a) reacting a OH-protected dexamethasone derivative with hydrazine to form a dexamethasone hydrazone derivative; (b) reacting the dexamethasone derivative of step (a) with N-methacryl-diglycine to form a monomer-Dex conjugate having a formula of MA-Gly-Gly-NHN=Dex; and (c) co-polymerizing the monomer-Dex conjugate with a second monomer comprising one or more polar functional group(s) such that the copolymer-Dex conjugate possesses a thermoresponsive property.

In some embodiments, the invention provides methods of preparing thermoresponsive polymer-drug conjugate according to any embodiments as substantially described and shown.

Any terms in the present application, unless specifically defined, will take the ordinary meanings as understood by a person of ordinary skill in the art.

As used herein, the singular forms "a", "an", and "the" include plural reference, and vice versa, unless the context clearly dictates otherwise.

Unless otherwise stated, the terms used in the specification and claims have the meanings described below.

"Alkyl" refers to a saturated aliphatic hydrocarbon group including $C_1$-$C_{12}$ straight chain and branched chain groups. Preferably an alkyl group is an alkyl having 1 to 8, sometimes more preferably 1 to 6, sometimes even more preferably 1 to 4, carbon atoms. Representative examples include, but are not limited to methyl, ethyl, n-propyl, isopropyl, n-butyl, isobutyl, sec-butyl, n-pentyl, or the like.

"Alkylene" refers to a divalent alkyl group. Examples include methylene (—$CH_2$—), ethylene (—$CH_2CH_2$—), or the like.

"Aryl" refers to a all-carbon monocyclic ring or a polycyclic fused ring having a completely conjugated pi-electron system. Preferably aryl contains 6 to 10 carbons, such as phenyl and naphthyl, and more preferably phenyl.

"Arylene" refers to a divalent aryl group, for example, 1,4-phenylene, 1,2-phenylene.

"Cycloalkyl" refers to a saturated monocyclic hydrocarbon group having 3 to 8 carbon atoms, preferably 3 to 6 carbon atoms. Representative examples of monocyclic cycloalkyls include, but are not limited to, cyclopropyl, cyclobutyl, cyclopentyl, and cyclohexyl, or the like.

"Cycloalkylene" refers to a divalent cycloalkyl group, for example, 1,4-cyclohexylene, 1,2-cyclopropylene, or the like.

"Halogen" refers to fluoro, chloro, bromo or iodo atoms, sometimes preferably chloro or fluoro, and sometimes more preferably chloro.

"Heterocyclyl" refers to a 3 to 10-membered saturated and/or partially unsaturated monocyclic or polycyclic hydrocarbon group having one or more heteroatoms selected from the group consisting of N, O, and S(O)m (wherein m is 0, 1, or 2) as ring atoms, but excluding —O—O—, —O—S— or —S—S— in the ring, the remaining ring atoms being C. Preferably, heterocyclyl is a 5 to 10-membered having 1 to 3 heteroatoms; more preferably a 5 to 6-membered having 1 to 2 heteroatoms. Representative examples of monocyclic heterocyclyls include, but are not limited to, pyrrolidyl, piperidyl, piperazinyl, morpholinyl, or the like.

"Heterocyclylene" refers to a divalent heterocyclyl group, which has two different ring carbon atoms covalently bonded to other groups in the molecule.

"Heteroaryl" refers to an aryl system having 1 to 3 heteroatoms selected from the group consisting of O, S and N as ring atoms and having 5 to 10 annular atoms, preferably 5- or 6-membered, for example, thiadiazolyl, pyrazolyl, oxazolyl, oxadiazolyl, imidazolyl, triazolyl, thiazolyl, furyl, thienyl, pyridyl, pyrrolyl, N-alkyl pyrrolyl, pyrimidinyl, pyrazinyl, imidazolyl, tetrazolyl, or the like.

"Heteroarylene" refers to a divalent heteroaryl group, which has two different ring carbon atoms covalently bonded to other groups in the molecule.

A "pharmaceutical composition" refers to a mixture of one or more of the compounds described in the present invention and other chemical components such as physiologically/pharmaceutically acceptable carriers and excipients. The purpose of a pharmaceutical composition is to facilitate administration of a compound to an organism, which is conducive to the absorption of the active ingredient and thus displaying biological activity.

In the thermoresponsive ProGel-drug conjugate, the drug moiety may exist as a free acid, a free base, or a "pharmaceutically acceptable salt" forms.

"Pharmaceutically acceptable salts" refer to salts of the compounds of the invention, such salts being safe and effective when used in a mammal and have corresponding biological activity. Acids commonly employed to form pharmaceutically acceptable salts include inorganic acids such as hydrochloric acid, hydrobromic acid, hydroiodic acid, sulfuric acid, phosphoric acid, hydrogen bisulfide as well as organic acids, such as para-toluenesulfonic acid, salicylic acid, tartaric acid, bitartaric acid, ascorbic acid, maleic acid, besylic acid, fumaric acid, gluconic acid, glucuronic acid, formic acid, glutamic acid, methanesulfonic acid, ethanesulfonic acid, benzenesulfonic acid, lactic acid, oxalic acid, para-bromophenylsulfonic acid, carbonic acid, succinic acid, citric acid, benzoic acid, acetic acid, and related inorganic and organic acids.

The cations of pharmaceutically acceptable salts include, but are not limited to, lithium, sodium, potassium, calcium, magnesium, and aluminum, as well as nontoxic quaternary amine cations such as ammonium, tetramethylammonium, tetraethylammonium, methylamine, dimethylamine, trimethylamine, triethylamine, diethylamine, ethylamine, tributylamine, pyridine, N,N-dimethylaniline, N-methylpiperidine, and N-methylmorpholine.

The term "therapeutically effective amount," as used herein, refers to the total amount of each active component that is sufficient to show a meaningful patient benefit. When applied to an individual active ingredient, administered alone, the term refers to that ingredient alone. When applied to a combination, the term refers to combined amounts of the active ingredients that result in the therapeutic effect, whether administered in combination, serially, or simultaneously.

The term "pharmaceutically acceptable," as used herein, refers to those compounds, materials, compositions, and/or dosage forms which are, within the scope of sound medical judgment, suitable for use in contact with the tissues of patients without excessive toxicity, irritation, allergic response, or other problem or complication commensurate with a reasonable benefit/risk ratio, and are effective for their intended use.

The term "subject" or "patient" includes both human and other mammals, especially domestic animals, for example, dogs, cats, horses, or the like.

The term "treating" refers to: (i) inhibiting the disease, disorder, or condition, i.e., arresting its development; and (ii) relieving the disease, disorder, or condition, i.e., causing regression of the disease, disorder, and/or condition. In addition, the compounds of present invention may be used for their prophylactic effects in preventing a disease, disorder or condition from occurring in a subject that may be predisposed to the disease, disorder, and/or condition but has not yet been diagnosed as having it.

It is well known to those skilled in the art that the dosage of a drug depends on a variety of factors, including but not limited to, the following factors: activity of the specific compound, age, weight, general health, behavior, diet of the patient, administration time, administration route, excretion rate, drug combination and the like.

As used herein, the term "about" generally includes up to plus or minus 10% of the indicated number. For example, "about 10%" may indicate a range of 9% to 11%, and "about 20" may mean from 18 to 22. Sometimes preferably, the term "about" includes up to plus or minus 5% of the indicated value.

As disclosed herein, a number of ranges of numeric values are provided. It is understood that each intervening value, to the tenth of the unit of the lower limit, unless the context clearly dictates otherwise, between the upper and lower limits of that range is also specifically disclosed.

The ProGel technology is a platform technology that can deliver multiple categories of drugs. In addition to Dex, we have synthesized thermoresponsive HPMA copolymer-antioxidant (i.e., curcumin and tanshinone) conjugates (ProGel-Curcumin, ProGel-Tan), HPMA copolymer-hormone (i.e., progesterone and estrogen) conjugates (ProGel-Pro, ProGel-Estrogen), HPMA copolymer-antimicrobial/antioxidant (i.e., apigenin) conjugate (ProGel-Apigenin) and HPMA copolymer opioid (i.e., hydromorphone) (ProGel-HMP). These polymeric prodrugs all showed thermoresponsive functions that form a hydrogel at elevated temperature. In addition to the use of the neutral HPMA copolymer as a drug carrier, positively charged chitosan and negatively charged hyaluronic acid can also serve as a hydrophilic polymer carrier in preparation of ProGel of different drug composition.

Compared to other thermosensitive hydrogels, ProGel provides various additional advantages. The ProGel platform is optimally suited to modification of the drug loading capacity. According to the phase-transition diagram of the ProGel-Dex shown below, the ProGel can be formed at a wide range of drug loading and polymeric prodrug concentrations. Especially, since the thermoresponsive function of the ProGel is based upon the covalent introduction of hydrophobic drug molecules, the ProGel drug loading capacity is high. For example, a ProGel-Dex formulation may have ~50 mg/mL Dex content. This capacity widens the utility of the hydrogel for local injection in the cases of limited injection space. As is shown below, the preclinical data shows that 60 µL ProGel-Dex is retained in the arthritic rat's synovial cavity over 1 month.

Compared to conventional water-soluble polymeric prodrugs, the ProGel technology is also advantageous in its targeting specificity. For systemically administered polymeric prodrugs, their passive targeting to solid tumors and sites of inflammation are governed by the well-established EPR and ELVIS mechanisms, respectively. A high molecular weight is necessary to attain high serum half-life and more significant passive targeting to sites of pathology. A consequence of this required high molecular weight is the off-target distribution of the prodrug to the mononuclear phagocyte system (MPS). In the case of ProGel, the distribution of the prodrug is exclusively determined by the injection location and the sustained local presence of the prodrug is due to the capacity of the ProGel to form a gel that is physically retained at the injection site. Due to the thermoresponsive gel formation, even polymeric prodrugs with very low molecular weight can remain at the injection site for an extended time. As shown in the optical imaging data, once released from the ProGel, the low molecular weight polymeric prodrug (~5 kDa) is rapidly cleared via the kidney without MPS sequestration.

Macromolecular prodrugs based on water-soluble polymers (e.g., HPMA copolymer, PEG, Chitosan, hyaluronic acid, etc.) have been used extensively as nanomedicine to improve the treatment of many different diseases, including cancer and inflammatory pathologies. They offer the advantages of improving water-solubility of the parent drug, passive targeting to tumor and/or inflammation, stability and prolonged half-life in circulation, and site-specific and pathophysiological factor-driven drug activation.

All prior utility of these prodrugs was in the form of regular liquid formulations to be administered as intravenous, subcutaneous, intraperitoneal, or intramuscular injections. They are designed as systemic administrations. Therefore, these polymeric prodrugs must be highly water soluble. The presence of micellization and aggregation may interfere with the prodrug activation. Precipitation or gelation at the injection site are undesirable for their intended systemic application. To the best of our knowledge, there has not been any report about the gelation of these polymeric prodrugs at elevated temperature. This is because the hydrophobic drug content of these prodrugs has always been maintained at a relatively lower level, in order to achieve good water-solubility. For example, for the original HPMA copolymer-dexamethasone conjugate (P-Dex), which was developed as a systemic therapy for the treatment of inflammatory arthritis, the Dex content has always been kept at less than 12 mol % to provide good water-solubility and to avoid intra/intermolecular micellization or aggregation.

Figure 2:
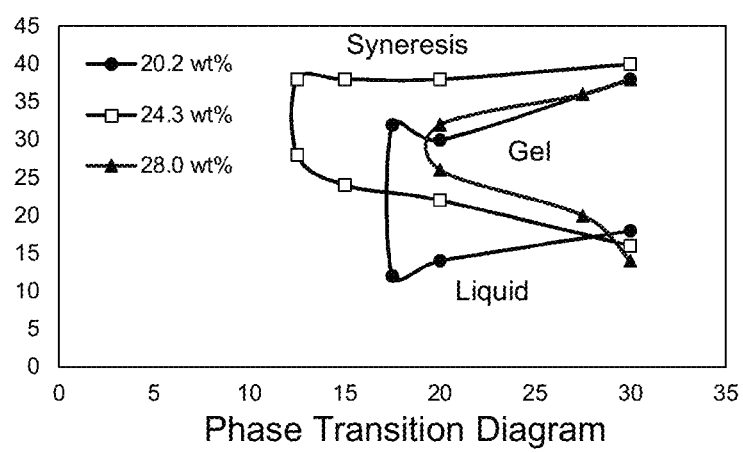
FIG. 2 illustrates a ProGel-Dex phase transition diagram.

For the newly invented macromolecular prodrug-based thermosensitive injectable gels, or ProGel, their intended applications are for local therapeutic intervention. The general chemical structures of these prodrugs are similar to the regular water-soluble polymeric prodrugs, consisting of the same comonomers. But the hydrophobic drug content of the thermosensitive gel prodrugs has to be increased to create proper amphiphilic properties, which would lead to the prodrugs' good water-solubility at lower temperature and their phase transition to a hydrogel at elevated temperature. As shown in the following example FIG. 2, for HPMA copolymer-dexamethasone conjugates, we found that when the Dex content is between 17-22 mol % and the macromolecular prodrug concentration in water is >15 wt %, they form a clear free flow solution at lower temperature but can form a gel when the temperature is elevated above room temperature.

Because of the phase transition property of the polymeric prodrugs with higher hydrophobic drug content at higher concentration, they may be directly administered in vivo at known sites of disease pathology. Upon administration, the gelation process physically traps the prodrug locally within the tissue, creating prodrug depots. The prodrug is then slowly released from the gel surface through a dilution/activation/dissolution process by the interstitial fluid. If the prodrug release rate needs to be adjusted, the drug content and prodrug concentration can be systematically modified. Ice-pad application may also be applied locally to lower the tissue temperature in order to reduce the gel viscosity and increase prodrug release.

Different from the conventional thermosensitive gel-based drug delivery systems in which the low molecular weight drugs are physically trapped within the gel, in the new prodrug-based thermosensitive gel (which we have designated as "ProGel"), the drug molecules are chemically conjugated to the water-soluble polymeric carriers. This not only provides better control of the drug release but also shifts the drug's cellular entry pattern from diffusion to phagocytosis/macropinocytosis, which renders the prodrug cellular entry cell-selective. Only those cells with high phagocytosis/micropinocytosis capacity (e.g., inflammatory cells) will be able to internalize the polymeric prodrug released from the gel surface.

Importantly, because of the thermoresponsive gelation property, the prodrugs' local retention does not necessitate that the prodrug be of high molecular weight. Therefore, we are able to design polymeric prodrugs with low molecular weight (i.e., ~5 kDa), which would allow the prodrug's swift clearance via the kidney once the drug dissolves and migrates into circulation. This novel strategy will avoid the potential sequestration of the polymeric prodrugs by cells of the mononuclear phagocyte system (MPS, including liver and spleen), thereby reducing the risk for unanticipated off-target toxicities.

The macromolecular prodrug-based thermosensitive injectable gel described in this invention is a novel platform technology, which has broad application for essentially all water-soluble polymers-based prodrug conjugates. For synthetic non-degradable polymeric carrier systems, this includes, but is not limited to, HPMA copolymer, polyethylene glycol, polyoxazoline or other water-soluble copolymers wherein the polymer comprises one or more monomers selected from the group consisting of N-(2-hydroxypropyl) methacrylamide, N-isopropylacrylamide, acrylamide, N,N-dimethylacrylamide, N-vinylpyrrolidone, vinyl acetate, 2-methacryloxyethyl glucoside, acrylic acid, methacrylic, vinyl phosphonic acid, styrene sulfonic acid, maleic acid, 2-methacrylloxyethyltrimethylammonium chloride, methacrylamidopropyltrimethylammonium chloride, methacryloylcholine methyl sulfate, N-methylolacrylamide, 2-hydroxy-3-methacryloxypropyltrimethyl ammonium chloride, 2-methacryloxyethyltrimethylammonium bromide, 2-vinyl-1-methylpyridinium bromide, 4-vinyl-1-methylpyridinium bromide, ethyleneimine, (N-acetyl)ethyleneimine, (N-hydroxyethyl)ethyleneimine, allylamine and combinations thereof. For biodegradable polymeric carrier systems, this may include, but is not limited to, chitosan, hyaluronic acid, polyglutamic acid, polyaspartic acid, dextran, starch, alginate, gelatin, xanthan gum, pectin, carrageenan, guar gum, cellulose ether (e.g., hydroxypropylmethyl cellulose or HPMC, hydroxypropyl cellulose or HPC, hydroxyethyl cellulose or HEC, sodium carboxy methyl cellulose or Na-CMC).

As shown below in the examples, dexamethasone (Dex) is the first model payload drug that we have worked with. The thermoresponsive HPMA copolymer-dexamethasone conjugate has been designated, "ProGel-Dex". There are a broad spectrum of additional drug payload candidates that include, but are not limited to, glucocorticoids (e.g., cortisol or hydrocortisone, cortisone, prednisone, prednisolone, methylprednisolone, betamethasone, triamcinolone, fludrocortisone acetate, etc.), nonsteroidal anti-inflammatory drugs (NSAIDS) (e.g., Aspirin, Ibuprofen, Indomethacin, Piroxicam, Mefenamic acid, Lumiracoxib, Licofelone, Sinomenine, etc.), analgesics (e.g., hydromorphone, oxycodone, sinomenine, capsaicin, resiniferatoxin, etc.), bone anabolic agents (e.g., GSK inhibitors, tanshinone IIA, statins, prostaglandin E1, E2 and prostaglandin EP receptor agonists, etc.), antioxidants (e.g., tanshinone IIA, curcumin, vitamin E, apigenin, etc.), anti-cancer drugs (e.g., paclitaxel, camptothecins, docetexal, doxorubicin, kinase pathway inhibitors (e.g., cytoplasmic tyrosine kinases), methotrexate, etc.), hormones (e.g., testosterone, estradiol, progesterone, etc.) and antibiotics (e.g., fluoroquinolones, macrolides, cephalosporins, and apigenin which shares anti-oxidant and antibacterial activity etc.). Some of these drugs are being developed as prodrug-based thermosensitive gels are shown below as examples. In addition to rheumatoid arthritis and osteoarthritis, other classes of diseases may also benefit from this unique prodrug thermoresponsive gel-based drug delivery formulation. These include, but are not limited to, soft tissue (e.g. tendon, ligament, bursa) inflammation and/or injury, periodontal bone loss, local infection and tissue abscess, delayed fracture union, neurological disorders (e.g., traumatic brain injury, Parkinson's disease, etc.), malignancies (e.g., liver, lung, brain tumors or metastasis, etc.), regional pain (e.g., temporal mandibular joint pain, toothache, back pain, post-surgical pain, etc.), hearing loss, ischemic heart disease, heterotopic ossification, orthopaedic joint implant loosening, reproductive dysfunction, hormone administration for high risk pregnancy, skin aging, etc.

We believe this novel ProGel platform drug delivery technology will shift the current delivery paradigm and holds great promise to significantly improve the sustainability, efficacy and safety of locally delivered therapeutic agents. The following non-limiting examples further illustrate certain aspects of the invention.

EXAMPLES

Example 1

1. Synthesis of Dex Monomer
   (MA-Gly-Gly-NHN═Dex)

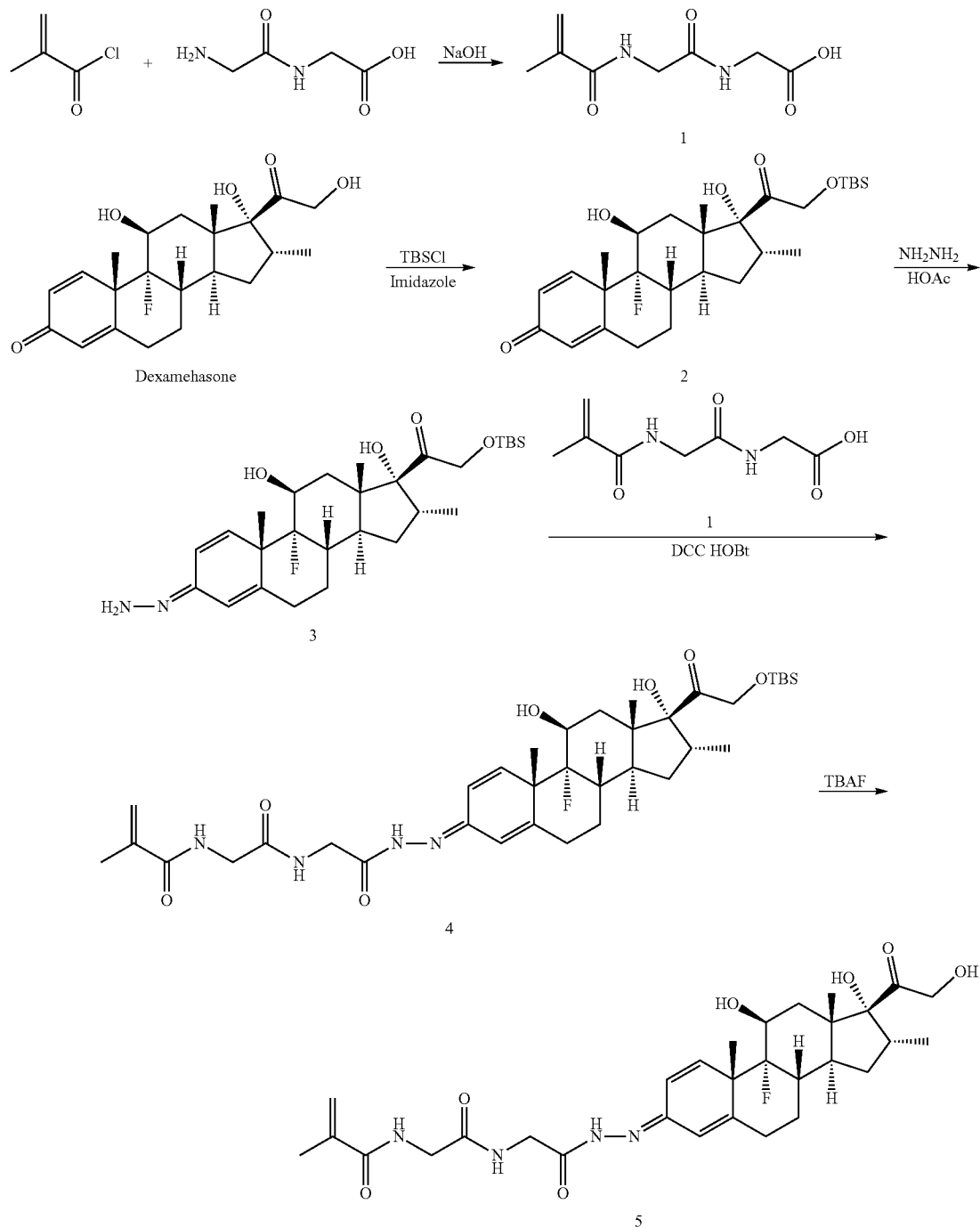

Scheme 1. Synthesis of Ma-Gly-Gly-NHN═Dex

Gly-Gly—OH (13.2 g, 100 mmol) was dissolved in water (50 mL) and then the solution was cooled to 0° C. Methacryloyl chloride (10.4 g, 100 mmol) and NaOH (50 mL, 2M) were added to the solution dropwise. After addition, the reaction mixture was stirred at room temperature for 1 h, then acidified with conc. hydrochloric acid to pH 2 and a dense white precipitate formed. Solid were collected and washed by hot water until the filtrate was neutral. Crude solid product was dried under vacuum and further purified by repeated crystallizations (ethanol/water=50/50) to give white crystals (4.9 g, 25%).

$^1$H NMR: (500 MHz, DMSO-d$_6$) δ 12.55 (br, 1H), 8.16 (t, J=5.8 Hz, 1H), 8.10 (t, J=5.8 Hz, 1H), 5.74 (s, 1H), 5.37 (s, 1H), 3.76 (s, 2H), 3.75 (s, 2H), 1.87 (s, 3H);

$^{13}$C NMR (125 MHz, DMSO-d$_6$) δ 171.6, 169.8, 168.1, 139.9, 120.2, 42.6, 41.1, 18.9.

Dexamethasone (11.76 g, 30 mmol) and imidazole (4.08 g, 60 mmol) were dissolved in anhydrous DMF (90 mL) and the solution was cooled to 0° C. by ice bath. TBSCl (4.95 g, 33 mmol) was added. The solution was stirred at 0° C. for 1 h and then allowed to room temperature for 3 h. Ethyl acetate (200 mL) was added and the solution was then washed with saturated brine (200 mL and then 150 mL×4). The organic phase was then dried over Na$_2$SO$_4$ and then the solvent was removed to get crude product (15.1 g).

$^1$H NMR (500 MHz, DMSO-d$_6$): δ (ppm)=7.28 (d, J=10.2 Hz, 1H), 6.22 (d, J=10.2 Hz, 1H), 6.00 (s, 1H), 5.29 (s, 1H), 4.97 (s, 1H), 4.78 (d, J=19.1 Hz, 1H), 4.29 (d, J=19.1 Hz, 1H), 4.14 (d, J=9.4 Hz, 1H), 2.91 (m, 1H), 2.61 (td, J=13.6 Hz, 5.8 Hz, 1H), 2.36 (m, 2H), 2.11 (m, 2H), 1.76 (m, 1H), 1.62 (q, J=11.8 Hz, 1H), 1.48 (s, 3H), 1.41 (d, J=13.5 Hz, 1H), 1.33 (m, 1H), 1.06 (m, 1H), 0.88 (s, 9H), 0.87 (s, 3H), 0.74 (d, J=7.3 Hz, 1H), 0.04 (s, 3H), 0.03 (s, 3H).

$^{13}$C NMR (125 MHz, DMSO-d$_6$): δ (ppm)=209.19, 185.45, 167.20, 152.94, 129.17, 124.29, 101.38 (d, J$_{C-F}$=174 Hz), 90.52, 70.84 (d, J$_{C-F}$=36.9 Hz), 68.14, 48.13 (d, J$_{C-F}$=22.5 Hz), 47.65, 36.03, 35.33, 33.82 (d, J$_{C-F}$=19.3 Hz), 32.09, 30.46, 27.42, 25.97, 23.08 (d, J$_{C-F}$=5.5 Hz), 18.34, 16.86, 15.38, −4.89, −5.04.

MS (ESI): m/z=507.2 (M+H$^+$), calculated 506.3.

The crude product was then dissolved in a solution of hydrazine monohydrate (6.0 g, 120 mmol) in methanol (120 mL), and then acetic acid (0.9 g, 15 mmol) was added. The solution was stirred at room temperature for 4 h. Ethyl acetate (200 mL) was added and the solution was then washed with saturated brine (150 mL×3). The organic phase was dried over Na$_2$SO$_4$ and then the solvent was removed to get the residue. Flash column chromatography (Ethyl acetate:Hexanes=1:1 to 2:1) to give product (7.78 g). Yield: 49.9%. Some compound 2 (5.53 g) was recovered.

$^1$H NMR (500 MHz, DMSO-d$_6$): δ (ppm)=6.72 (d, J=10.4 Hz, 0.37H), 6.43 (s, 0.63H), 6.30 (s, 1.94H), 6.28 (d, J=10.4 Hz, 0.37H), 6.04 (d, J=10.1 Hz, 0.63H), 5.99 (d, J=10.1 Hz, 0.63H), 5.04 (d, J=13.2 Hz, 1H), 4.93 (s, 1H), 4.78 (d, J=19.1 Hz, 1H), 4.28 (d, J=19.1 Hz, 1H), 4.10 (br, 1H), 2.90 (m, 1H), 2.56 (td, J=13.1 Hz, 4.7 Hz, 0.63H), 2.45 (td, J=13.1 Hz, 4.7 Hz, 0.37H), 2.24 (m, 1H), 2.12 (m, 3H), 1.66 (m, 0.63H), 1.61 (m, 0.37H), 1.59 (m, 1H), 1.38 (s, 3H), 1.36 (d, J=13.5 Hz, 1H), 1.29 (m, 1H), 1.05 (m, 1H), 0.88 (s, 9H), 0.85 (s, 3H), 0.77 ((d, J=7.1 Hz, 3H), 0.04 (s, 3H), 0.03 (s, 3H).

$^{13}$C NMR (125 MHz, DMSO-d$_6$): δ (ppm)=209.27, 170.49, 150.62, 143.85, 139.98, 139.89, 138.18, 132.13, 127.68, 121.60, 116.04, 110.69, 100.36 (d, J$_{C-F}$=171.6 Hz), 100.16 (d, J$_{C-F}$=172.2 Hz), 90.63, 90.57, 69.74 (J=37.5 Hz), 69.67 (d, J$_{C-F}$=37.1 Hz), 68.15, 59.91, 47.62, 47.60, 47.00, 46.85, 46.82, 46.65, 43.76, 36.16, 36.08, 35.31, 34.19 (d, J$_{C-F}$=19.6 Hz), 34.13 (d, J$_{C-F}$=19.6 Hz), 32.06, 30.94, 29.88, 27.47, 25.97, 25.07 (d, J$_{C-F}$=4.6 Hz), 24.63 (d, J$_{C-F}$=4.6 Hz), 20.93, 18.35, 16.90, 15.40, 14.25, −4.89, −5.03.

MS (ESI): m/z=521.2 (M+H$^+$), calculated 520.3.

MA-Gly-Gly—OH (60 mg, 0.3 mmol), DCC (82.4 mg, 0.4 mmol) and Et$_3$N (60 mg, 0.6 mmol) were dissolved in anhydrous DMF (3 mL) at 0° C. The solution was stirred 15 min and then compound 3 (130 mg, 0.25 mmol) was added. The solution was allowed to room temperature and stirred overnight. Ethyl acetate (50 mL) was added and the solution was then washed with saturated brine (50 mL×4). The organic phase was dried over Na$_2$SO$_4$ and the solvent was then removed. The residue was purified by column chromatography (Ethyl acetate:MeOH=15:1) to give product 4 (106 mg). Yield 60.4%.

$^1$H NMR (500 MHz, DMSO-d$_6$): δ (ppm)=10.93 (s, 0.23H), 10.85 (s, 0.30H), 10.50 (s, 0.12H), 10.49 (s, 0.23H), 8.21 (t, J=4.2 Hz, 0.35H), 8.19 (t, J=5.7 Hz, 0.65H), 8.10 (t, J=4.9 Hz, 0.37H), 7.89 (t, J=5.4 Hz, 0.57H), 7.02 (d, J=10.6 Hz, 0.24H), 6.93 (d, J=10.2 Hz, 0.13H), 6.79 (s, 0.32H), 6.68 (s, 0.31H), 6.62 (t, J=10.5 Hz, 0.25H), 6.46 (d, J=11.1 Hz, 0.23H), 6.43 (d, J=11.2 Hz, 0.36H), 6.28 (t, J=10.2 Hz, 0.23H), 6.22 (d, J=10.1 Hz, 0.32H), 6.00 (s, 0.15H), 5.96 (s, 0.25H), 5.74 (s, 1H), 5.38 (s, 1H), 5.16 (m, 1H), 4.95 (s, 1H), 4.77 (d, J=19.0 Hz, 1H), 4.13 (m, 2.29H), 3.86 (m, 0.78H), 3.78 (dd, J=14.7 Hz, 5.8 Hz, 2H), 2.90 (m, 1H), 2.60 (m, 0.62H), 2.25 (m, 1.78H), 2.11 (m, 2.47H), 1.87 (s, 3.2H), 1.71 (m, 1.08H), 1.58 (m, 1.09H), 1.41 (m, 4.20H), 1.31 (m, 1.14H), 1.06 (m, 1.10H), 0.88 (s, 9H), 0.84 (s, 3H), 0.78 (d, J=7.1 Hz, 3.26H).

$^{13}$C NMR (125 MHz, DMSO-d$_6$): δ (ppm)=209.27, 170.60, 170.57, 170.50, 169.63, 169.43, 167.93, 167.82, 165.62, 165.53, 157.41, 157.02, 152.24, 151.46, 146.77, 146.31, 144.12, 143.95, 143.17, 139.69, 139.62, 126.60, 120.58, 120.00, 119.90, 117.07, 116.63, 111.61, 111.44, 101.47 (d, J$_{C-F}$=173 Hz), 101.42 (d, J$_{C-F}$=173 Hz), 100.08 (d, J$_{C-F}$=173 Hz), 100.03 (d, J$_{C-F}$=173 Hz), 90.63, 90.56, 79.37, 70.08 (d, J$_{C-F}$=36.9 Hz), 68.19, 59.95, 47.43 (d, J$_{C-F}$=22.8 Hz), 47.27 (d, J$_{C-F}$=22.8 Hz), 43.68, 42.64, 42.50, 41.56, 40.70, 36.15, 36.08, 35.36, 34.10 (d, J$_{C-F}$=21.4 Hz), 34.03 (d, J$_{C-F}$=19.4 Hz), 32.10, 31.06, 31.01, 30.13, 29.97, 27.50, 27.44, 24.42 (d, J$_{C-F}$=4.9 Hz), 24.06 (d, J$_{C-F}$=4.5 Hz), 23.98 (d, J$_{C-F}$=4.7 Hz), 20.94, 18.76, 18.73, 18.36, 16.90, 15.42, 15.40, 14.28, −4.86, −5.01.

MS (ESI): m/z=703.3 (M+H$^+$), calculated 702.38.

Compound 4 (70 mg, 0.1 mmol) was dissolved in THF (5 ml) and then TBAF (0.2 mL, 1M) was added the solution was stirred at room temperature for 15 min Ethyl acetate (50 mL) was added and the solution was then washed with saturated brine (50 mL×4). The organic phase was dried over Na$_2$SO$_4$ and the solvent was removed. The residue was purified by column chromatography (Ethyl acetate: MeOH=10:1) to give product 5 (MA-Dex) 48 mg, Yield: 81.6%.

$^1$H NMR (500 MHz, DMSO-d$_6$): δ (ppm)=10.92 (s, 0.21H), 10.84 (s, 0.32H), 10.50 (s, 0.13H), 10.50 (s, 0.23H), 8.21 (t, J=4.2 Hz, 0.31H), 8.18 (t, J=5.7 Hz, 0.67H), 8.10 (t, J=4.9 Hz, 0.40H), 7.88 (t, J=5.4 Hz, 0.57H), 7.02 (d, J=10.6 Hz, 0.22H), 6.93 (d, J=10.2 Hz, 0.12H), 6.78 (s, 0.34H), 6.68 (s, 0.38H), 6.62 (d, J=10.4 Hz, 0.23H), 6.47 (d, J=11.1 Hz, 0.25H), 6.43 (d, J=11.2 Hz, 0.36H), 6.27 (t, J=10.2 Hz, 0.25H), 6.22 (d, J=10.1 Hz, 0.35H), 6.00 (s, 0.12H), 5.96 (s, 0.22H), 5.74 (s, 1H), 5.37 (s, 1H), 5.14 (m, 1H), 4.93 (s, 1H), 4.67 (br, 1H), 4.49 (d, J=19.2 Hz, 1H), 4.14 (m, 2.05H), 4.07 (d, J=19.2 Hz, 1H), 3.87 (m, 0.90H), 3.79 (dd, J=14.9 Hz, 5.7 Hz, 2H), 2.93 (m, 1H), 2.60 (m, 0.60H), 2.50 (m, 1.12H), 2.25 (m, 1.80H), 2.13 (m, 2.25H), 1.87 (s, 3.2H), 1.71 (m, 1.04H), 1.59 (m, 1.11H), 1.42 (m, 4.37H), 1.31 (m, 1.79H), 1.06 (m, 1.15H), 0.88 (s, 9H), 0.84 (s, 3.61H), 0.787 (d, J=7.0 Hz, 3.34H).

$^{13}$C NMR (125 MHz, DMSO-d$_6$): δ (ppm)=211.47, 170.63, 170.60, 169.71, 169.52, 168.02, 167.91, 165.74, 165.66, 162.62, 157.56, 157.15, 152.37, 151.56, 146.89, 146.44, 144.26, 144.06, 143.25, 139.77, 139.72, 139.66, 139.12, 117.11, 116.67, 111.69, 111.49, 100.93 (d, $J_{C-F}$=172.9 Hz), 100.88 (d, $J_{C-F}$=172.9 Hz), 100.75 (d, $J_{C-F}$=174.7 Hz), 100.72 (d, $J_{C-F}$=173.9 Hz), 90.48, 90.42, 70.18 (d, $J_{C-F}$=35.9 Hz), 66.55, 60.02, 53.07, 47.69 47.47 (d, $J_{C-F}$=22.8 Hz), 47.33 (d, $J_{C-F}$=22.8 Hz), 43.70, 42.71, 42.56, 41.64, 40.76, 36.16, 36.09, 35.16, 34.12 (d, $J_{C-F}$=20.5 Hz), 34.08 (d, $J_{C-F}$=20.5 Hz), 32.24, 31.08 (br), 30.18, 30.03, 28.18, 27.55, 24.45 (d, $J_{C-F}$=5.0 Hz), 24.09 (d, $J_{C-F}$=5.9 Hz), 21.34, 20.99, 20.14, 18.79, 18.77, 16.91, 15.54, 15.52, 14.32, 14.07.

MS (ESI): m/z=589.1 (M+H$^+$), calculated 588.3.

2. Synthesis of ProGel-Dex

HPMA (400 mg, 2.79 mmol), MA-Gly-Gly-NHN=Dex (256.7 mg, 0.44 mmol), were dissolved in methanol (5 mL), the initiator 2,2'-azobisisobutyronitrile (AIBN, 38.8 mg, 0.24 mmol) and RAFT agent S,S'-bis(α,α'-dimethyl-α"-acetic acid)-trithiocarbonate (CTA, 37.1 mg, 0.13 mmol) were then added, The solution was purged with argon and polymerized at 50° C. for 2 days. The resulting polymer was first purified on a LH-20 column to remove the unreacted low molecular weight compounds, and then dialyzed. The polymer solution was lyophilized to obtain the final ProGel-Dex.

Scheme 2. Synthesis of ProGel-Dex

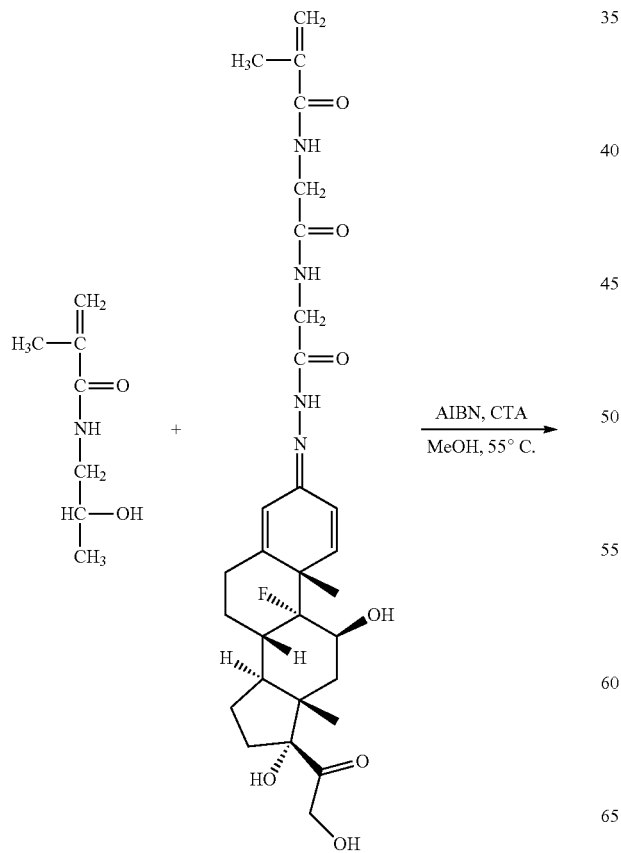

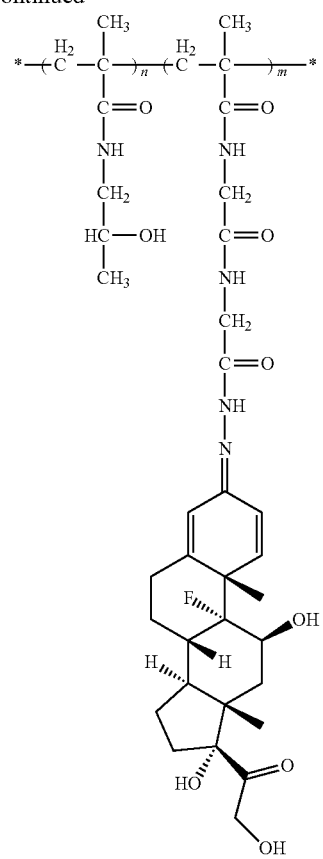

Example 2

3. Synthesis ProGel-Tanshinone

Scheme 3. Synthesis of ProGel-Tanshinone (ProGel-Tan)

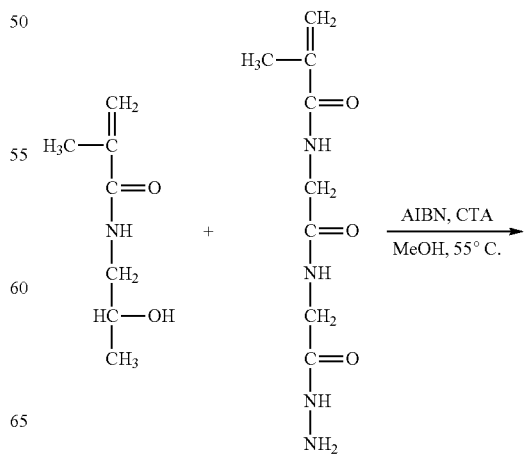

-continued

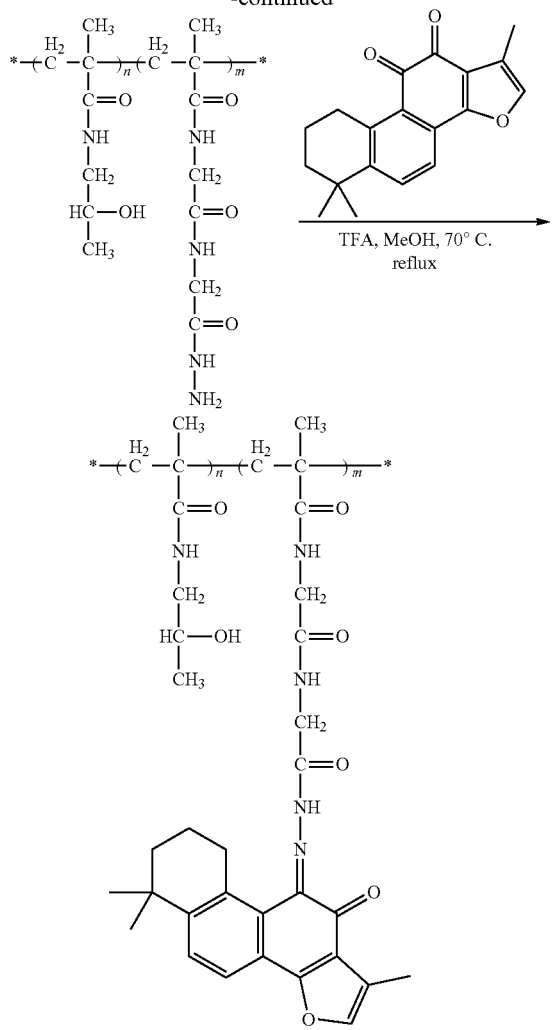

HPMA (500 mg, 3.49 mmol) and MA-Gly-Gly—NHNH$_2$ (134 mg, 0.63 mmol) were dissolved in methanol (5 mL) in a glass ampule, and to this solution was added the initiator 2,2′-azobis(isobutyronitrile) (AIBN, 37.5 mg, 0.23 mmol) and the RAFT agent S,S′-bis (α,α′-dimethyl-α″-acetic acid)-trithiocarbonate (CTA, 35.8 mg, 0.13 mmol). The solution was purged with argon, it was flame-sealed and polymerized at 50° C. for 48 h. The resulting polymer was first purified on an LH-20 column to remove the unreacted low-molecular-weight compounds and obtain the desired product. The resulting copolymer (530 mg) and Tanshinone (184 mg, 0.63 mmol) were then dissolved in methanol (6 mL). Trifluoroacetic acid (0.2 mL) was added to the reaction solution as a catalyst. The solution was again purged with argon and refluxed at 70° C. for 12 h in the absence of light. After evaporation of the reaction solvent, the ProGel-Tan product was purified by an LH-20 column.

Example 3

4. Synthesis of ProGel-Curcumin

Scheme 4. Synthesis of N-(30azidopropyl)methacrylamide

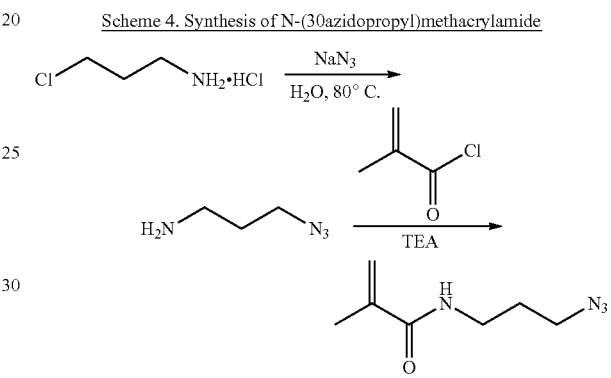

3-Chloropropyl-yl-1-amine hydrochloride (1.0 g, 7.75 mmol) was dissolved in 10.0 mL of H$_2$O, and to this solution was added sodium azide (3.8 g, 58.5 mmol), the solution was stirred at 80° C. overnight. Then the reaction was cooled to 0° C. and KOH was added to adjust the pH value to 11, the organic layer was separated and the aqueous phase was extracted with EA (30 mL×2). The combined organic solution was dried over anhydrous MgSO$_4$. After filtration and removal of the solvent, 3-azidopropan-1-amine (465 mg) was obtained as a colorless oil which can be used for the next step without further purification.

Scheme 5. Synthesis of clickable Curcumin derivative

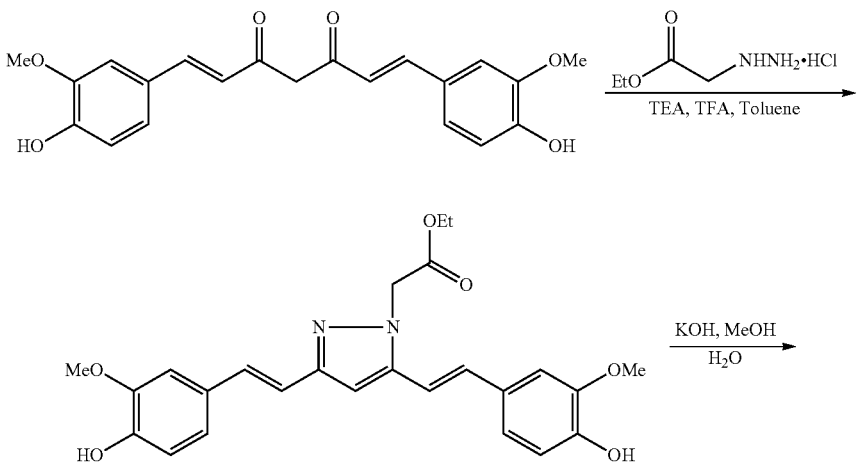

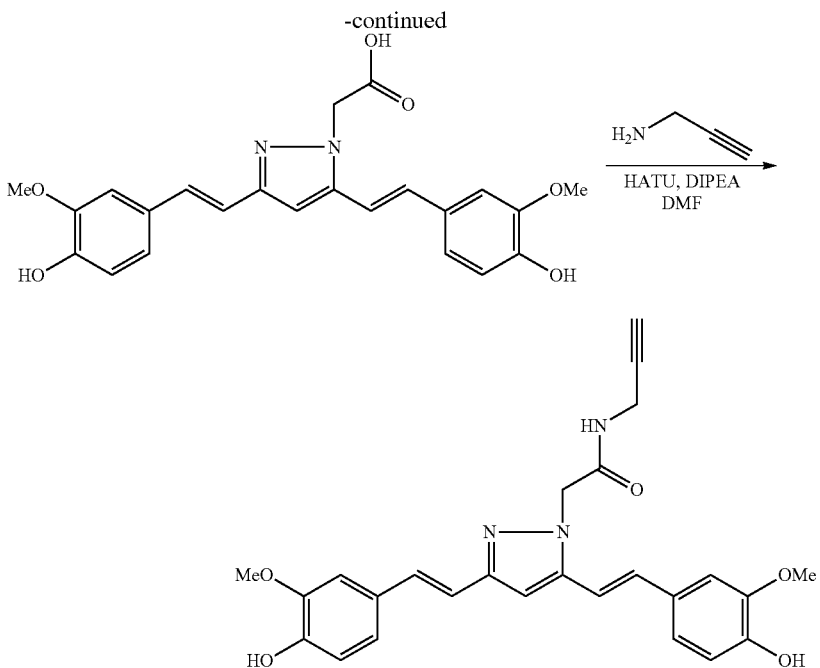

To a solution of 3-azidopropan-1-amine (500 mg, 5 mmol) in dry DCM at 0° C., triethylamine (1.01 g, 10 mmol) was added and the solution was stirred for 10 minutes. Methacryloyl chloride (572 mg, 5.5 mmol) was added dropwise and the reaction was monitored by TLC and carried out overnight until 3-azidopropan-1-amine completely disappeared. The reaction was quenched by water and the product was extracted with DCM (20 mL×3). The combined organic phase was washed with 5% HO (aq) and brine and then dried over $Na_2SO_4$. After filtration, the solvent was removed. The residue was purified by flash column chromatography (MeOH/DCM=1:10) to give the corresponding product. $^1$H NMR (500 MHz, CDCl$_3$) δ (ppm)=6.08 (s, 1H), 5.68 (s, 1H), 5.34 (s, 1H), 3.42-3.37 (m, 4H) 1.95 (s, 3H), 1.86-1.82 (m, 2H).

Synthesis of ethyl 2-(3,5-bis((E)-4-hydroxy-3-methoxystyryl)-1H-pyrazol-1-yl)acetate. Curcumin (500 mg, 1.36 mmol), ethyl 2-hydrazinylacetate hydrochloride (420 mg, 2.72 mmol), triethylamine (0.375 mL, 2.72 mmol), and TEA (0.05 mL, 0.68 mmol) were dissolved in dry toluene (10 mL). The solution was stirred at reflux for 3 h and monitored by TLC until the starting materials completely disappeared. Then the reaction mixture was cooled to room temperature, water was added and extracted with DCM (20 mL×3), the combined organic solution was washed with 5% HCl (aq) and dried over $Na_2SO_4$. After filtration, the solvent was removed and the residue was purified by flash column chromatography (MeOH/DCM=1:40) to give the corresponding product as yellow solid (380 mg, yield: 62%). $^1$H NMR (500 MHz, DMSO-d$_6$) δ (ppm)=7.22 (d, J=1.35 Hz, 1H), 7.16 (d, J=1.35 Hz, 1H), 7.10-7.07 (m, 1H), 7.05-7.04 (m, 1H), 7.02-7.01 (m, 2H), 6.98-6.95 (m, 1H), 6.93-6.92 (m, 1H), 6.93 (s, 1H), 6.77 (dd, J=10.1, 7.75 Hz, 2H), 5.20 (s, 2H), 4.16 (q, J=7.05 Hz, 2H), 3.83 (s, 3H), 3.82 (s, 3H), 1.21 (t, J=7.15 Hz, 3H). $^{13}$C NMR (125 MHz, DMSO-d$_6$) δ 168.7, 150.5, 148.3, 147.7, 147.2, 143.8, 132.7, 130.2, 128.9, 128.5, 121.2, 120.5, 118.2, 116.0, 112.1, 110.8, 110.1, 99.1, 61.5, 56.2, 56.1, 50.8, 14.5.

Synthesis of 2-(3,5-bis((E)-4-hydroxy-3-methoxystyryl)-1H-pyrazol-yl) acetic acid. The ester (180 mg, 0.4 mmol) was dissolved in a mixed solution (methanol/H$_2$O=4 mL/4 mL). KOH (112 mg, 2.0 mmol) was added and the solution was stirred at room temperature overnight. The reaction was monitored by TLC. The solution was concentrated to 2 mL, and acidified with HCl solution to pH=2, and then was extracted with DCM (20 mL×3). The combined organic phase was dried over $Na_2SO_4$, filtered, concentrated, and purified by flash column chromatography (MeOH/DCM/HOAc=1:5:0.05) to give the corresponding product (150 mg, yield: 89%). $^1$H NMR (500 MHz, DMSO-d$_6$) δ (ppm)= 7.22 (d, J=1.1 Hz 1H), 7.15 (d, J=1.1 Hz, 1H), 7.06-6.89 (m, 6H), 6.79-6.76 (m, 3H), 4.97 (s, 2H), 3.82 (s, 6H); $^{13}$C NMR (125 MHz, DMSO-d$_6$) δ 168.2, 149.8, 148.3, 147.7, 147.1, 143.4, 132.1, 129.7, 129.1, 128.6, 121.1, 120.3, 118.5, 116.1, 112.6, 110.6, 110.1, 98.9, 56.2, 56.1, 51.9.

Synthesis of 2-(3,5-bis((E)-4-hydroxy-3-methoxystyryl)-1H-pyrazol-1-yl)-N-(prop-2-yn-1-yl). The acid (60 mg, 0.142 mmol) was dissolved in dry DMF (2 mL), then DIPEA (36.7 mg, 0.284 mmol) and HATU (81 g, 0.213 mmol) were added. The reaction mixture was stirred in dark at room temperature for 5 min, and then prop-2-yn-1-amine (15.6 mg, 0.284 mmol) was added. The reaction was kept in dark at room temperature overnight until the starting materials completely disappeared. The solution was then added with water and then extracted with EA (20 mL×3). The combined organic solution was washed with brine and dried over $Na_2SO_4$, filtered, concentrated, and purified by flash column chromatography (MeOH/DCM=1:10) to give the corresponding product as yellow solid (43 mg, 66%). δ $^1$H NMR (500 MHz, DMSO-d$_6$) δ (ppm)=8.63 (t, J=7.2.5 Hz, 1H), 7.21 (d, J=1.1 Hz 1H), 7.16 (d, J=1.1 Hz, 1H), 7.08-6.81 (m, 6H), 6.79-6.76 (m, 3H), 4.94 (s, 2H), 3.92 (s, 2H), 3.83 (s, 3H), 3.82 (s, 3H), 3.16 (s, 1H); $^{13}$C NMR (125 MHz, DMSO) δ 167.2, 150.2, 148.3, 147.7, 147.1, 143.9, 132.3, 129.9, 129.0, 128.6, 121.2, 120.4, 118.4, 116.0, 112.6, 110.6, 110.1, 98.9, 81.2, 73.8, 73.3, 56.2, 56.1, 51.8, 28.6.

Scheme 6. Synthesis of ProGel-Curcumin
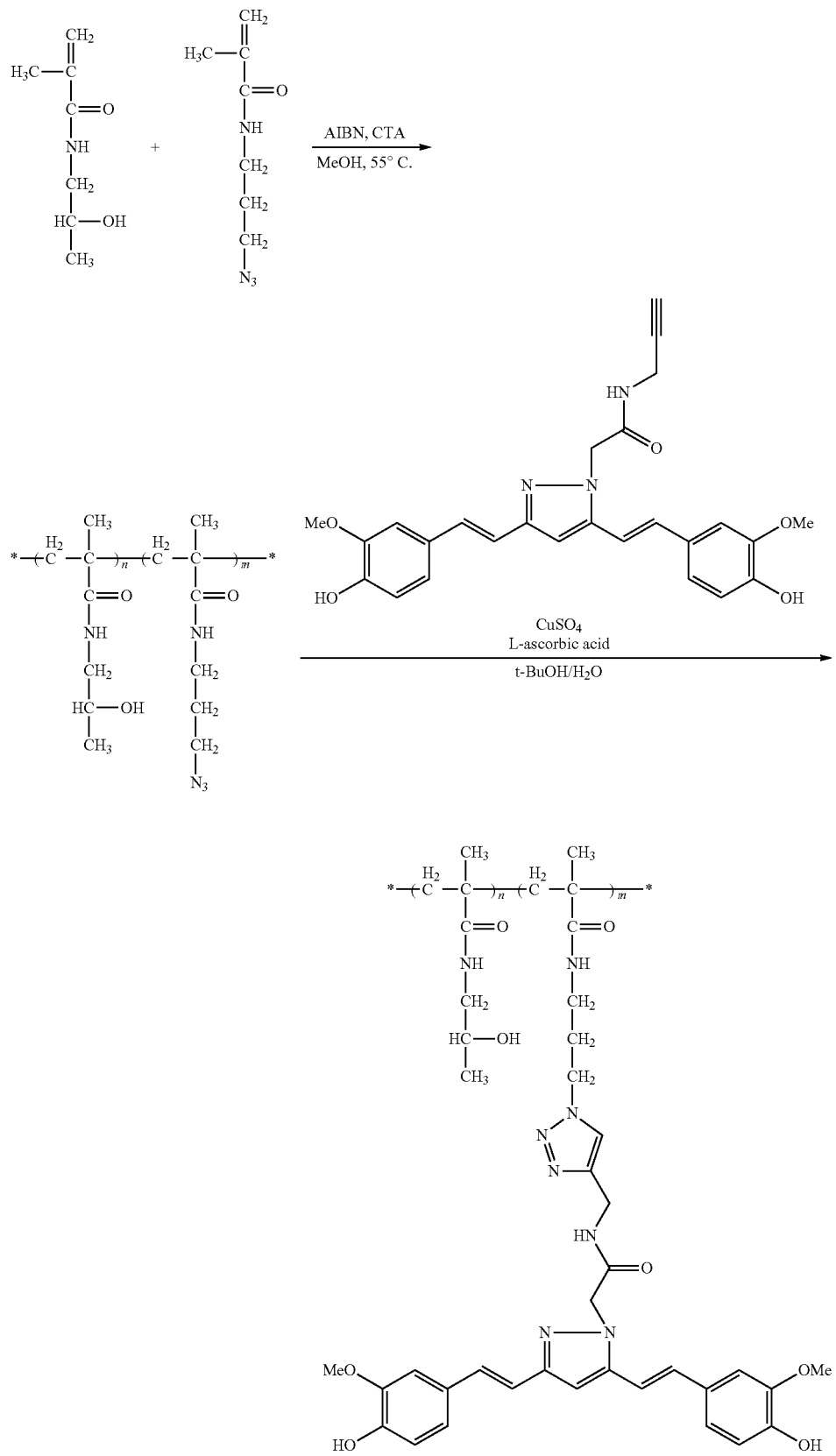

HPMA (200 mg, 1.39 mmol) and AzMA (73.5 mg, 0.437 mmol) were dissolved in methanol (2 mL) in a glass ampule, and the initiator 2,2'-azobis(isobutyronitrile) (AIBN, 16.2 mg, 0.098 mmol) and the RAFT agent S,S'-bis (α,α'-dimethyl-α"-acetic acid)-trithiocarbonate (CTA, 15.4 mg, 0.055 mmol) were then added. The solution was purged with argon, flame-sealed and stirred at 55° C. for 48 h. The solution was first purified on an LH-20 column to remove the unreacted low-molecular-weight compounds to give the desired product. The resulting copolymer (100 mg), alkyne (161 mg, 0.44 mmol) and copper sulfate pentahydrate (55 mg, 0.22 mmol) were added to a mixed solution of t-BuOH (4 mL) and water (4 mL). After the solution was bubbled with argon for 5 min, L-ascorbic acid sodium salt (87 mg, 0.44 mmol) was added. The solution was stirred at room temperature for 48 h under the argon. EDTA disodium and NaHCO$_3$ was added and the solution was dialyzed for 24 hours, and then lyophilized. The crude compound was dissolved in methanol and purified by an LH-20 column to give the final product.

Example 4

5. Synthesis of ProGel-Apigenin

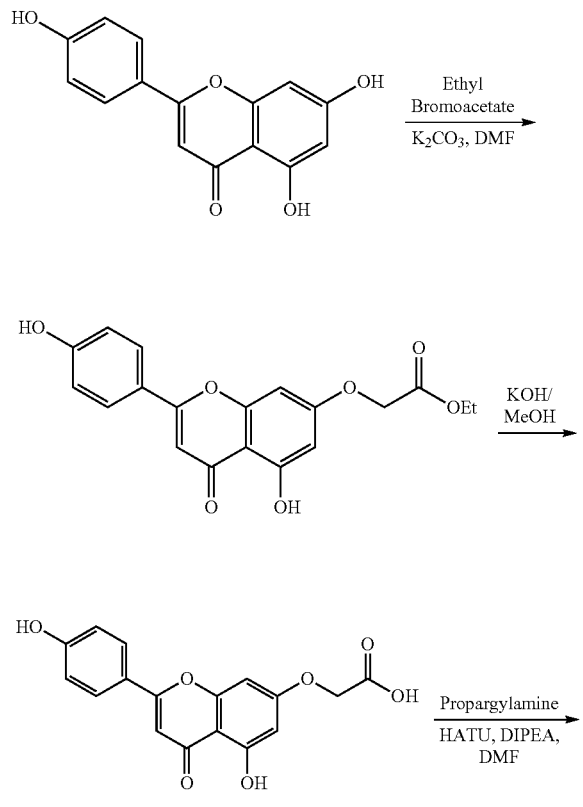

Scheme 7. Synthesis of clickable apigenin

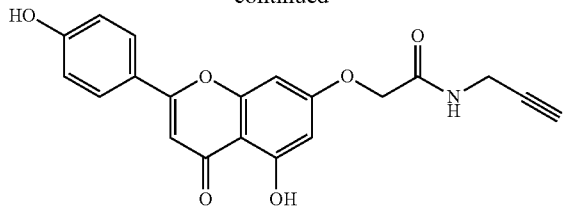

-continued

Apigenin (200 mg, 0.74 mmol) was dissolved in DMF (3 mL), and then K$_2$CO$_3$ (102 mg, 0.74 mmol) and ethyl bromoacetate (124 mg, 0.74 mmol) were added. The mixture was stirred at room temperature overnight. Then the reaction was quenched with water and the solution was extracted with EA (20 mL×3). The organic phase was dried over Na$_2$SO$_4$, filtered, concentrated, and purified by flash column chromatography (MeOH/DCM=1:50) to give the corresponding product (130 mg, yield: 50%). $^1$H NMR (400 MHz, DMSO-d$_6$): δ (ppm)=12.96 (s, 1H), 10.39 (s, 1H), 7.95 (d, J=8.75 Hz, 2H), 7.09 (d, J=8.75 Hz, 2H), 6.93 (s, 1H), 6.80 (d, J=2.05 Hz, 1H), 6.40 (d, J=2.05 Hz, 1H), 4.92 (s, 2H), 4.18 (q, 2H), 1.23 (t, J=7.1 Hz, 3H).

The ester (100 mg, 0.28 mmol) was dissolved in a mixed solution (methanol/H$_2$O=4 mL/4 mL). K$_2$CO$_3$ (193 mg, 1.4 mmol) was added and the solution was stirred at 70° C. for 3 h. The reaction was monitored by TLC and carried out until the starting material completely disappeared. Then the solution was concentrated to 2 mL and acidified with HCl solution to pH=2, the mixture was extracted with DCM (10 mL×3). The organic phase was dried over Na$_2$SO$_4$, filtered, concentrated, and purified by flash column chromatography (MeOH/DCM/HOAc=1:5:0.05) to give the corresponding product (83 mg, yield: 90%). $^1$H NMR (400 MHz, DMSO-d$_6$): δ 12.95 (s, 1H), 10.50 (s, 1H), 7.97 (d, J=8.7 Hz, 2H), 6.93 (d, J=8.7 Hz, 2H), 6.85 (s, 1H), 6.75 (d, J=1.75 Hz, 1H), 6.37 (d, J=1.75 Hz, 1H), 4.80 (s, 2H).

The acid (150 mg, 0.46 mmol) was dissolved in dry DMF (4 mL), and then DIPEA (119 mg, 0.92 mmol) and HATU (350 g, 0.92 mmol) were added. The solution was stirred for 5 min, prop-2-yn-1-amine (50.6 mg, 0.92 mmol) was added and the solution was stirred overnight until the starting materials completely disappeared. Water was added and the solution was extracted with EA (20 mL×3), and the combined organic solution was washed with brine. The organic phase was dried over Na$_2$SO$_4$, filtered, concentrated, and purified by flash column chromatography (MeOH/DCM=1:10) to give the corresponding product as yellow solid (117 mg, 70%). $^1$H NMR (400 MHz, DMSO-d$_6$): δ (ppm)=12.96 (s, 1H), 10.39 (s, 1H), 8.65 (t, J=5.55 Hz, 1H) 7.95 (d, J=8.75 Hz, 2H), 6.93 (d, J=8.7 Hz, 2H), 6.85 (s, 1H), 6.78 (d, J=2.1 Hz, 1H), 6.41 (d, J=2.1 Hz, 1H), 4.65 (s, 2H), 3.94 (s, 2H), 3.17 (s, 2H).

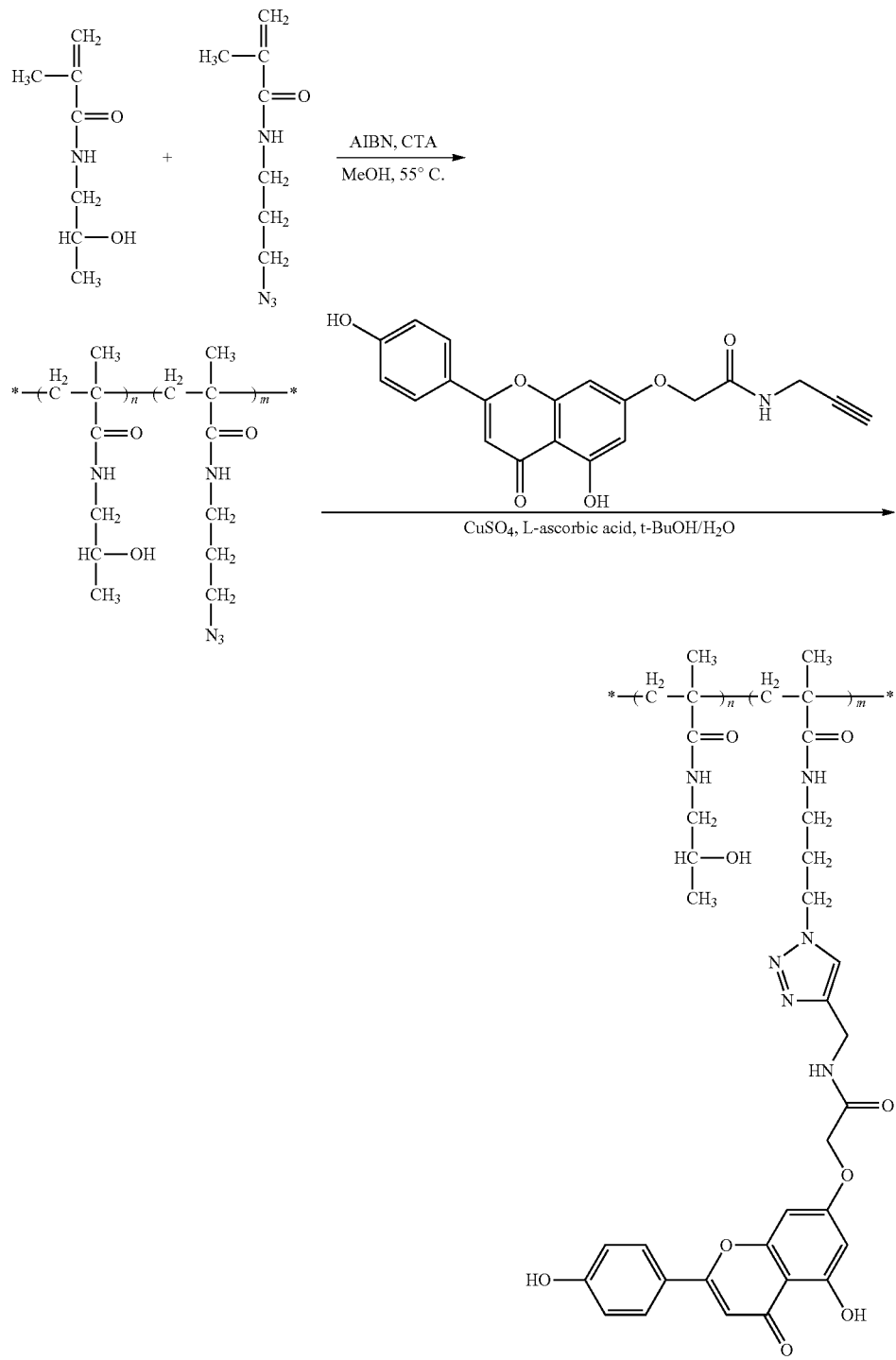

Scheme 8. The Synthesis of ProGel-Apigenin

6. Synthesis of ProGel-Apigenin

HPMA (200 mg, 1.39 mmol) and AzMA (73.5 mg, 0.437 mmol) were dissolved in methanol (2 mL) in a glass ampule, initiator 2,2'-azobis(isobutyronitrile) (AIBN, 16.2 mg, 0.098 mmol) and the RAFT agent S,S'-bis (α,α'-dimethyl-α"-acetic acid)-trithiocarbonate (CTA, 15.4 mg, 0.055 mmol) were then added. The solution was purged with argon flame-sealed and stirred at 55° C. for 48 h. The solution was first purified by LH-20 column to remove the unreacted low-molecular-weight compounds. The resulting copolymer (100 mg), alkyne (202 mg, 0.44 mmol) and copper sulfate pentahydrate (55 mg, 0.22 mmol) were added to a mixed solution of t-BuOH (4 mL) and water (4 mL). After the solution was bubbled with argon for 5 min, L-ascorbic acid sodium salt (87 mg, 0.44 mmol) was added. The solution was stirred at room temperature for 48 h under the argon. EDTA disodium and NaHCO$_3$ were added and the solution was dialyzed for 24 hours, and then lyophilized. The crude compound was dissolved in methanol and purified by an LH-20 column to give the purified ProGel-apigenin.

Example 5

7. Synthesis of ProGel-Estradiol

Scheme 9. The Synthesis of ProGel-estradiol

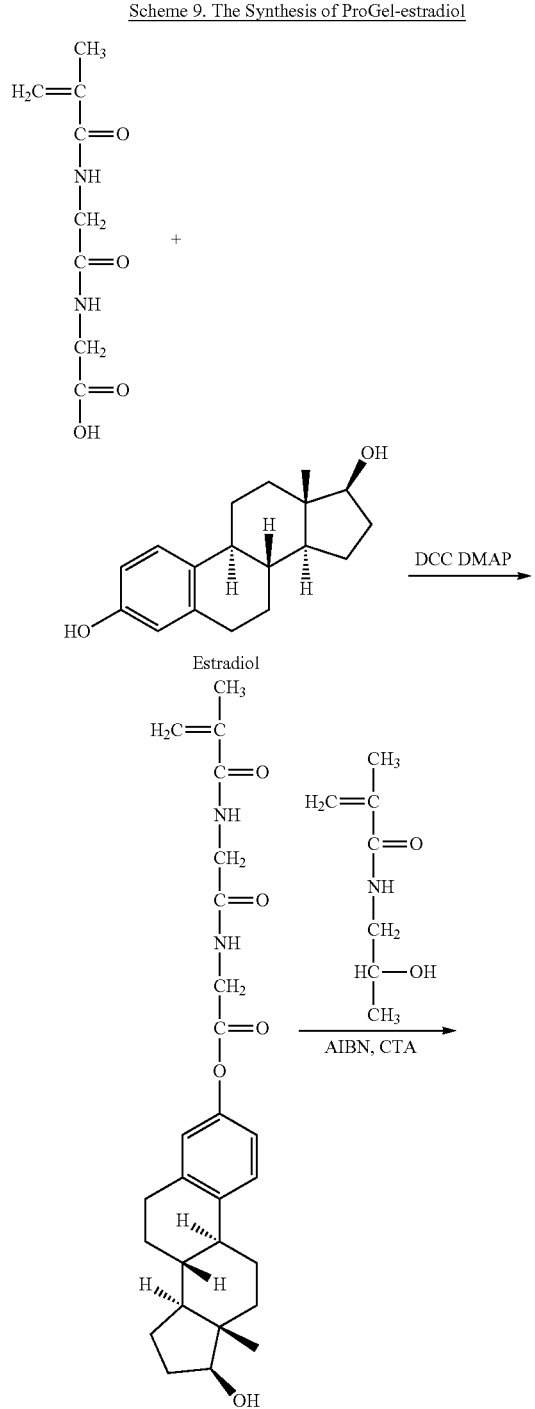

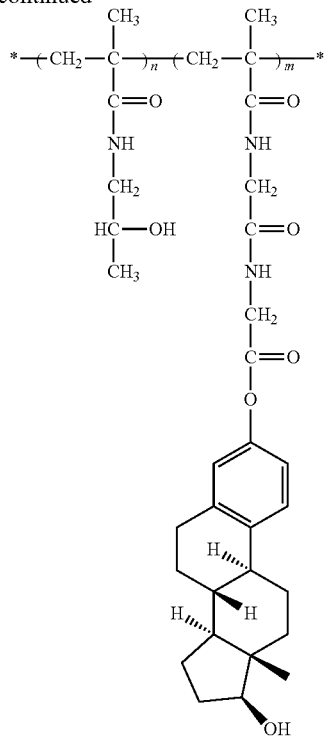

MA-Gly-Gly—OH (200 mg, 1 mmol) and Estradiol (272 mg, 1 mmol) were dissolved in anhydrous DMF (5 mL). The solution was cooled to 0° C. and then DCC (309 mg, 1.5 mmol) and DMAP (24 mg, 0.2 mmol) were added. The solution was stirred at 0° C. for 5 hours. Ethyl acetate (100 mL) was added and the solution was washed with brine (50 ml×4). The organic phase was then dried over sodium sulphate and the solvent was then removed. The residue was purified by column chromatography to give the product (350 mg).

$^1$H NMR: (500 MHz, DMSO-d$_6$) δ (ppm)=8.37 (t, J=5.8 Hz, 1H), 8.21 (t, J=5.9 Hz, 1H), 7.30 (d, J=8.5 Hz, 1H), 6.83 (d, J=8.5 Hz, 1H), 5.75 (s, 1H), 5.38 (s, 1H), 4.52 (d, J=4.8 Hz, 1H), 4.08 (d, J=5.8 Hz, 2H), 3.79 (d, J=5.9 Hz, 2H), 3.54 (m, 1H), 2.79 (m, 2H), 2.29 (d, J=11.9 Hz, 1H), 2.17 (t, J=10.6 Hz, 1H), 1.88 (s, 3H), 1.86 (m, 3H), 1.71 (m, 1H), 1.60 (m, 1H), 1.0-1.40 (m, 7H), 0.67 (s, 3H).

HPMA (120 mg, 0.84 mmol), MA-Gly-Gly-estradiol (53 mg, 0.12 mmol), AIBN (0.81 mg, 0.0050 mmol) and CTA (1.38 mg, 0.0050 mmol) were dissolved in anhydrous DMF (1.24 mL) in an ampule. After being purged by Argon for 1 min, the ampule was sealed and put in an oil bath at 63° C. for 48 h. The solution was then purified by LH-20 to give the product. 4 mL of water was used to dissolve the product at 0° C. After lyophilization, 42 mg of final product was obtained.

Example 6
8. Synthesis of ProGel-Progesterone
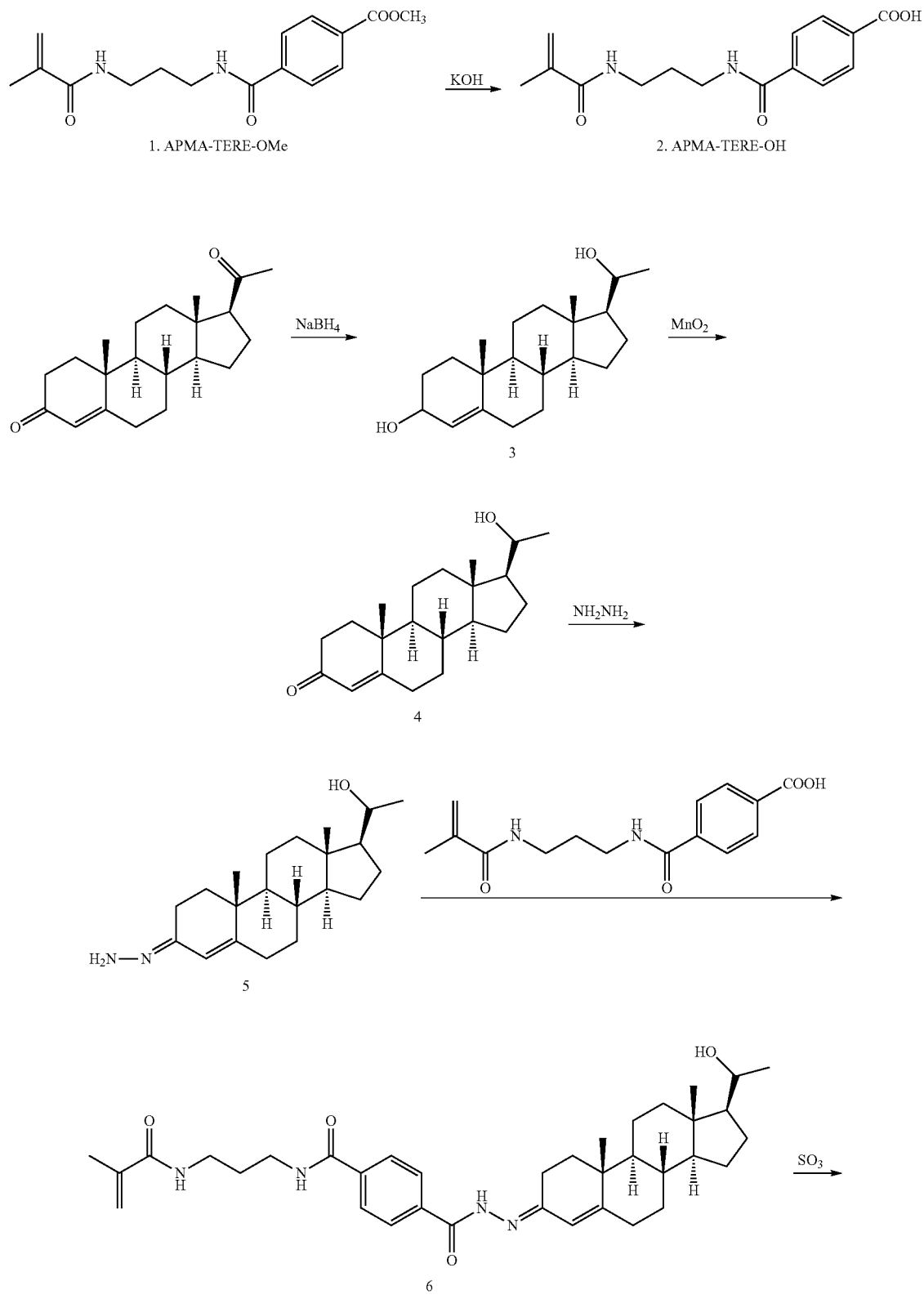
Scheme 10. The Synthesis of ProGel-Progestrone

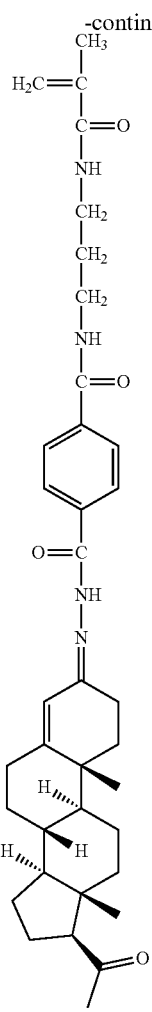
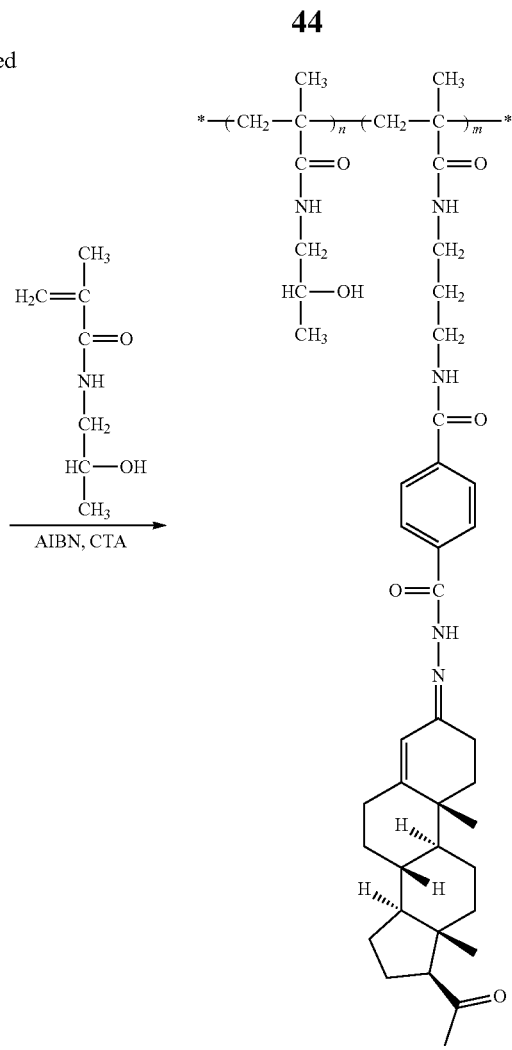

APMA-TERE-OMe (compound 1, 912 mg, 3 mmol) was dissolved in methanol (10 mL), KOH (0.5 mL, 10 M) and water (2 mL) were added. The solution was stirred at room temperature overnight. The solvent was then removed and the residue was then dissolved in methanol (10 mL) and neutralized with concentrated hydrogen chloride solution to pH=1. The solvent was then removed again and the residue was purified by column chromatography to give the product 2 (840 mg, 96%).

Progesterone (compound 2, 628 mg, 2 mmol) was dissolved in methanol (10 mL) and the solution was cooled to 0° C. NaBH$_4$ (152 mg, 4 mmol) was added. The solution was stirred for 2 h at 0° C. Ethyl acetate (100 mL) was added and washed with brine (80 mL×3). The organic phase was dried over Na$_2$SO$_4$ and the solvent was removed to get the product 3 (620 mg).

$^1$H NMR: (500 MHz, DMSO-d$_6$) δ (ppm)=5.17 (s, 1H), 4.53 (d, J=5.6 Hz, 1H), 4.07 (d, J=5.6 Hz, 1H), 3.90 (m, 1H), 3.46 (m, 1H), 2.14 (m, 2H), 1.92 (m, 1H), 1.74 (m, 1H), 1.66 (m, 1H), 1.61 (m, 1H), 1.53 (m, 2H), 1.0-1.4 (m, 9H), 0.98 (s, 3H), 0.93 (s, 3H), 0.90 (m, 1H), 0.81 (m, 1H), 0.69 (s, 3H), 0.67 (m, 1H)

$^{13}$C NMR: (125 MHz, DMSO-d$_6$) δ (ppm)=144.5, 125.5, 68.48, 66.19, 57.87, 55.52, 54.50, 42.22, 36.96, 35.59, 35.55, 33.11, 31.84, 29.28, 25.47, 24.37, 23.95, 20.64, 18.72, 12.20

The crude product was then dissolved in anhydrous dichloromethane (20 mL). MnO$_2$ (2.6 g, 30 mmol) was added and the solution was stirred overnight. After filtration, the solution was then concentrated and purified by column chromatography to give the product 4(570 mg, yield: 90.7% for two steps)

$^1$H NMR: (500 MHz, DMSO-d$_6$) δ (ppm)=5.65 (s, 1H), 3.65 (m, 1H), 2.35 (m, 2H), 2.21 (m, 1H), 2.06 (dt, J=12.8 Hz, 3.3 Hz), 1.95 (dt, J=13.2 Hz, 3.3 Hz), 1.77 (m, 1H), 1.35-1.65 (m, 6H), 1.27 (q, J=9.0 Hz, 1H), 1.16 (d, J=5.5 Hz, 1H), 1.12 (s, 3H), 1.10 (m, 1H), 1.07 (d, J=6.1 Hz, 1H), 0.96 (m, 2H), 1.13 (td, J=11.4 Hz, 3.9 Hz, 1H), 0.73 (s, 3H), $^{13}$C NMR: (125 MHz, DMSO-d$_6$) δ (ppm)=199.54, 171.48, 123.65, 70.24, 58.21, 55.25, 53.73, 42.25, 39.51, 38.53, 35.58, 35.35, 33.85, 32.79, 31.97, 25.49, 24.34, 23.64, 20.80, 17.28, 12.29

Compound 4 (1.58 g, 5 mmol) and hydrazine monohydrate (1.5 g) were dissolved in methanol (20 mL). The solution was stirred at room temperature for 1 h. Ethyl acetate (100 mL) was added and the solution was washed with brine (50 mL×4). The organic phase was then dried over Na$_2$SO$_4$ and the solvent was then removed. The residue was purified by column chromatography to give the product 5 (1.08 g)

Compound 5 (330 mg, 1 mmol), DCC (309 mg, 1.5 mmol), HOBt hydrate (306, 2 mmol) and Et$_3$N (202 mg, 2 mmol) were dissolved in DMF (10 mL) and the solution was then cooled to 0° C. Compound 1 was added and the solution was stirred at 0° C. for 4 hours. Ethyl acetate (100 mL) was added and the solution was washed with brine (60 mL×4). The organic phase was then dried over $Na_2SO_4$ and the solvent was removed. The residue was purified by column chromatography to give the product 5 (282 mg)

Compound 6 (280 mg, 0.47 mmol) and $Et_3N$ (237 mg, 5 mmol) were dissolved in a solution of dichloromeathane and DMSO (6 mL, 5:1). $SO_3$Pyridine (224 mg, 1.41 mmol) was added. The solution was stirred for 2 h and quenched by $Na_2S_2O_3$ solution. Ethyl acetate (50 mL) was added and the solution was washed with brine (40 mL×4). The organic phase was then dried over $Na_2SO_4$ and the solvent was removed. The residue was purified by column chromatography to give the product 7 (162 mg).

HPMA (80 mg, 0.56 mmol) and compound 7 (48 mg, 0.079 mmol), AIBN (1.40 mg, 0.0086 mmol) and CTA (2.39 mg, 0.0086 mmol) were dissolved in methanol (1.1 mL) in an ampule. After being purged by Argon for 1 min, the ampule was sealed and put in an oil bath at 63° C. for 48 h. The solution was then purified by LH-20 to give the final product (86 mg).

Example 7

9. Synthesis of ProGel-Sinonemine

Scheme 11. Synthesis of ProGel-sinonemine

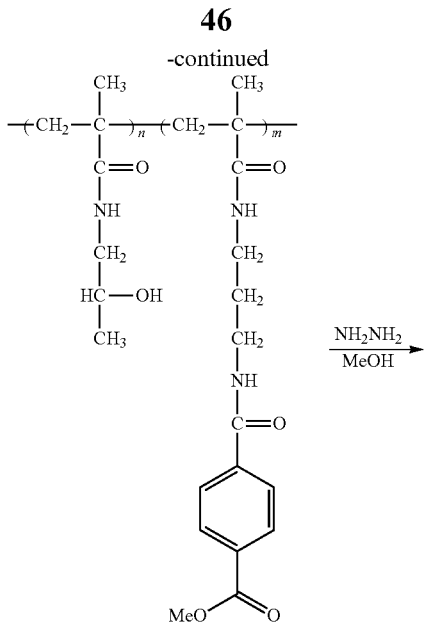

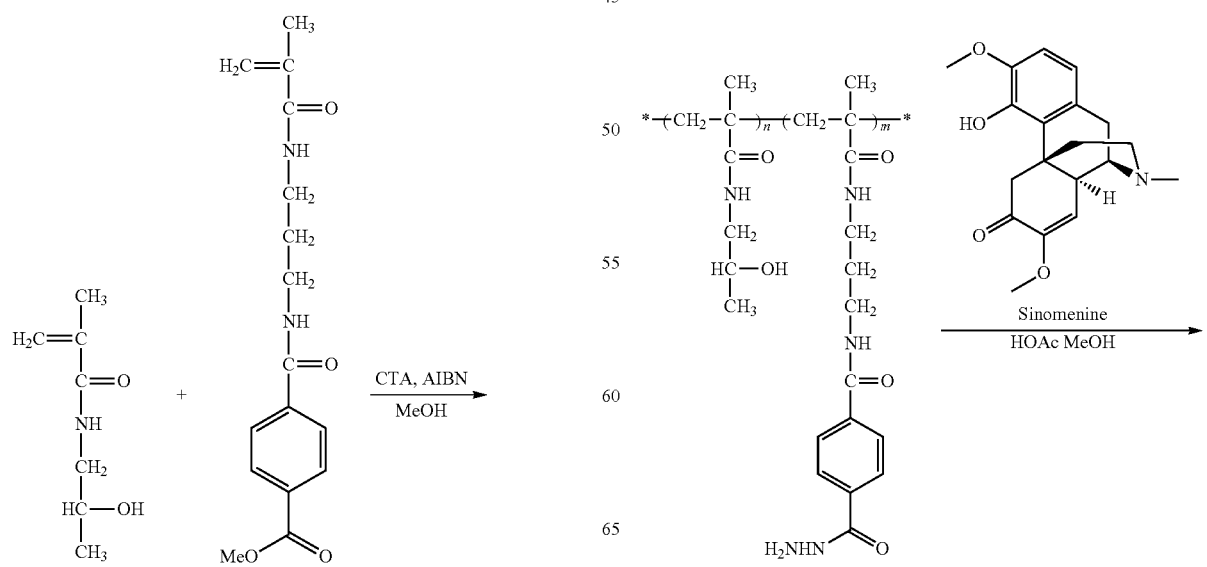

47

-continued

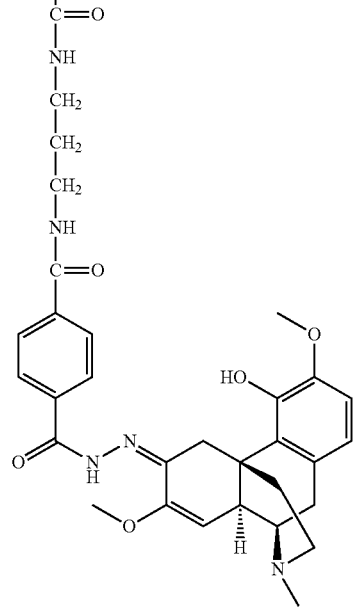

HPMA (600 mg, 4.19 mmol), APMA-Terephlate-OMe (219 mg, 0.72 mmol), CTA (46.3 mg, 0.16 mmol) and AIBN (48.4 mg, 0.30 mmol) were dissolved in methanol (6 mL). The solution was then transferred to an ampule and bubbled by Argon for 1 min. The ampule was then sealed and put in a heated oil bath (55° C.). The solution was stirred for 48 h. After separation by LH-20 and lyophilization, the polymer (640 mg) was obtained.

The polymer (320 mg) and hydrazine monohydrate (300 mg) were dissolved in methanol (10 mL) and stirred overnight. The solvent was removed and the residue was purified by LH-20. The product was lyophilized to get the hydrazide polymer (260 mg).

The hydrazide-containing HPMA copolymer (100 mg), HOAc (4 mg) and sinonemine (200 mg) were dissolved in methanol (2 mL) and stirred for 40 h. Then the solution was filtered and the filtrate was purified by LH-20 to remove small molecules. After lyophilization, 110 mg product was obtained.

48

Example 8

10. Synthesis of ProGel-Hydromorphone

Scheme 12. Synthesis of ProGel-hydromorphone

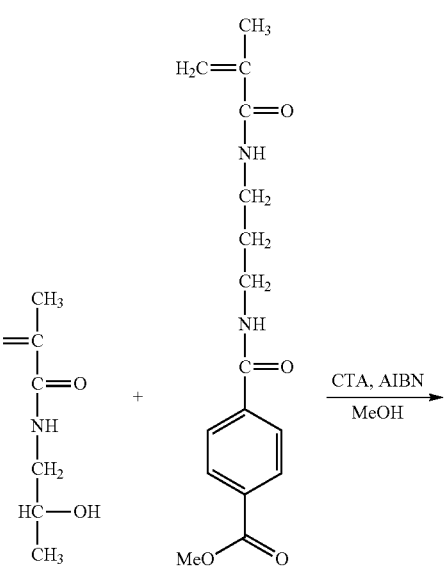

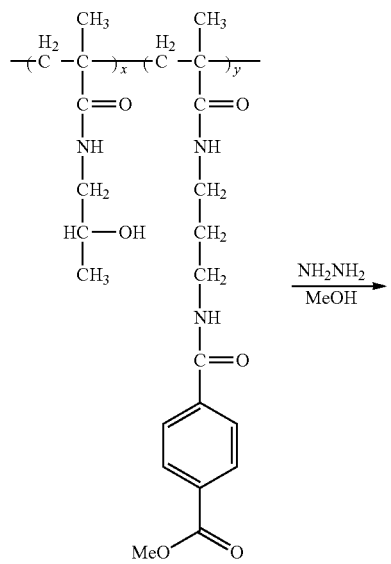

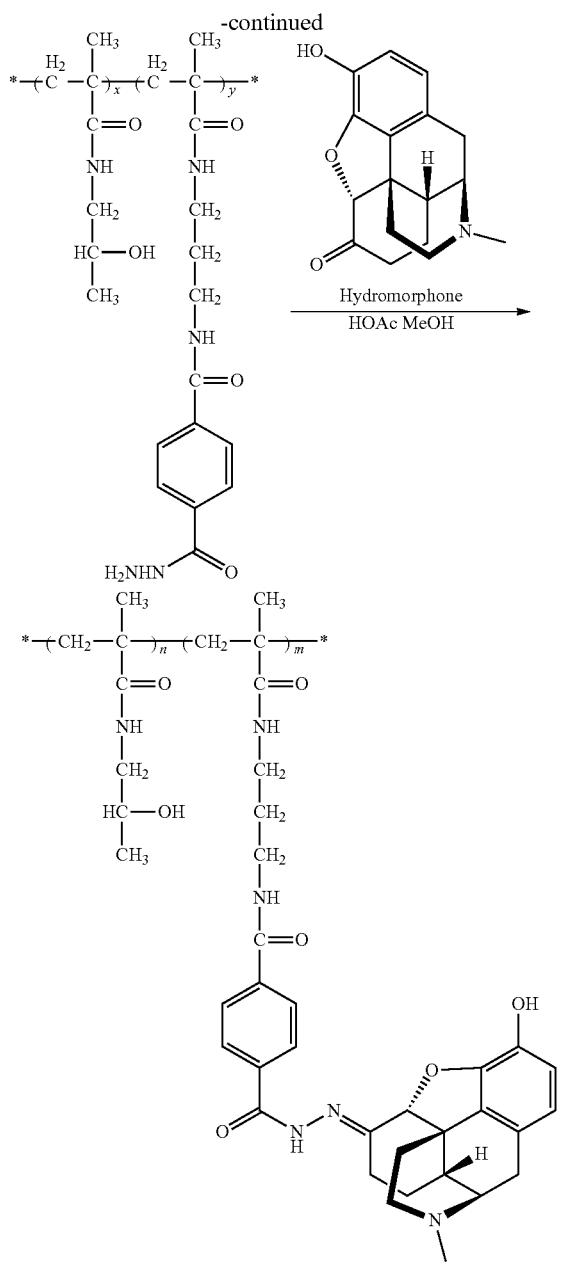

The hydrazide-containing HPMA copolymer (100 mg), HOAc (3 mg) and hydromorphone (100 mg) were dissolved in methanol (2 mL) and stirred for 40 h. Then the solution was filtered and the filtrate was purified by LH-20 to remove small molecules. After lyophilization, 105 mg product was obtained.

ProGel-Dex Characterization

Size exclusion chromatography (SEC, Superdex 75 10/300 GL, mobile phase 30% acetonitrile in 1×PBS) with an ÄKTA pure fast protein liquid chromatography (FPLC) system equipped with Multi Angle Light Scattering (MALS, Wyatt) and Optilab T-rEX refractive index detector (Wyatt) were used to determine the weight-average molecular weight ($M_w$), and the polydispersity index (PDI) of the copolymers. To quantify Dex content in ProGel-Dex, the copolymers (2 mg/mL) were hydrolyzed in 0.2 N HCl in 50% methanol overnight. The resulting solution was neutralized using 0.2 N NaOH in 50% methanol and analyzed on a Agilent 1260 Infinity II HPLC system with a reverse phase analytical $C_{18}$ column (InfinityLab Poroshell 120 EC-C18, 4.6×250 mm, 2.7 µm, mobile phase, acetonitrile/water 4:6; detection, UV 240 nm; flow rate, 1 mL/min; injection volume, 10 µL) based on a Dex standard curve. The analyses were performed in triplicate. The mean value and standard deviation were obtained using Excel.

Dynamic light scattering was used to characterize the hydrodynamic diameter ($D_h$) and the potential change using Malvern Zetasizer Nano-ZS. The ProGel-Dex was dissolved in ddH$_2$O at 200 mg/mL. The diameter of the polymeric assembly (e.g., micelles) was determined at 4° C., 8° C., and 12° C. at a 90° angle in triplicate. The temperature was set with a 15-min equilibrium time before the measurement. Data were analyzed by the Zetasizer software version 7.12.

Determination ProGel-Dex's Sol-Gel Phase Transition Temperature

The phase transition temperature of ProGel-Dex with different parameters (Dex content and ProGel-Dex concentration) were measured using a vial titling method (Kashyap, N., et al., Design and evaluation of biodegradable, biosensitive in situ gelling system for pulsatile delivery of insulin. Biomaterials, 2007. 28(11): p. 2051-2060). A glass vial containing ProGel-Dex were placed in a cold-water bath fitted with a water circulating pump for increasing temperature evenly. A thermometer with an accuracy of 0.1° C. was immersed in the glass vial and the phase transition temperature of each ProGel-Dex was determined.

Rheological Property Characterization

The rheological behavior of ProGel-Dex was assessed using a rheometer (DHR-2 with a 20 mm parallel plate, TA Instrument, USA). Oscillation temperature ramp (4-40° C.) was performed at a fixed frequency of 10 rad/s and 0.5% strain with a heating rate of 0.5° C./min. The rheological parameters were within linear viscoelastic range (LVR). Oscillation strain sweep (0.01%-100%) was performed at 30° C. and 10 rad/s. Flow shear rate sweep (0.006-1000 1/s) was performed at 30° C. All the sample thickness was at 500 µm. The temperature of gelation ($T_{gel}$) is referred to as the temperature where the storage modulus (G') equals to the loss modulus (G") at the first time during the temperature ramp experiments. The shear yield stress is defined as the stress at which G' equals G" during the oscillation strain sweep experiments. Viscosity is determined at shear rate sweep experiment.

Characterization of ProGel-Tan

To determine the content of Tanshinone IIA in the polymer, we analyzed the content using a UV-Vis spectroscopy. We chose 480 nm as the wavelength because no UV absorption of the polymer carrier will be detected at this wavelength. The tanshinone content was determined based on a standard curve of tanshinone monomer.

ProGel-Tan in vitro release rate was evaluated under different pH (4.5, 6.0 and 7.4). The released tanshinone concentration was determined at Day 1, 2, 4, 7, 14 and 30.

Polyarticular Adjuvant-Induced Arthritis (AA) Rat Model

Male Lewis rats (175-200 g) from Charles River Laboratories (Wilmington, MA, USA) were used to establish the AA rat model. Briefly, rats received one adjuvant mixture containing heat killed *Mycobacterium tuberculosis* (H37RA, 1 mg) and N,N-dioctadecyl-N',N'-bis(2-hydroxyethyl)-1,3-propanediamine (LA, 5 mg) in paraffin oil (100 µL) via s.c. injection at the base of the rats' tails. The inflamed joints were observed from day 11 post-immunization. The established AA rats reached the inflammation plateau on day 14 were then randomly divided into 3 groups: 1. Saline treated group (208.3 µL/kg); 2. ProGel-Dex treated group (20 w/v % in saline, dose equivalent of Dex=10 mg/kg, 208.3 µL/kg); 3. Free Dex treated group (dexamethasone sodium phosphate 63.4 mg/mL in saline, Dex equivalent dose: 10 mg/kg, 208.3 µL/kg). All the treatments were via single intra-articular injection into right ankle on day 14 post-induction. An additional group of healthy rats were used as a negative control. Joint inflammation and body weight change were monitored daily from day 11.

Monoarticular Adjuvant Induced Arthritis (MAA) Rat Model

Male Lewis rats (175-200 g) were purchased from Charles River Laboratories (Wilmington, MA). Monoarticular adjuvant induced arthritis was established as described previously (Weber, L., et al., *The Development of a Macromolecular Analgesic for Arthritic Pain*. Molecular Pharmaceutics, 2019). Briefly, the rats received two adjuvant immunization s.c. at different sites on their back with a week interval. The adjuvant mixture contained methylated bovine serum albumin (mBSA, 2 mg/mL, in water, 0.25 mL) and heat killed *Mycobacterium tuberculosis* (H37RA, 2 mg/mL, in paraffin oil, 0.25 mL). Two weeks after the second immunization, rats received a booster i.a. (intra-articular) injection of mBSA (10 g/L, in water, 50 µL) in their right knee joints. The treatment was initiated on the following day of the booster injection when the onset of the arthritis in the right knee joints was confirmed by the presence of joint swelling. The rats with established arthritis were randomly assigned into the following treatment groups on day 0:1. Saline treated group (208.3 µL/kg); 2. ProGel-Dex treated group (20 w/v % in saline, dose equivalent of Dex=10 mg/kg, 208.3 µL/kg); 3. Free Dex treated group (dexamethasone sodium phosphate 63.4 mg/mL in saline, Dex equivalent dose: 10 mg/kg, 208.3 µL/kg). Matched healthy control rats were included. The width of the rat knee joints were measured using a digital Vernier caliper. The following pain related behaviors were measured: incapacitance test and pressure application measurement (PAM). Blood samples were collected through the tail artery weekly and CBC, liver and kidney function tests analyzed. Serum samples were separated from the whole blood samples and stored at −20° C. for further evaluation. The rats were euthanized at day 21. The tissues/organs (heart, kidney, liver, spleen, lung, adrenal gland) were collected, weighted and fixed in the neutralized formalin for future toxicity evaluation. The hind legs were also collected and fixed in the neutralized formalin for further micro-CT analyses and morphology analyses.

Monoiodoacetate (MIA) Induced Osteoarthritis Model Induction

Nine-week old CD-1 mice from Charles River Laboratories (Wilmington, MA) were used for the MIA model. Under anesthesia, mice received monoiodoacetate (MIA, 0.3 mg/10 µL per mice) via intra-articular injection to the right knee joints. For better dispersion of the MIA, knee joints were manually extended and flexed for 30 s. The MIA model was established on the following day post-MIA injection. The mice were then randomly assigned into the following treatment groups: 1. Saline treated group (416.6 µL/kg); 2. ProGel-Dex treated group (20 w/v % in saline, dose equivalent of Dex=20 mg/kg, 416.6 µL/kg); 3. Free Dex treated group (dexamethasone sodium phosphate 63.4 mg/mL in saline, Dex equivalent dose: 20 mg/kg, 416.6 µL/kg). Additional mice were used as healthy controls. The knee joint widths were measured using a digital Vernier caliper. The following pain related behaviors were measured: incapacitance test and pressure application measurement. After euthanasia, blood samples were collected via cardiac puncture for CBC, liver and kidney function test. Serum samples were separated from the rest of blood samples and stored at −20° C. for further evaluation.

ProGel-Dex Biodistribution

The IRDye 800CW labeled ProGel-Dex (ProGel-Dex-IRDye) and ProGel-Dex were mixed and administered to MAA rats (n=5) on day 0 (IRDye dose=4.5×10-7 mol IRDye/kg, Dex equivalent dose=10 mg/kg). Rats were then imaged with a Xenogen IVIS Spectrum in vivo system under anesthesia at designated time points. The images were captured with the following conditions: excitation: 778 nm (filter: 745 nm); emission: 794 nm (filter: 800 nm); exposure times: 2 s; field of view: 24.5 cm; binning factor: 8; f number: 2. The captured images were then analyzed using the Living Image 4.5 software (PerkinElmer Inc.).

Static Weight Distribution

To test the analgesic effect of the treatments, the static weight distribution between the hind limbs of rats and mice were measured using the incapacitance tester which consists of two force transducers capable of measuring the body weight that the animal places on each hind limb. Animals were placed on the apparatus with their hind paws centered on the two force transducers, and the average body weight distribution in grams was calculated over a period of 3 s. The weight bearing score is expressed as a ratio of the weight placed through the ipsilateral limb versus the sum of the weights placed through both the contralateral and ipsilateral limbs, with a ratio of 50% resulting from equal weight distribution across both hind limbs. Weight distribution was measured before model establishment, before drug administration and daily after treatment.

Mechanical Hyperalgesia

Pressure application measurement (PAM) was utilized to test mechanical hyperalgesia of rats. The PAM apparatus consists of a force transducer mounted on a unit fitted to the operator's thumb. The thumb unit is connected to a recording base unit containing the control panel and digital readout display. The apparatus has a force transducer with a range of 0-1500 g and the diameter of the circular contact is 5 mm Given the device's surface area of 19.6 $mm^2$, the animals were lightly, but securely held and the operator thumb unit placed on one side of the mouse knee joint and the forefinger on the other side. A gradually increasing squeeze force was applied across the joint at a rate of approximately 300 grams per second with a maximum test duration of 5 s. After calibration of the instrumentation, the force in grams applied was displayed on the digital screen and recorded. The test endpoint was determined when the animal withdraws its limb or shows behavioral signs of discomfort or distress, such as freezing of whisker movement or wriggling. The peak force applied immediately prior to limb withdrawal was recorded, and this value was designated as the limb withdrawal threshold (LWT), which was used to assess pain levels in each group.

Micro-CT Analysis

To evaluate the therapeutic effects and potential toxicity of ProGel-Dex after administration, whole legs and lumbar vertebral bone were isolated and fixed from experimental rats and mice for micro-CT (skyscan 1172, bruker) analysis. For mouse bones, the scanning parameters were set to 55 kV, 181 µA, 8.88 µm, 0.5 mm aluminum filter, 0.4 rotation step, 4 frames averaging and 180° scans. For rat bones, the scanning parameter were set to 70 kV, 141 µA, 13.47 µm, 0.5 mm aluminum filter, 0.4 rotation step, 6 frames averaging and 180° scans. Two standard calcium hydroxyapatite rods were scanned at each condition serving as standards for bone mineral density (BMD) calculation. The datasets were reconstructed using NRecon software (skyscan) and analyzed using CTAn software. All datasets were realigned and 3D-registered before analysis. The trabecular bone in $5^{th}$ lumbar vertebrae or distal femur was selected as region of interest to evaluate the potential side effects of dexamethasone. Calcaneus bone or joint subchondral bone was analyzed to evaluate the therapeutic efficacy. The bone mineral density (BMD) of trabecular bone, trabecular number (Tb.N) and percent bone volume (BV/TV) were analyzed.

ProGel-Tan Accelerate Delayed Fracture Healing 7-week-old, CD-1 mice were randomly grouped into healthy control, saline treated delayed fracture healing and ProGel-Tan treated delayed fracture healing. Prednisone (12 mg/kg, daily) was administered orally for 3 weeks before fracture to induce osteoporosis for the first step of the delayed fracture healing model. The mouse femur closed fracture model was established as previously described. After anesthesia, the right leg was scrubbed with iodine pad to prepare for surgery. A 3-mm medial parapatellar incision was created. The patella was dislocated to expose the femoral condyles. A hole was drilled into the femoral intramedullary canal at the intracondylar notch using a 25-gauge needle. A 25-gauge needle was inserted into the intramedullary canal to stabilize the impending fracture. The patella was repositioned, and the incision was closed using 5-0 non-absorbable suture. A closed diaphyseal fracture was then produced in the right femur with a 3-point bending device. This method has minimal comminution and minimal angulation of the intramedullary pin. Animals were radiographed immediately post-fracture to verify that a mid-diaphyseal fracture has been produced and then weekly till they are euthanized.

Three days post-fracture, ProGel-Tan-IRDye hydrogel (20% w/v, 100 uL/mouse) was given locally to the fracture site in ProGel-Tan treated group, while saline was given in mice in the saline treated group. LICOR imaging was performed before and immediately after the drug injection. On days 1, 2, 3, 5, 7, 14, 21, 28 and 56, images were taken to assess the clearance of the hydrogel from the fracture site.

Results

ProGel-Dex Characterization

ProGel-Dex has a weight average molecular weight ($M_w$) of 6.79 kDa with 1.006 PDI. The dexamethasone content of ProGel-Dex is 242.7±1.3 mg/g. We have synthesized different dexamethasone content polymers ProGel-Dex-low (202.0±4.0 mg/g) and ProGel-Dex-high (279.7±0.7) for sol-gel phase transition characterization.

The average hydrodynamic diameter ($D_h$) (size distribution by number) of the ProGel-Dex solution (20 w/v % in ddH$_2$O) was 23.12 nm at 4° C. and increased with the increasing of the temperature to 31.58 nm at 8° C., 53.38 nm at 12° C. and 77.85 nm at 16° C., consistent with temperature dependent aggregation of the micelle (FIG. 1). When the temperature reached above 16° C., the solution of ProGel-Dex became cloudy consistent with formation of large assembly, which was no longer suitable for the further light scattering analyses. However, when ProGel-Dex solution concentrations were prepared as 10 w/v % and 30 w/v %, the solutions became unstable with heterogeneous average hydrodynamic diameter ($D_h$) observed at all temperatures analyzed.

ProGel-Dex's Sol-Gel Phase Transition Diagram

ProGel-Dex, ProGel-Dex-Low and ProGel-Dex-High were dissolved in 300 µL distilled water to prepare different concentration solutions. The ProGel-Dex samples were incubated in a water bath at 4° C. and the temperature was gradually increased. A digital thermometer with 0.1° C. accuracy was used to monitor the temperature. The transition temperature was determined by vial inverting method with 2° C. step increase. The vials were inverted for 15 seconds; and if there was no visual solution fluidity, it was considered that gelation had occurred. The gelation temperature was recorded and the phase transition diagram was plotted in FIG. 2.

Rheological Property Characterization

Figure 3:
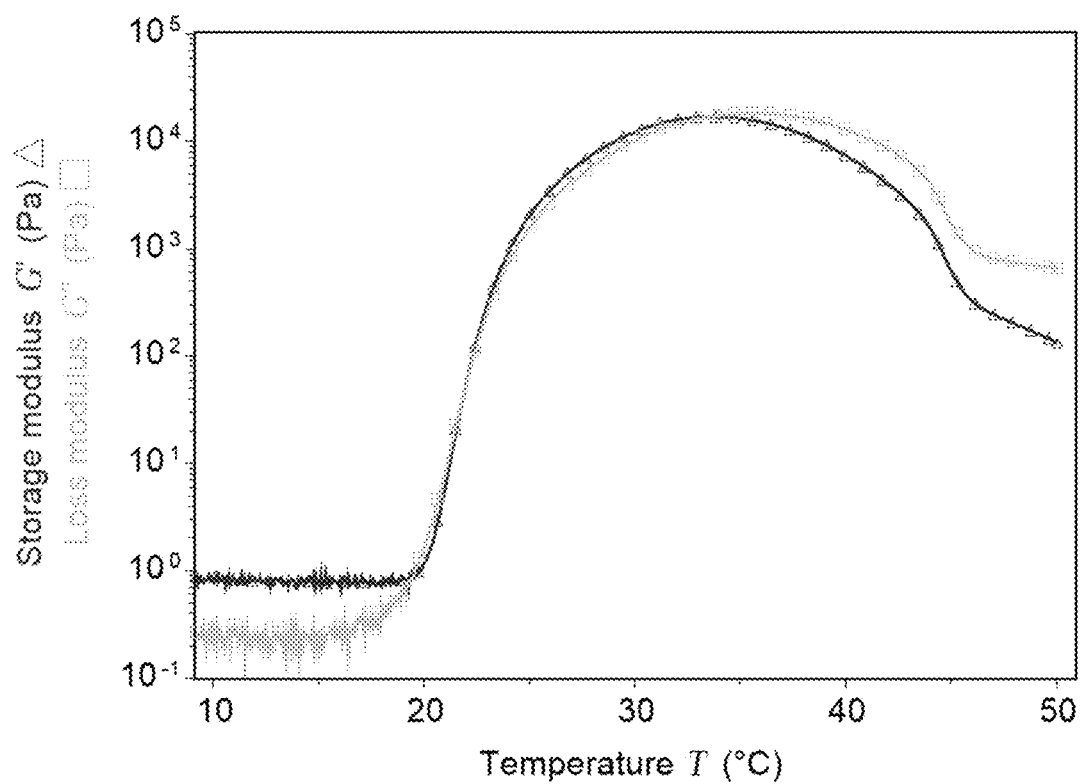
FIG. 3 illustrates the storage modulus G' and loss modulus G" as a function of temperature recorded during a temperature ramp (4-50° C. with 0.5° C./min) using a strain of 0.5% and a frequency of 10 rad/s. G' and G" crossover at 21.892° C. and 33.492° C.

Viscosity was determined in a flow shear rate sweep (0.0001-1000 1/s) experiment at 30° C. The viscosity at 0.0025 1/s shear rate was 21845.5 Pa·s. The yield stress was obtained during a strain sweep (0.01-100%) under a frequency of 10 rad/s. The yield stress was 51.4064 Pa. Gelation temperature point was determined in oscillation temperature ramp experiment. The gelation temperature was 21.892° C. under a frequency of 10 rad/s and 0.5% strain (see FIG. 3). Another cross over of G' and G" was recorded at 33.492° C. which syneresis happened. There was a thin layer of clear fluid observed above the hydrogel when moving up the geometry which correlates the phenomenon observed in phase transition experiments.

Therapeutic Evaluation

AA Model

Figure 4:
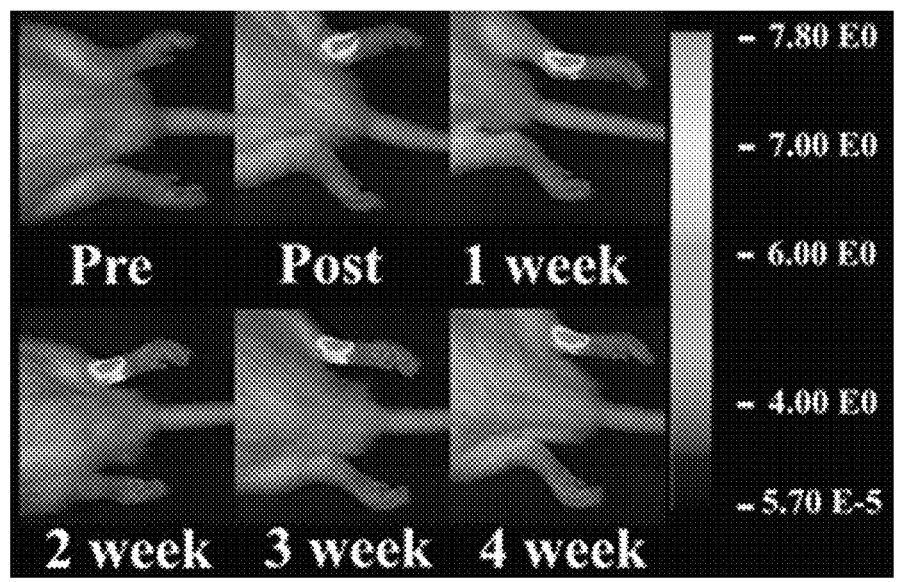
FIG. 4 is an optical image that shows strong NIR signal from the IRDye 800CW-labeled ProGel in the arthritic joint 4 weeks post-injection.
Figure 5:
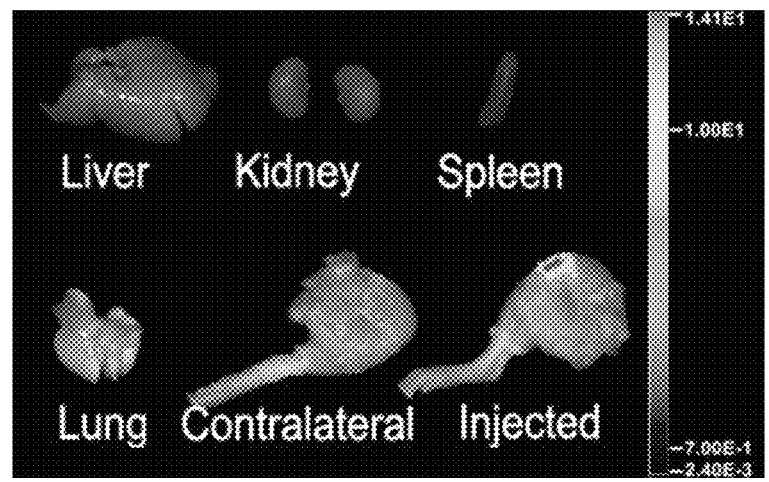
FIG. 5 illustrates biodistribution of the IRDye 800CW-labeled ProGel-Dex in the non-target organ tissues. In addition to the arthritic joint in which the ProGel was injected, only low levels of signal were observed in the kidney, consistent with renal clearance of the prodrug.

Optical imaging demonstrates retention of the IRDye 800CW-labeled ProGel in inflamed knee 4 weeks post injection (FIG. 4). The distribution of the IRDye 800CW-labeled ProGel-Dex in the non-target organ/tissues could not be detected except very low level in the kidney (FIG. 5), consistent with anticipated low extra-articular prodrug exposure and kidney clearance of the prodrug.

Figure 6:
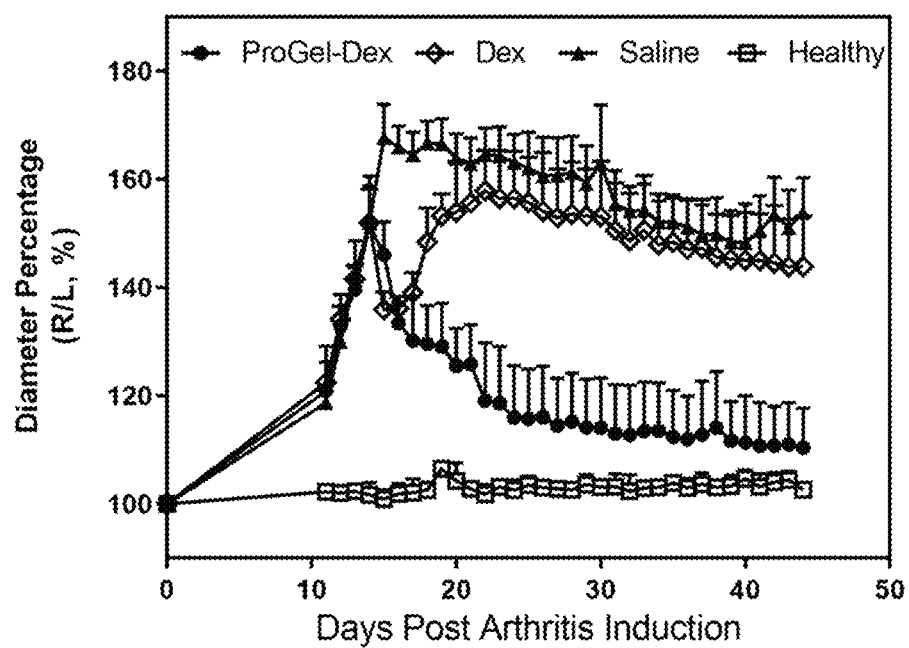
FIG. 6 illustrates that an intraarticular injection of ProGel-Dex provided sustained amelioration of arthritis for 30 days in the adjuvant-induced polyarthritis rat model.

For therapeutic effect, ProGel-Dex treated animals showed marked resolution of the inflammation as indicated by the decreasing inflamed ankle diameter (FIG. 6).

MAA Model

Figure 7:
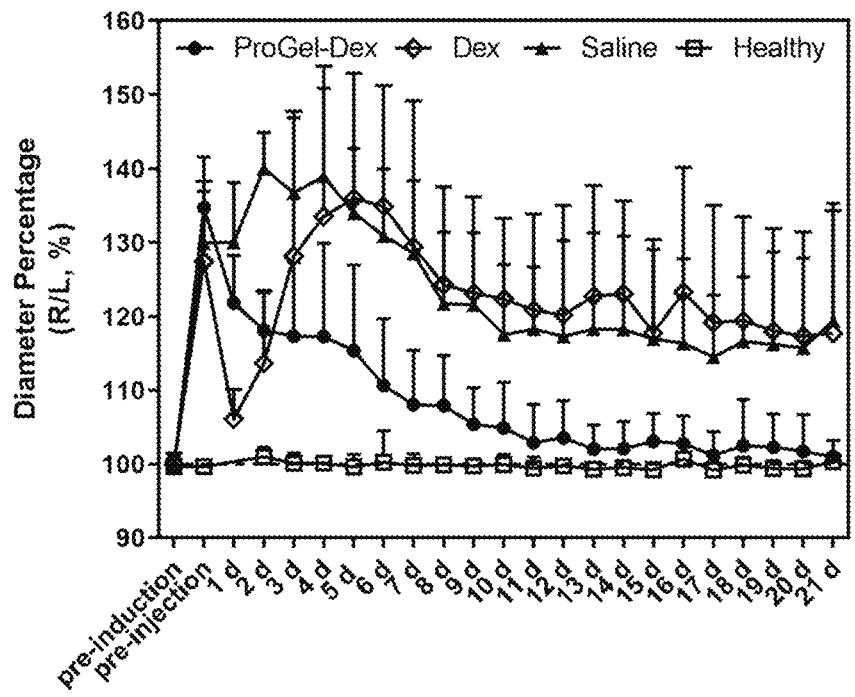
FIG. 7 illustrates the knee joint diameter change in the monoarticular adjuvant-induced arthritis (MAA) rat model.
Figure 8:
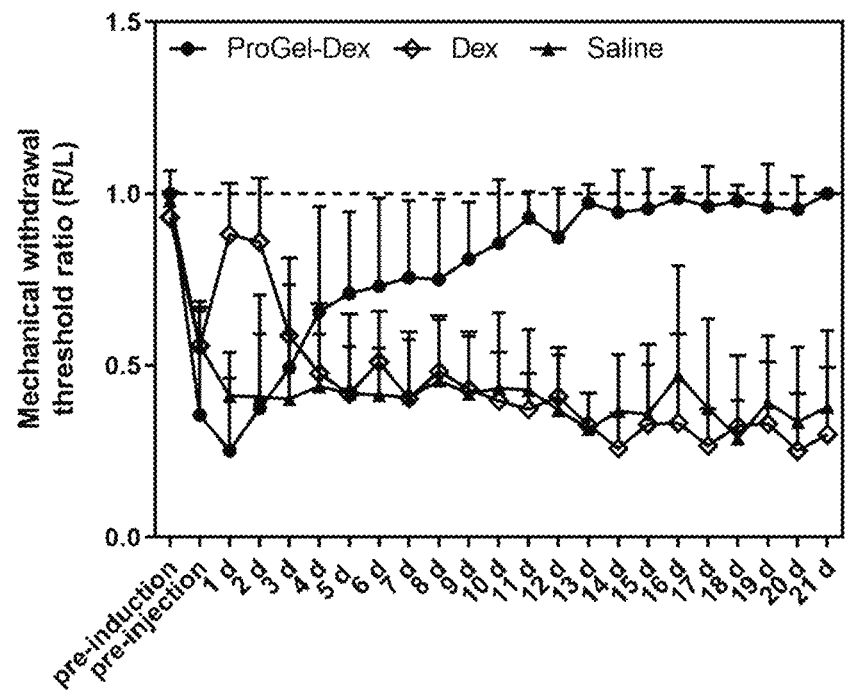
FIG. 8 illustrates a mechanical withdrawal threshold ratio from PAM test in the monoarticular adjuvant-induced arthritis (MAA) rat model.
Figure 9:
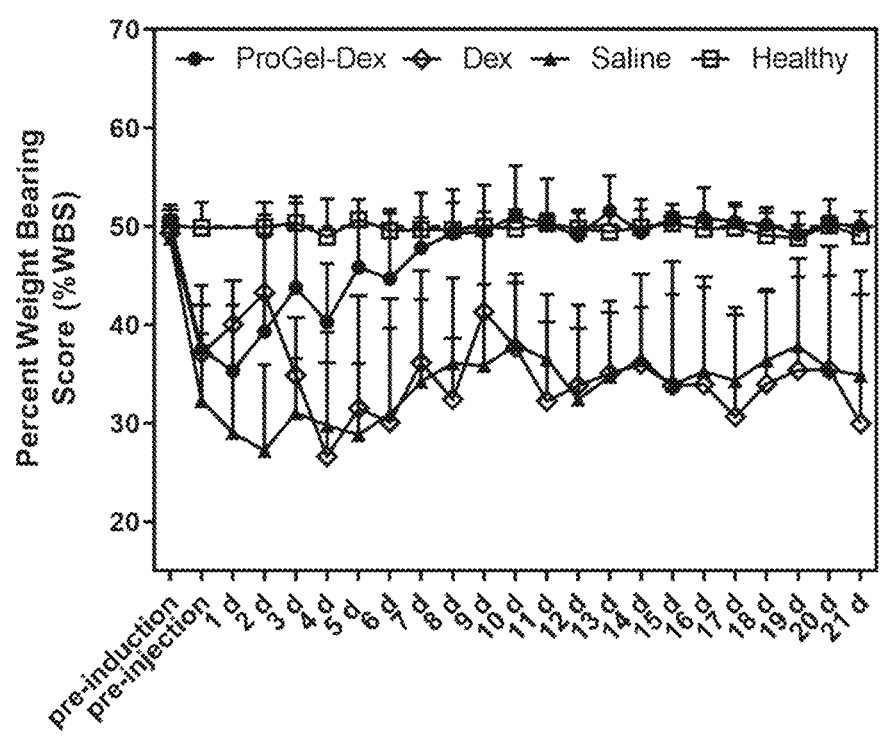
FIG. 9 illustrates the weight bearing score from the incapacitance test in the monoarticular adjuvant-induced arthritis (MAA) rat model.
Figure 10:
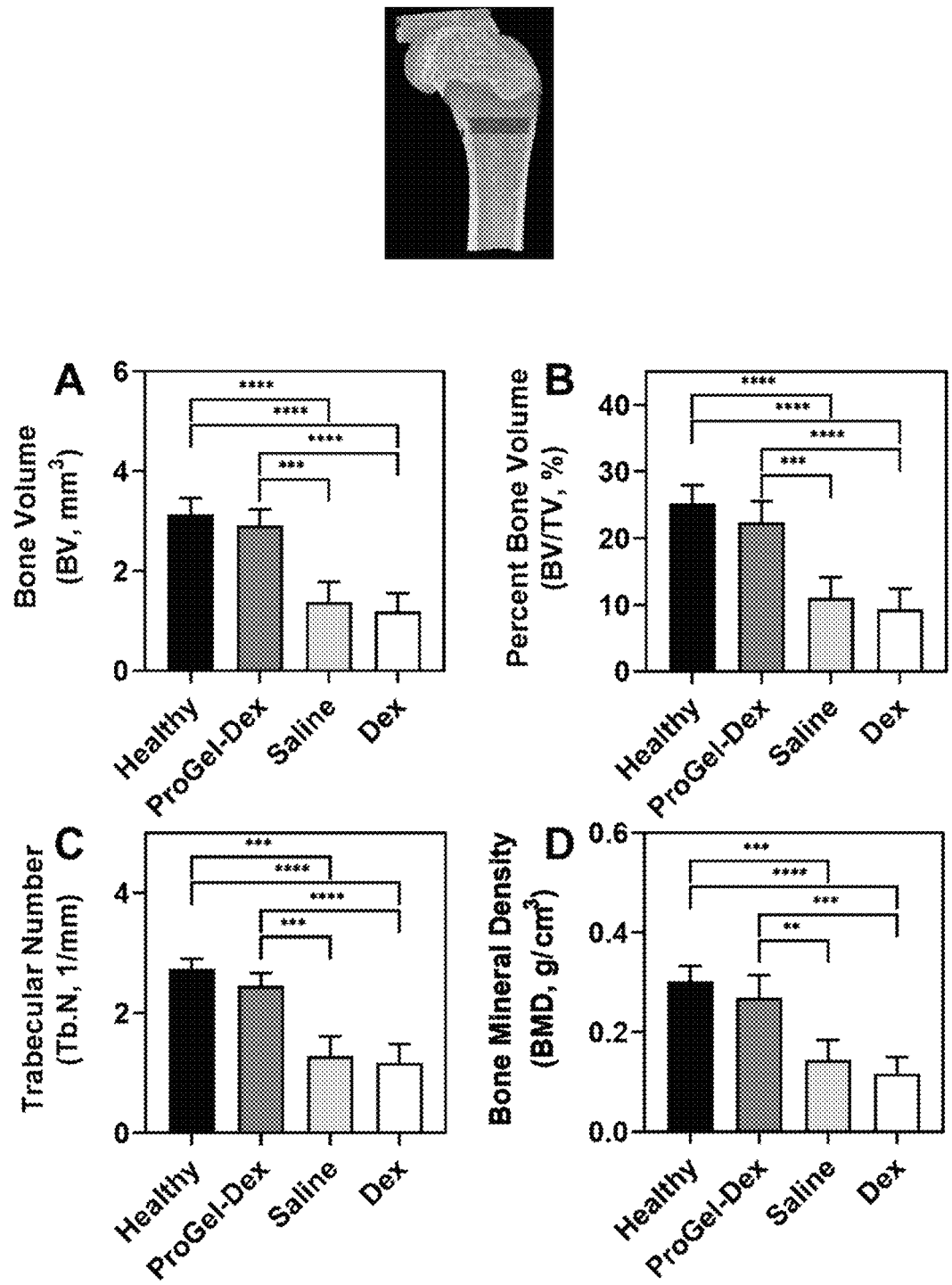
FIG. 10 illustrates the micro-CT analyses of the bone morphometric parameters of the secondary spongiosa (red label) from right femurs of the rats from the different treatment groups (, $P \leq 0.01$; *, $P \leq 0.001$; ****, $P \leq 0.0001$).
Figure 11:
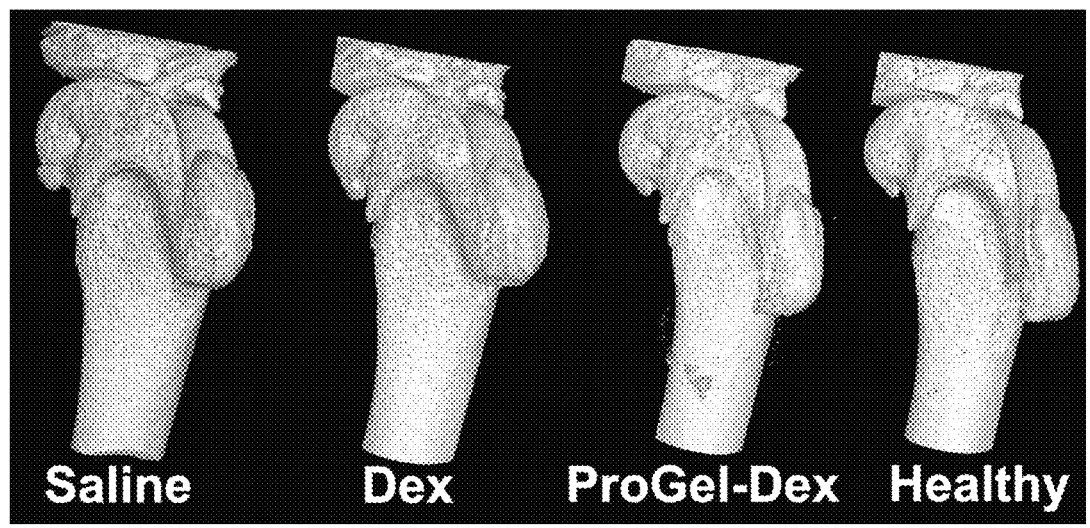
FIG. 11 illustrates the representative micro-CT images of MAA knee joint from each group.

The ProGel-Dex showed a sustained anti-inflammatory effect in the MAA rats resulting in amelioration of joint swelling (FIG. 7). The PAM (FIG. 8) and incapacitance tests (FIG. 9), were consistent with rapid resolution (3 days) of joint pain and this effect was sustained up to day 28, post ProGel-Dex administration. Micro-CT analyses of the secondary spongiosa of the right femurs showed preservation of the micro-architecture of bone in the ProGel-Dex treated animals (FIG. 10). Representative micro-CT images of MAA knee joint from the four groups (healthy, treated with Dex, treated with ProGel-Dex, and treated with saline) are shown in FIG. 11.

MIA Model

Figure 12:
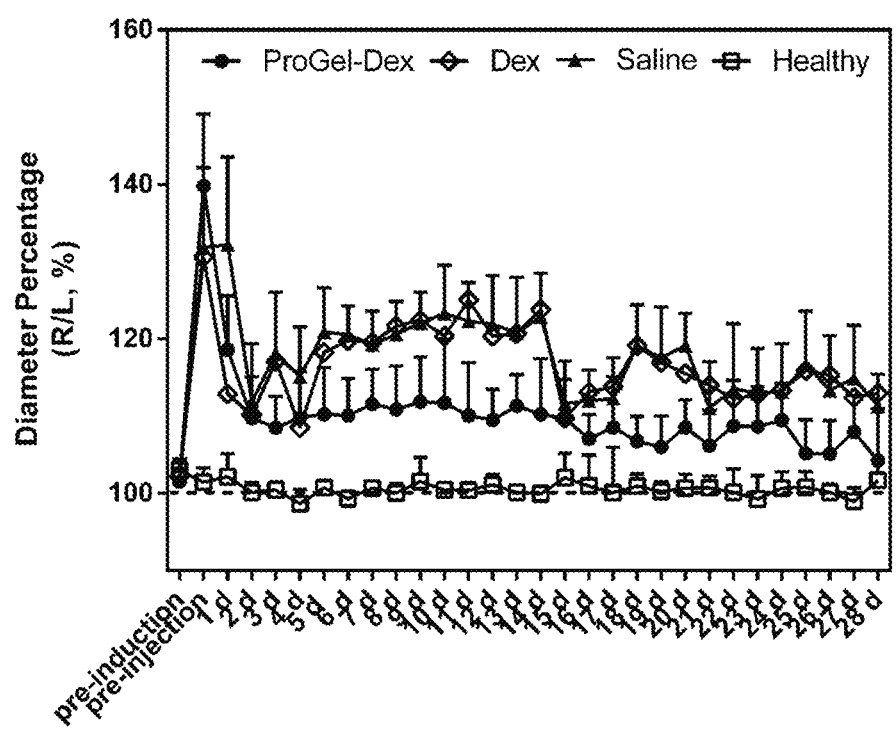
FIG. 12 illustrates the knee joint diameter change in the monoiodoacetate-induced osteoarthritis (MIA) mice model.
Figure 13:
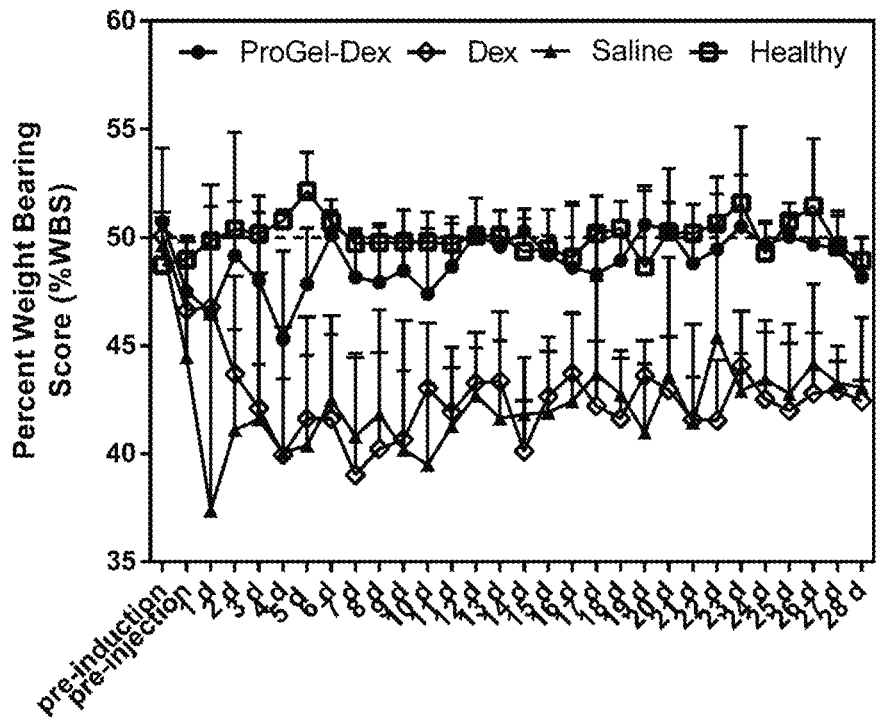
FIG. 13 illustrates the weight bearing score from the incapacitance test in the monoiodoacetate-induced osteoarthritis (MIA) mice model.
Figure 14:
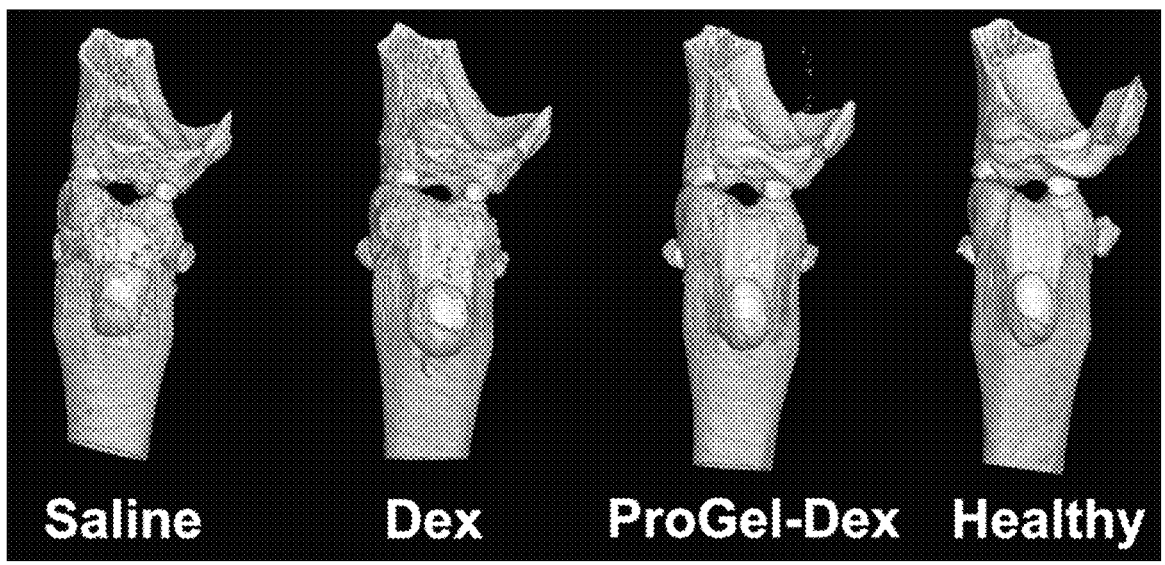
FIG. 14 illustrates the representative 3-D reconstructed knee joints from each treatment group of MIA mice. ProGel-Dex treated mice demonstrated similar structural features compared to the healthy group, while the saline group exhibited extensive bone erosion. Bone damage was also found in the Dex treated animals.

The ProGel-Dex treatment ameliorated the joint inflammation (FIG. 12) and reduced the joint pain in the monoiodoacetate-induced osteoarthritis (MIA) mice within 3 days-post administration and this effect was sustained up to day 28 (FIG. 13). The ProGel-Dex treatment resulted in preservation the peri-articular bone structure based on the reconstructed representative micro-CT images of the knee joints (FIG. 14).

ProGel Safety Evaluation

AA Model

Figure 15:
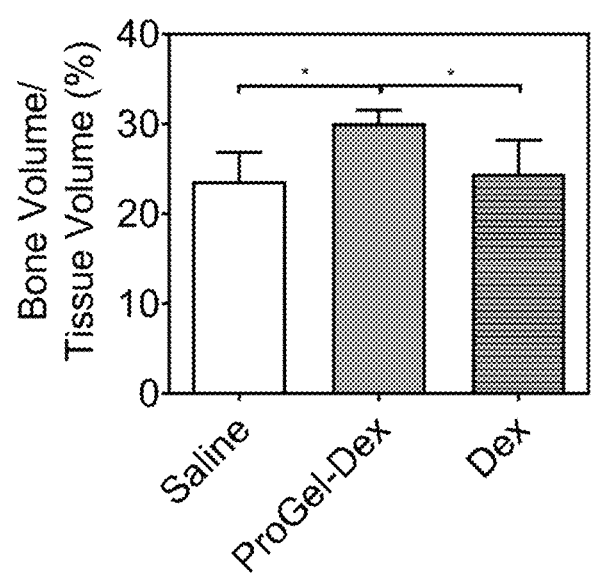
FIG. 15 illustrates the micro-CT analysis of the lumbar vertebral body, which showed significantly higher BV/TV as compared to the dose equivalent free Dex treated and the saline control. (*, $P \leq 0.05$).

No signs of acute inflammatory reactions were detected in response to the ProGel-Dex intra-articular deposition in all the models. There was no evidence of GC-induced osteopenia in the lumber vertebra based on micro-CT analysis (FIG. 15) in the AA model.

MAA Model

Figure 16A:
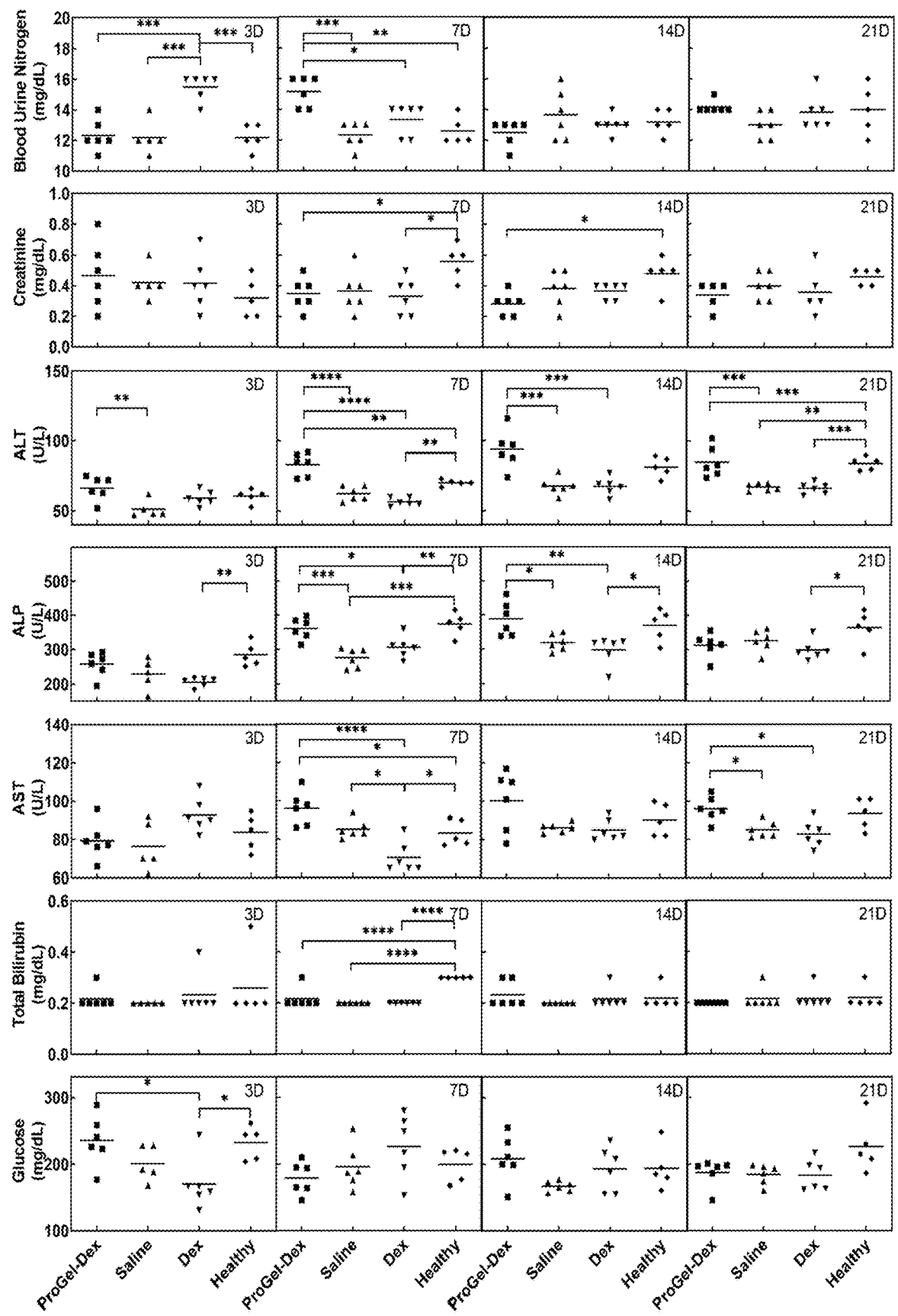
FIGS. 16A and 16B illustrate the liver and kidney function profiles of MAA rats from different treatment groups at different time points post-administration (*, $P \leq 0.05$; , $P \leq 0.01$; *, $P \leq 0.001$; ****, $P \leq 0.0001$).
Figure 16B:
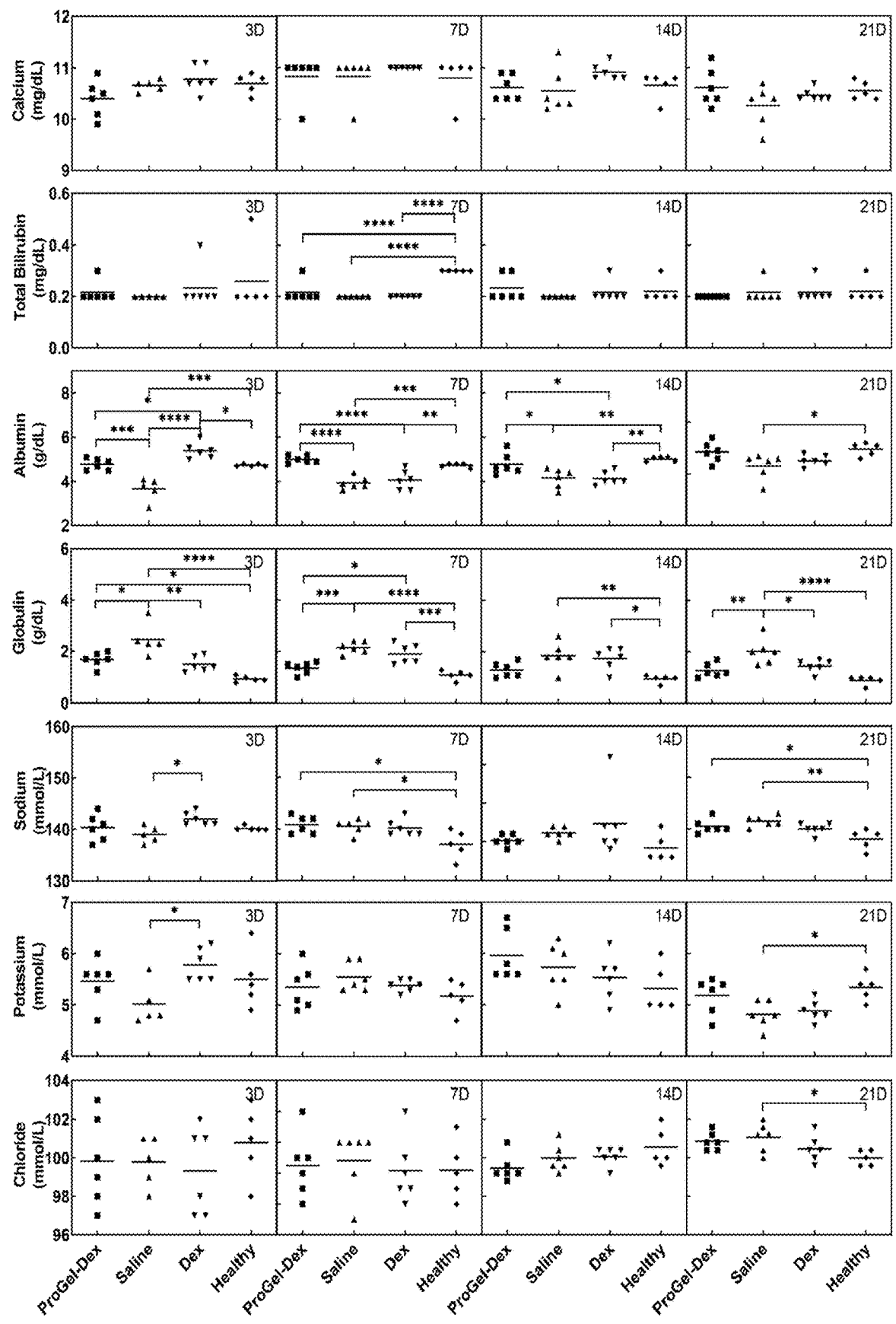
Figure 17:
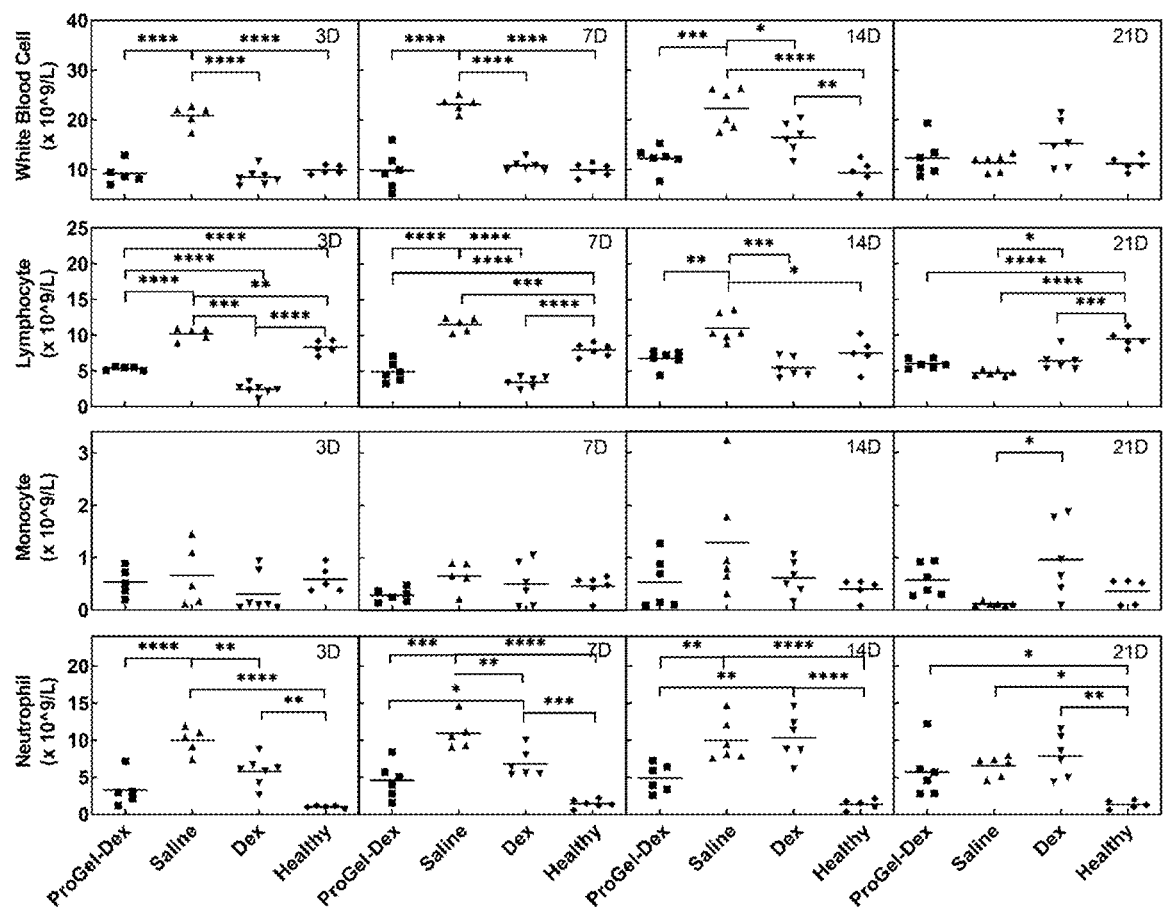
FIG. 17 illustrates the hematology profiles of MAA rats from different treatment groups at different time points post-administration. (*, $P \leq 0.05$; , $P \leq 0.01$; *, $P \leq 0.001$; ****, $P \leq 0.0001$).
Figure 18:
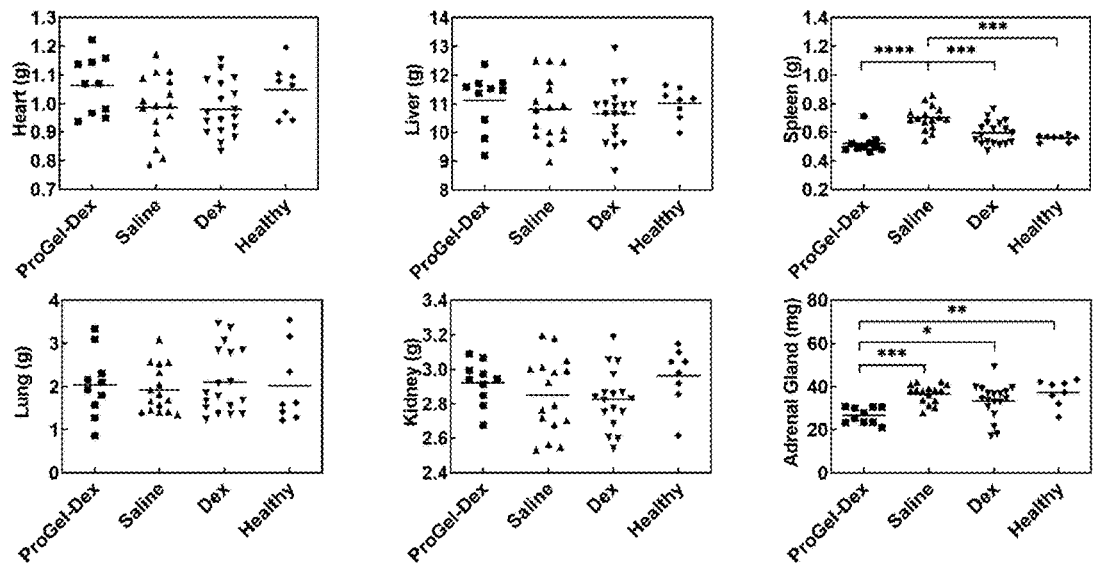
FIG. 18 illustrates the MAA rats' organ weights measured at euthanasia from different treatment groups. (*, $P \leq 0.05$; , $P \leq 0.01$; *, $P \leq 0.001$; ****, $P \leq 0.0001$). The ProGel-Dex treatment groups exhibited reduced adrenal gland weight.

Comprehensive hematologic and liver and kidney analyses were conducted to assess the safety of the ProGel-Dex. The ProGel-Dex treatment showed no significant toxicity effects on the hematology profiles or liver and kidney function profiles (FIGS. 16 & 17). Significantly lower adrenal gland weight was observed in the MAA rats treated with ProGel-Dex compared to the other treatment groups (FIG. 18).

MIA Model

Figure 19:
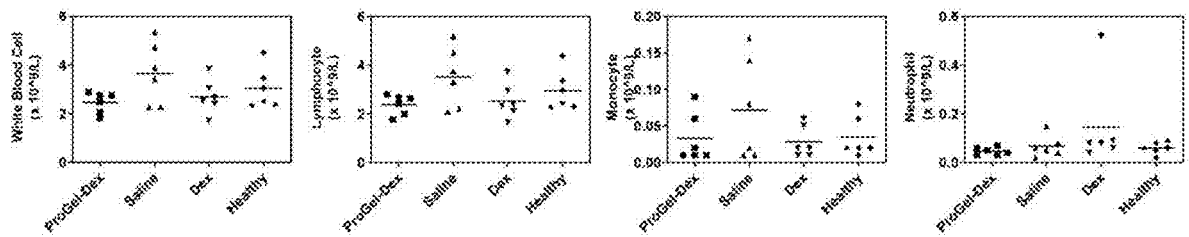
FIG. 19 illustrates the hematology profiles of MIA mice from different treatment groups. (*, $P \leq 0.05$).
Figure 20:
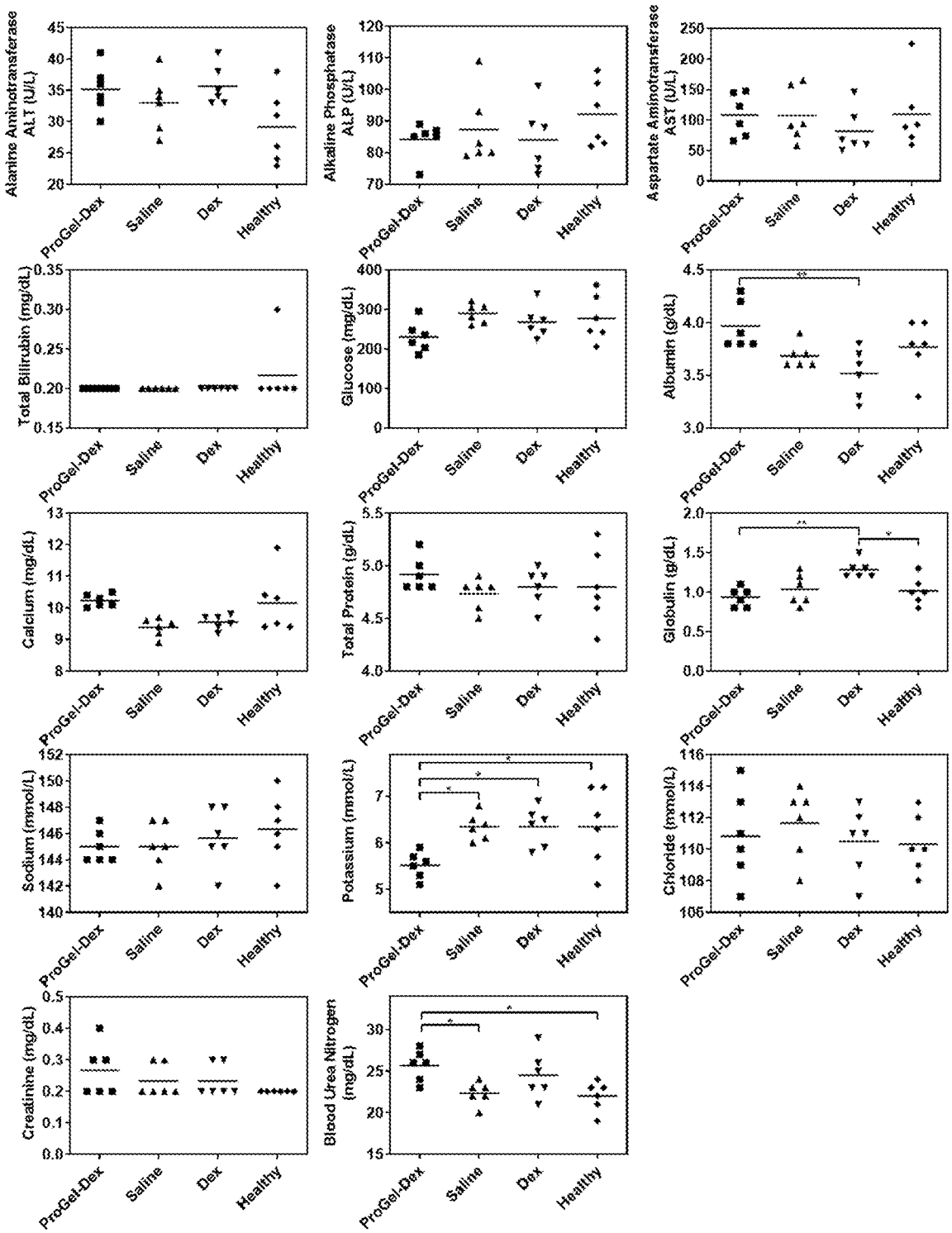
FIG. 20 illustrates the liver and kidney function profiles of MIA mice from different treatment groups. (*, $P \leq 0.05$; , $P \leq 0.01$; *, $P \leq 0.001$; ****, $P \leq 0.0001$).

The hematology and liver and kidney function tests were analyzed after euthanasia. The hematology and liver and kidney function profiles showed no significant evidence of toxicity in the ProGel-Dex treatment group (FIGS. 19 & 20).

Figure 21:
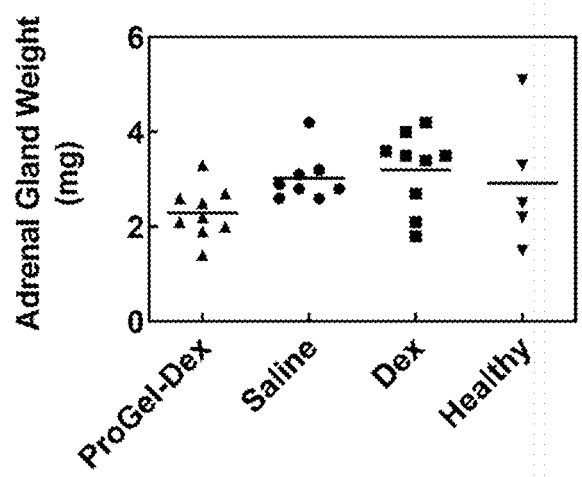
FIG. 21 illustrates the adrenal gland weights from MIA mice measured at euthanasia from different treatment groups. (*, $P \leq 0.05$; , $P \leq 0.01$; *, $P \leq 0.001$; ****, $P \leq 0.0001$).

No statistically significant difference was observed in the adrenal glands weight in the MIA mice treated with ProGel-Dex (FIG. 21).

ProGel-Tan Characterization

Figure 22:
FIG. 22 illustrates the formation of the hydrogel for 20% ProGel-Tan (left) and 25% ProGel-Tan (right).

Tanshinone content of ProGel-Tan is 160 mg/g. ProGel-Tan forms a hydrogel when the temperature is elevated. For ProGel-Tan with 20% w/v concentration, its viscosity increased dramatically at 35° C. Then at 37° C., the hydrogel was formed. For ProGel-Tan with 25% w/v concentration, its viscosity increased at 30° C., and the hydrogel was formed at 35° C. (FIG. 22).

Figure 23:
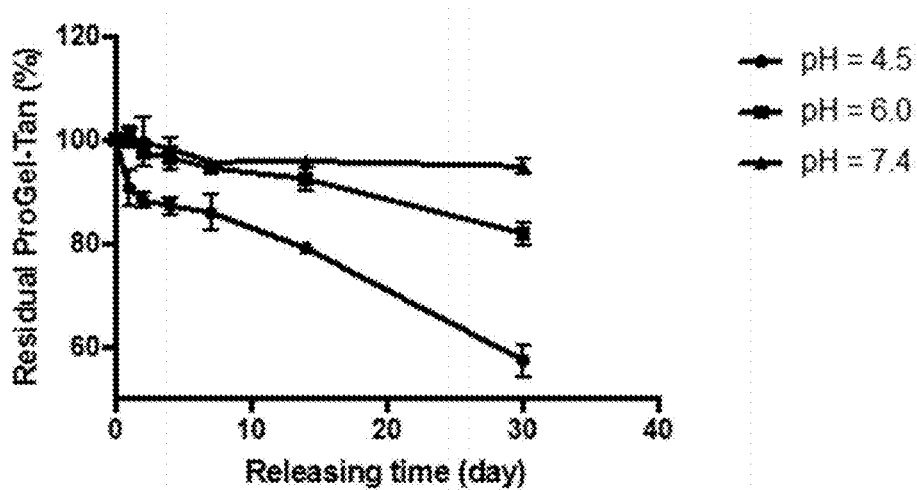
FIG. 23 illustrates the in vitro release of Tan from ProGel-Tan.

At pH 4.5, the release rate is relatively fast, approximately 1.4% per day on average, while at pH 6.0, the release rate is ~0.6% per day (FIG. 23). At pH 7.4, the release is much slower, with only 5% of Tan released for one month. This confirmed the effectiveness of pH-sensitive hydrazone bond as a linker.

Figure 24:
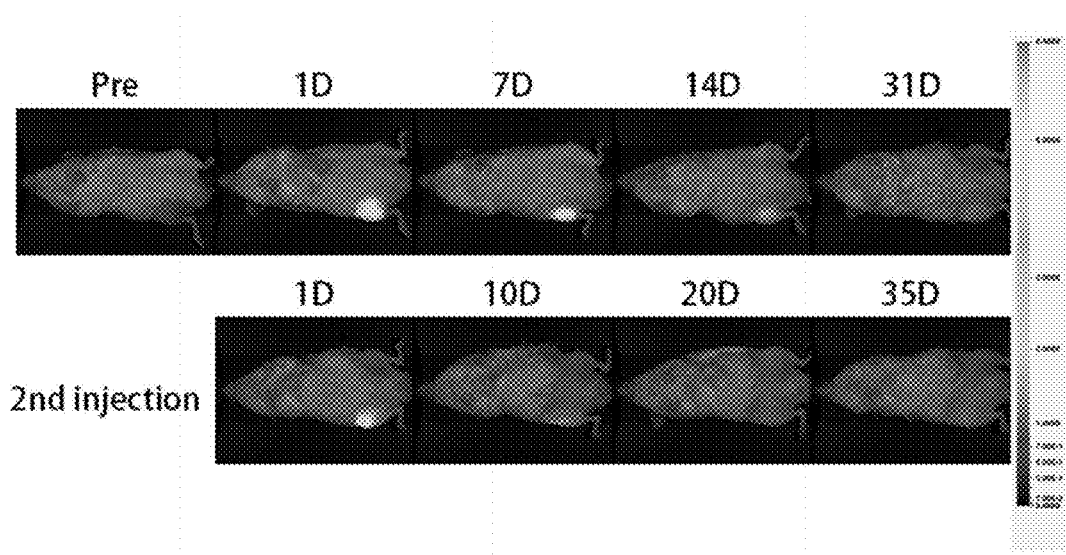
FIG. 24 illustrates sustained presence of ProGel-Tan at the fracture site post intra-callus injection.
Figure 25:
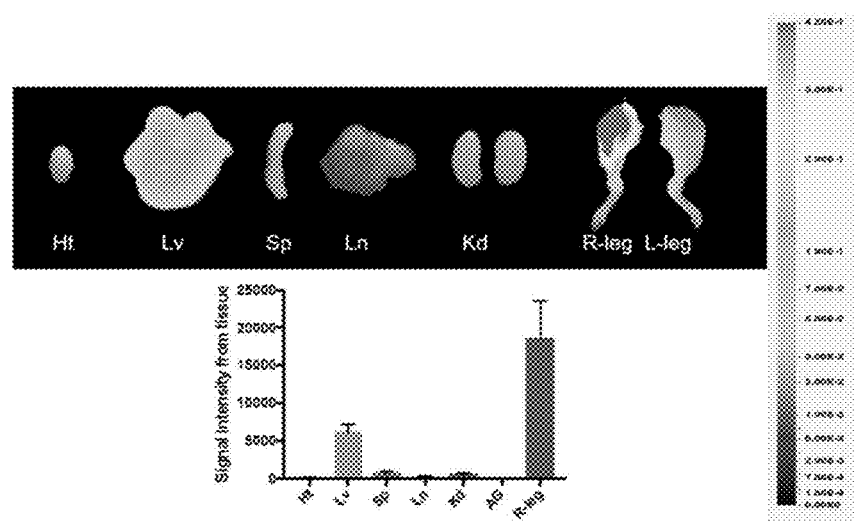
FIG. 25 illustrates the ex vivo visualization of ProGel-Tan hydrogel in different organs.

FIGS. 24 & 25 demonstrate that the intra-callus injected ProGel-Tan persists at the callus injection site for at least 1 month. Except for detectible presence in the liver, the ProGel-Tan signal is low in all of the other organs/tissues examine.

Figure 26:
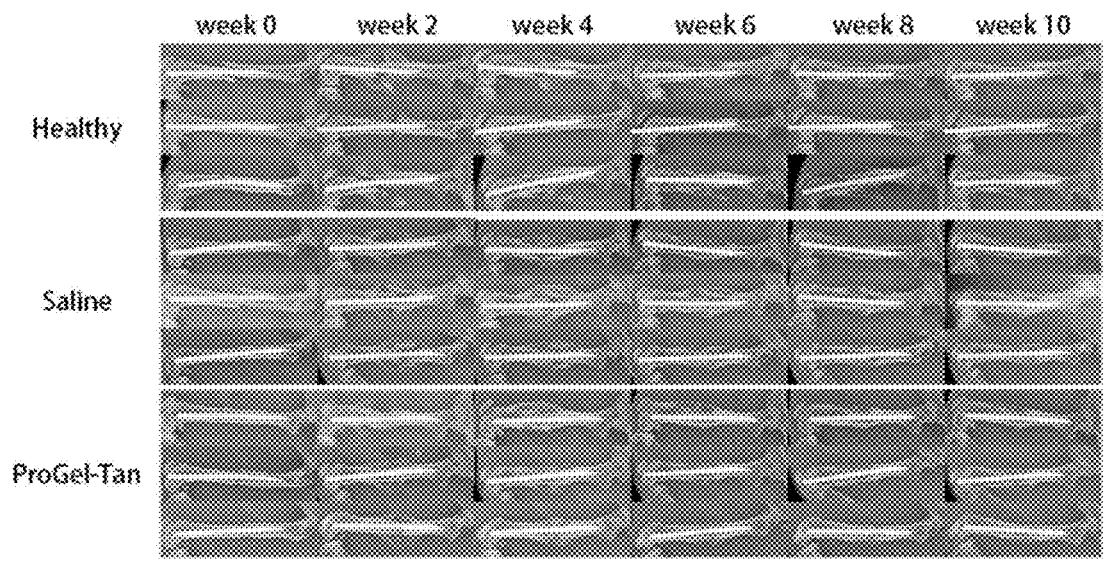
FIG. 26 illustrates the X-ray image of fracture callus tissue from different treatment groups.
Figure 27:
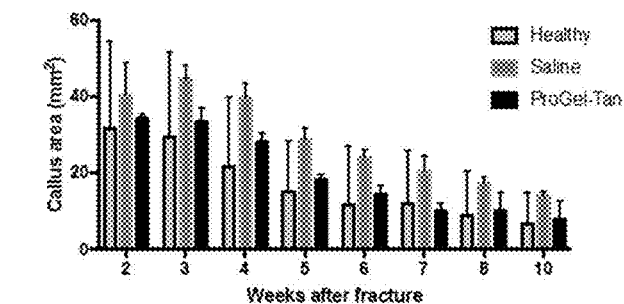
FIG. 27 illustrates the quantitative X-ray image analysis of the callus area.
Figure 27:
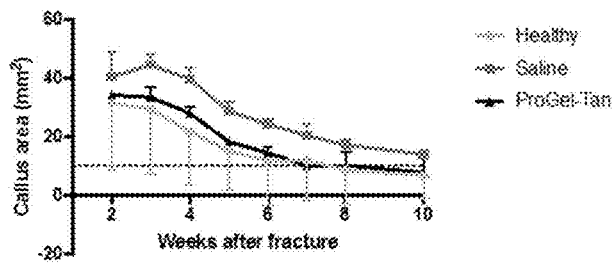

Radiographic analysis and quantitative assessment of the callus area demonstrate that both the healthy and ProGel-Tan treated animals share a temporally similar healing process, in contrast to the delay in healing in the saline treated mice (FIGS. 26 & 27).

In summary, the in vivo studies with ProGel-Dex and ProGel-Tan, convincingly demonstrate that the ProGel technology platform as a local site-specific delivery vehicle has broad utility across a spectrum of pathologic conditions, including inflammatory arthritis, OA, and fracture healing. We attribute the efficacy of the ProGel prodrugs to their unique capacity to form a gel at the local injection sites and for the gel to serve as a depot for sustained active drug release over an extended period of time. Importantly, this mechanism of action results in marked reduction in systemic drug distribution thus avoiding potential off-site non-target organ toxicity.

All references cited herein are incorporated by reference in their entirety for all purposes. While several embodiments have been described in the Examples above, it will be understood by those of ordinary skill in the art that various changes in form and details may be made therein without departing from the spirit and scope of the disclosure as defined by the following claims.

What is claimed is:

1. A thermoresponsive polymer-drug conjugate, comprising a hydrophobic drug molecule moiety covalently bonded to a water-soluble polymer carrier, wherein the polymer-drug conjugate comprises a plurality of repeating unit (A) and a plurality of repeating unit (B):

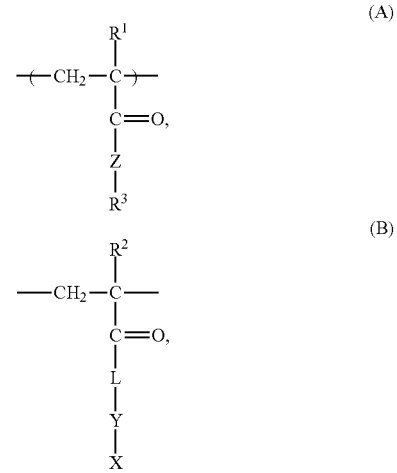

wherein:
$R^1$ and $R^2$ are independently H, methyl, or halogen;
$R^3$ is a $C_1$-$C_8$ alkyl substituted by one, two, or three OH groups;
X is a moiety of a drug molecule, or a pharmaceutically acceptable salt thereof;
L is a linker covalently connecting the drug molecule moiety X to the polymer backbone through Y;
Y is a functional group which, together with a part of the drug molecule moiety X or a part of the linker moiety L, forms an acid labile functional group that can be hydrolyzed under physiological conditions to release the drug molecule;
and
Z is NH or O;
wherein the polymer-drug conjugate is soluble in water at a first temperature and forms a prodrug hydrogel at a second temperature which is higher than the first temperature, wherein the second temperature is at least 28° C., and wherein the content of the hydrophobic drug moiety in the polymer-drug conjugate is 12% by weight or higher.

2. The thermoresponsive polymer-drug conjugate of claim 1, wherein the polymer carrier is a copolymer comprising N-(2-hydroxypropyl)methacrylamide monomer units.

3. The thermoresponsive polymer-drug conjugate of claim 1, wherein:
$R^1$ and $R^2$ each H or methyl;
$R^3$ is $C_2$-$C_5$ alkyl substituted by one or two OH groups;
L is —[NH(CH$_2$)$_i$C(O)]$_j$—, —NH(CH$_2$)$_k$—, —NH(CH$_2$)$_k$-T-(CH$_2$)$_p$—, —NH(CH$_2$)$_k$(NHC(O)—, —NH(CH$_2$)$_k$NH—(CH$_2$)$_p$-T-(CH$_2$)$_q$—C(O)—, or —NH(CH$_2$)(NHC(O)—(CH$_2$)$_p$-T-(CH$_2$)$_q$—C(O)—, wherein T is $C_6$-$C_{10}$ arylene, $C_3$-$C_8$ cycloalkylene, 5- to 10-membered heteroarylene, or 5- to 10-membered heterocycloalkylene, wherein I is an integer selected from 1 to 6; j is integer selected from 1 to 4; k is an integer selected from 1 to 10; p is 0, 1, 2, or 3; and q is 0, 1, 2, or 3;
Y is O, NH, or NH—N=, wherein "=" is a double bond;
and
Z is NH.

4. The thermoresponsive polymer-drug conjugate of claim 3, wherein:
   i is 1 or 2;
   j is 1, 2, or 3;
   k is an integer selected from 1 to 6;
   p is 0, 1, or 2; and
   q is 0, 1, or 2.

5. The thermoresponsive polymer-drug conjugate of claim 1, wherein:
   L is —[NHCH$_2$C(O)]$_j$—, —NH(CH$_2$)k, —NH(CH$_2$)$_k$-T-CH$_2$— or —NH(CH$_2$)(NHC(O)-T-C(O)—, wherein T at each occurrence is independently C$_6$-C$_{10}$ arylene or 5- to 10-membered heteroarylene; j is 2 or 3; and k is 2, 3, or 4.

6. The thermoresponsive polymer-drug conjugate of claim 1, wherein:
   R$^1$ and R$^2$ are each methyl;
   R$^3$ is a —CH$_2$CH(OH)CH$_3$;
   L is —NHCH$_2$C(O)NHCH$_2$C(O)—, —NH(CH$_2$)$_3$—,

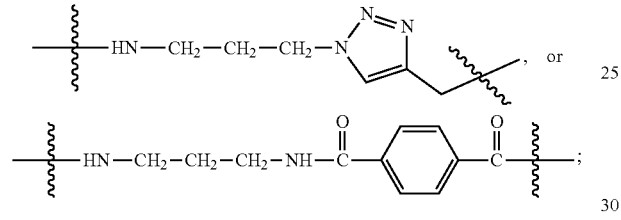

Y is O, NH, or NH—N=;
   and
   Z is NH.

7. The thermoresponsive polymer-drug conjugate of claim 1, wherein the drug molecule is selected from the group consisting of: glucocorticoids, nonsteroidal anti-inflammatory drugs (NSAIDS), analgesics, bone anabolic agents, antioxidants, anti-cancer agents, hormones, and antibiotics.

8. The thermoresponsive polymer-drug conjugate of claim 1, wherein the drug molecule is selected from the group consisting of dexamethasone, tanshinone IIA, progesterone, estradiol, curcumin, hydromorphone, sinomenine, and apigenin.

9. The thermoresponsive polymer-drug drug conjugate of claim 1, wherein:
   the repeating unit (A) is an N-(2-hydroxypropyl)methacrylamide monomer having a structure of formula:

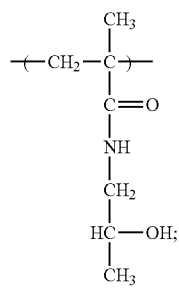

and
   the repeating unit (B) has a structure selected from the group consisting of:

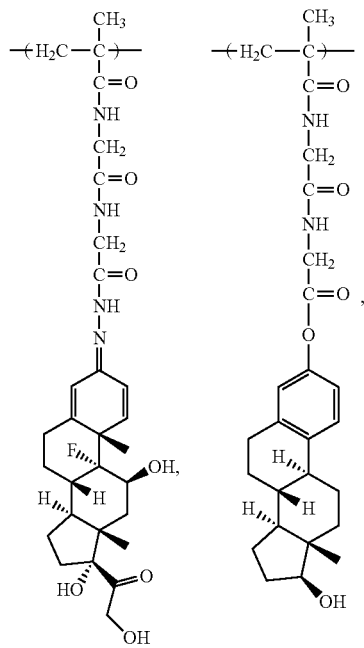

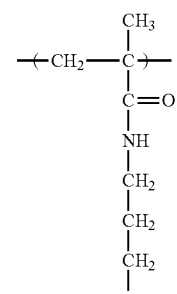

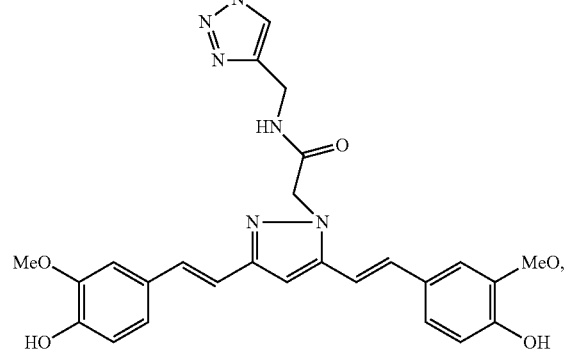

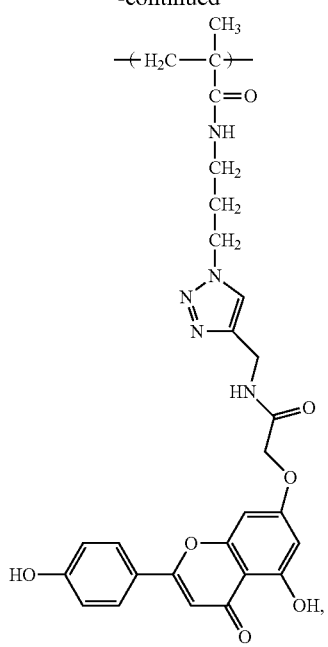
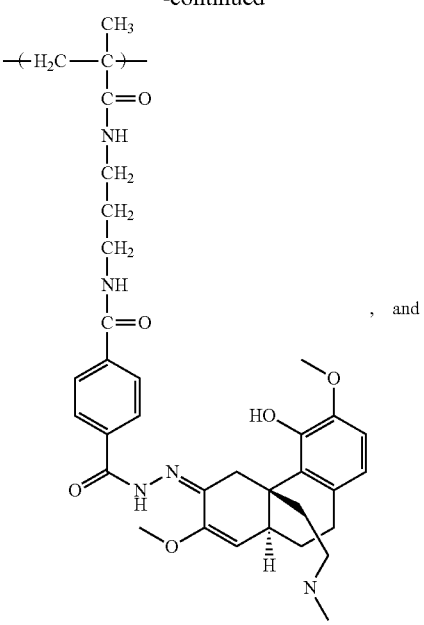, and
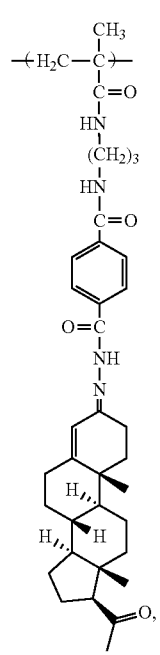
10. The thermoresponsive polymer-drug conjugate of claim 9, wherein the repeating unit (B) has the structure:

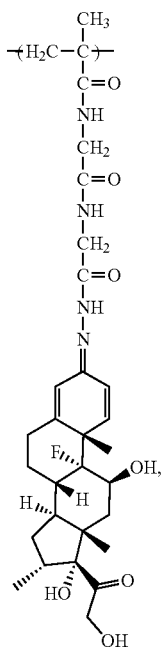

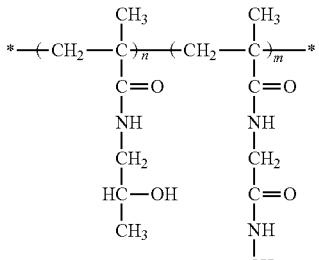

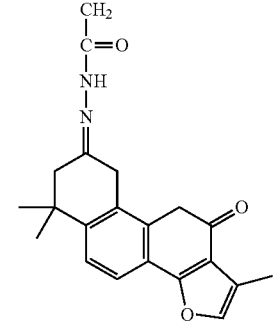

(ProeGel-Tan)

wherein the dexamethasone content of the polymer-drug conjugate is in the range of 15-40% by weight, and wherein the molecular weight of the polymer-drug conjugate is in the range of 1-45 kDa.

11. A pharmaceutical composition comprising a thermoresponsive polymer-drug conjugate of claim 10 and one or more pharmaceutically acceptable carriers and/or excipients, wherein the concentration of the polymer drug-conjugate in the composition is in the range of 10-50% w/v.

12. The thermoresponsive polymer-drug conjugate of claim 9, wherein the repeating unit (B) has the structure:

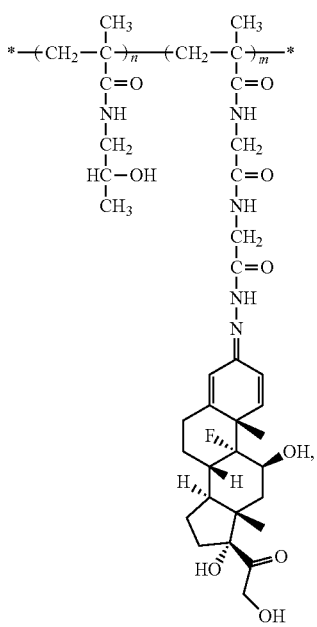

(ProeGel-Dex)

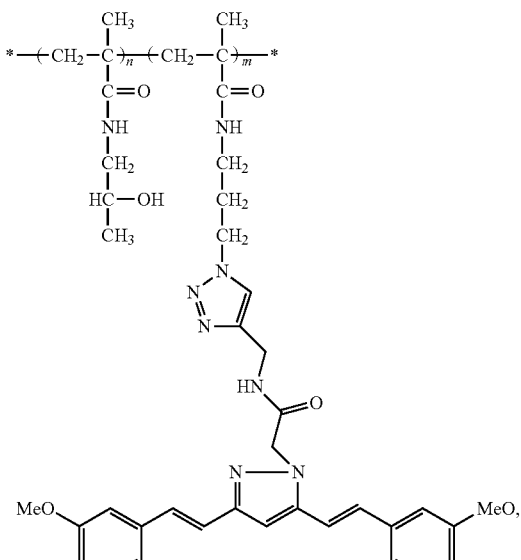

(ProGel-Curcumin)

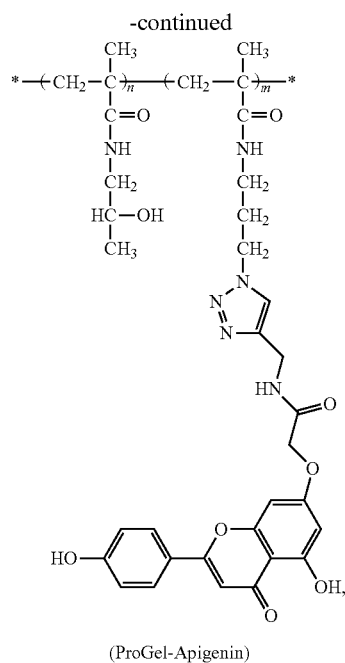
(ProGel-Apigenin)
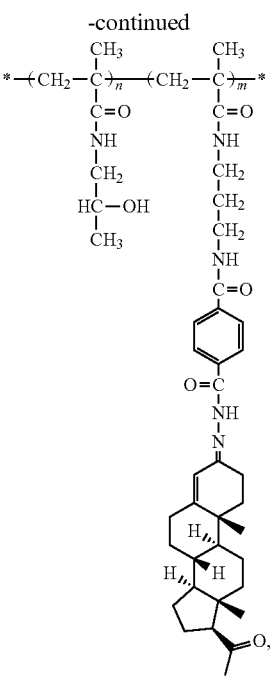
(ProGel-Progestrone)
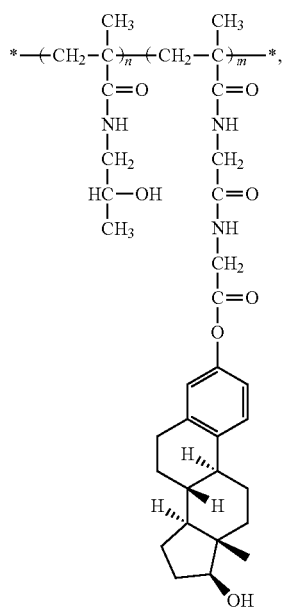
(ProGel-Estradiol)
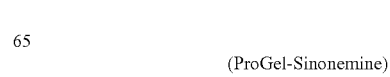, and
(ProGel-Sinonemine)

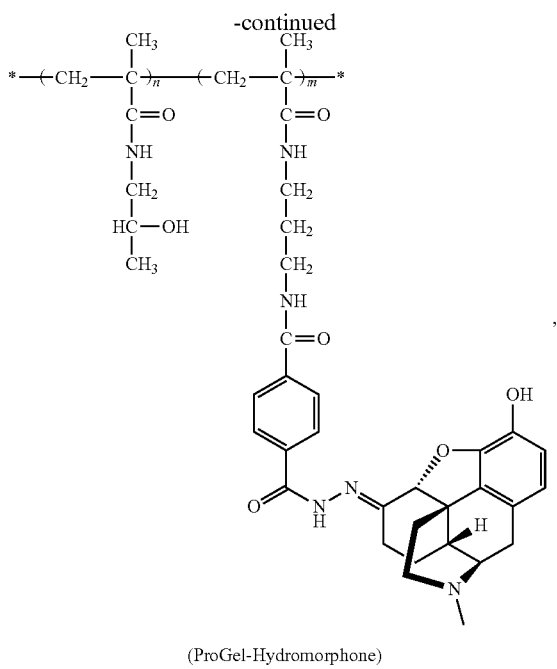

(ProGel-Hydromorphone)

wherein the tanshinone IIA content of the polymer-drug conjugate is in the range of 12-40% by weight; and wherein the molecular weight of the polymer-drug conjugate is in the range of 1-45 kDa.

13. A pharmaceutical composition comprising a thermoresponsive polymer-drug conjugate of claim 12 and one or more pharmaceutically acceptable carriers and/or excipients, wherein the concentration of the polymer drug-conjugate in the composition is in the range of 10-50% w/v.

14. A pharmaceutical composition comprising a thermoresponsive polymer-drug conjugate of claim 1 and one or more pharmaceutically acceptable carriers and/or excipients.

15. The thermoresponsive polymer-drug conjugate of claim 1, wherein the content of the hydrophobic drug moiety in the polymer-drug conjugate is 12% to 40% by weight.

16. The thermoresponsive polymer-drug conjugate of claim 1, wherein the content of the hydrophobic drug moiety in the polymer-drug conjugate is 15% or higher.

17. The thermoresponsive polymer-drug conjugate of claim 1, wherein the content of the hydrophobic drug moiety in the polymer-drug conjugate is 19% or higher.

18. A method of treating a disease or disorder, comprising administration to a subject in need of treatment a therapeutically effective amount of a thermoresponsive polymer-drug conjugate of claim 1, wherein the disease or disorder is rheumatoid arthritis, osteoarthritis, soft tissue inflammation and/or injury, periodontal bone loss, local infection and tissue abscess, delayed fracture union, neurological disorders, malignancies, regional pain, hearing loss, ischemic heart disease, heterotopic ossification, orthopaedic joint implant loosening, reproductive dysfunction, hormone administration for high risk pregnancy, or skin aging.

19. The method of claim 18, wherein the polymer-drug conjugate is administered through intra-articular, i ntradermal, intraperitoneal, intramuscular, intravitreal, intravaginal, intracranial, epidural, intracardiac, or musculoskeletal soft tissues, wherein the the polymer-drug conjugate is retained at tissue sites to slowly release active drug.

20. The method of claim 18, wherein the polymer-drug conjugate is formulated into a spray that can be applied to an open wound or surgical field, or applied to inflamed skin at sites of inflammation.

21. A method of treating a disease or disorder, comprising administration to a subject in need of treatment a therapeutically effective amount of two or more polymer-drug conjugates according to claim 1, wherein the two or more polymer-drug conjugates are optionally combined into one injection formula.

22. The method of claim 21, wherein the two or more polymer-drug conjugates are polymer-drug conjugates wherein the drug is selected from the group consisting of antibiotics, anti-inflammatoires and bone anabolic agents, and the two or more polymer-drug conjugates are combined together into a single formulation for the treatment of periodontitis and associated bone loss.

23. The method of claim 21, wherein the two or more polymer-drug conjugates are polymer-drug conjugates wherein the drug is an opioid and anti-inflammatory and wherein the two or more polymer-drug conjugates are combined into a single formulation for treatment of pain.

* * * * *